US012675206B2

(12) United States Patent
Dascola et al.

(10) Patent No.: US 12,675,206 B2
(45) Date of Patent: Jul. 7, 2026

(54) REDUCED-SIZE NOTIFICATION INTERFACE

(71) Applicant: Apple Inc., Cupertino, CA (US)

(72) Inventors: Jonathan R. Dascola, San Francisco, CA (US); Lawrence Y. Yang, Bellevue, WA (US); Christopher Patrick Foss, San Francisco, CA (US); Gary Ian Butcher, San Jose, CA (US); Imran Chaudhri, San Francisco, CA (US); Alan C. Dye, San Francisco, CA (US); Craig M. Federighi, Los Altos Hills, CA (US); Jonathan P. Ive, San Francisco, CA (US); Stephen O. Lemay, Palo Alto, CA (US); Kevin Lynch, Woodside, CA (US); Natalia Maric, San Francisco, CA (US); Curtis A. Rothert, Morgan Hill, CA (US); Wan Si Wan, Sunnyvale, CA (US); Jeff Williams, Pleasanton, CA (US); Christopher Wilson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/983,941

(22) Filed: Aug. 3, 2020

(65) Prior Publication Data

US 2020/0363914 A1     Nov. 19, 2020

Related U.S. Application Data

(63) Continuation of application No. 14/838,263, filed on Aug. 27, 2015, now Pat. No. 10,732,791.

(Continued)

(51) Int. Cl.
*G06F 3/0482* (2013.01)
*G06F 1/16* (2006.01)
(Continued)

(52) U.S. Cl.
CPC ............ *G06F 3/0482* (2013.01); *G06F 1/163* (2013.01); *G06F 3/0362* (2013.01);
(Continued)

(58) Field of Classification Search
CPC ........ G06F 3/048; G06F 3/0482; G06F 1/163; G06F 3/0362; G06F 3/0481;
(Continued)

(56) References Cited

U.S. PATENT DOCUMENTS

| | | | |
|---|---|---|---|
| 5,475,653 | A | 12/1995 | Yamada et al. |
| 5,655,094 | A | 8/1997 | Cline et al. |

(Continued)

FOREIGN PATENT DOCUMENTS

| | | |
|---|---|---|
| AU | 2016102028 B4 | 7/2017 |
| CA | 2545339 A1 | 11/2007 |

(Continued)

OTHER PUBLICATIONS

Office Action received for Australian Patent Application No. 2020200028, mailed on Sep. 24, 2020, 3 pages.
(Continued)

*Primary Examiner* — John T Repsher, III
(74) *Attorney, Agent, or Firm* — YHE Law LLP

(57) ABSTRACT

An electronic device with a touch-sensitive display can obtain a plurality of alerts associated with dates and times. The device can detect a user input, and in response to the input display a notification interface. The notification interface can include a future notification representing a future alert with a date and time after the current date and time, and a past notification representing a past alert with a date and
(Continued)

500

504

606 time before the current date and time. The future and past notifications can be separated by a graphical separator that has an indication of the current time. The future and past alerts correspond to different installed applications.

24 Claims, 45 Drawing Sheets

Related U.S. Application Data

(60) Provisional application No. 62/129,924, filed on Mar. 8, 2015, provisional application No. 62/044,953, filed on Sep. 2, 2014.

(51) Int. Cl.

| | |
|---|---|
| *G06F 3/0362* | (2013.01) |
| *G06F 3/0481* | (2022.01) |
| *G06F 3/04842* | (2022.01) |
| *G06F 3/0485* | (2022.01) |
| *G06F 3/04883* | (2022.01) |
| *G06F 3/04886* | (2022.01) |
| *G06Q 10/1093* | (2023.01) |
| *H04M 1/72412* | (2021.01) |
| *H04W 68/00* | (2009.01) |

(52) U.S. Cl.
CPC ........ *G06F 3/0481* (2013.01); *G06F 3/04842* (2013.01); *G06F 3/0485* (2013.01); *G06F 3/04883* (2013.01); *G06F 3/04886* (2013.01); *G06Q 10/1093* (2013.01); *H04M 1/72412* (2021.01); *H04W 68/00* (2013.01); *G06F 2203/04803* (2013.01); *G06F 2203/04806* (2013.01)

(58) Field of Classification Search
CPC ............... G06F 3/04842; G06F 3/0485; G06F 3/04883; G06F 3/04886; G06F 2203/04803; G06F 2203/04806; G06Q 10/10; G06Q 10/1093; H04M 1/72; H04M 1/72412; H04W 68/00
See application file for complete search history.

(56) References Cited

U.S. PATENT DOCUMENTS

| | | | |
|---|---|---|---|
| 6,253,075 | B1 | 6/2001 | Beghtol et al. |
| 6,597,378 | B1 | 7/2003 | Shiraishi et al. |
| 6,661,438 | B1 | 12/2003 | Shiraishi et al. |
| 6,941,345 | B1 | 9/2005 | Kapil et al. |
| 7,081,905 | B1 | 7/2006 | Raghunath |
| 7,130,664 | B1 | 10/2006 | Williams |
| 7,953,393 | B2 | 5/2011 | Chin et al. |
| 8,144,136 | B2 | 3/2012 | Minakuchi |
| 8,150,930 | B2 | 4/2012 | Satterfield et al. |
| 8,285,258 | B2 | 10/2012 | Schultz et al. |
| 8,407,305 | B2 | 3/2013 | Lazaridis et al. |
| 8,612,294 | B1 | 12/2013 | Treyz et al. |
| 8,725,527 | B1 | 5/2014 | Kahn et al. |
| 9,461,833 | B1 | 10/2016 | Marra et al. |
| 9,575,591 | B2 | 2/2017 | Yang et al. |
| 9,606,695 | B2 | 3/2017 | Matas |
| 9,808,206 | B1 | 11/2017 | Zhao et al. |
| 10,150,002 | B2 | 12/2018 | Kass et al. |
| 10,254,911 | B2 | 4/2019 | Yang |
| 10,757,531 | B1 | 8/2020 | Parshin et al. |
| 2002/0037715 | A1 | 3/2002 | Mauney et al. |
| 2003/0098871 | A1 | 5/2003 | Kawano et al. |
| 2003/0120805 | A1 | 6/2003 | Couts et al. |
| 2004/0041841 | A1 | 3/2004 | LeMogne et al. |
| 2004/0061716 | A1* | 4/2004 | Cheung ................... G06F 9/542 |
| | | | 715/710 |
| 2004/0113953 | A1 | 6/2004 | Newman |
| 2005/0268237 | A1 | 12/2005 | Crane et al. |
| 2006/0026245 | A1 | 2/2006 | Cunningham et al. |
| 2006/0092177 | A1 | 5/2006 | Blasko |
| 2006/0099970 | A1 | 5/2006 | Morgan et al. |
| 2006/0123427 | A1 | 6/2006 | Harold et al. |
| 2006/0187216 | A1 | 8/2006 | Trent et al. |
| 2006/0229014 | A1 | 10/2006 | Harada et al. |
| 2006/0294452 | A1 | 12/2006 | Matsumoto |
| 2007/0036300 | A1 | 2/2007 | Brown et al. |
| 2007/0061786 | A1 | 3/2007 | Zhou et al. |
| 2007/0165004 | A1 | 7/2007 | Seelhammer et al. |
| 2007/0202925 | A1 | 8/2007 | Beith |
| 2007/0229471 | A1* | 10/2007 | Kim ..................... G06F 3/0488 |
| | | | 345/173 |
| 2007/0288932 | A1 | 12/2007 | Horvitz et al. |
| 2008/0012701 | A1 | 1/2008 | Kass et al. |
| 2008/0032703 | A1 | 2/2008 | Krumm et al. |
| 2008/0091166 | A1 | 4/2008 | Fitzgerald et al. |
| 2008/0119176 | A1 | 5/2008 | Chen et al. |
| 2008/0180408 | A1 | 7/2008 | Forstall et al. |
| 2008/0320391 | A1 | 12/2008 | Lemay et al. |
| 2009/0055494 | A1 | 2/2009 | Fukumoto |
| 2009/0082043 | A1 | 3/2009 | Lazaridis |
| 2009/0138815 | A1 | 5/2009 | Mercer |
| 2009/0181726 | A1 | 7/2009 | Vargas et al. |
| 2009/0248247 | A1 | 10/2009 | Furuichi et al. |
| 2009/0249247 | A1 | 10/2009 | Tseng et al. |
| 2009/0298444 | A1 | 12/2009 | Shigeta |
| 2009/0307715 | A1 | 12/2009 | Santamaria et al. |
| 2010/0058231 | A1 | 3/2010 | Duarte et al. |
| 2010/0088140 | A1 | 4/2010 | Gil et al. |
| 2010/0144368 | A1 | 6/2010 | Sullivan et al. |
| 2010/0162169 | A1 | 6/2010 | Skarp |
| 2010/0171759 | A1 | 7/2010 | Nickolov et al. |
| 2010/0191818 | A1 | 7/2010 | Satterfield et al. |
| 2010/0216509 | A1 | 8/2010 | Riemer et al. |
| 2010/0281409 | A1 | 11/2010 | Rainisto et al. |
| 2010/0292600 | A1 | 11/2010 | Dibenedetto et al. |
| 2010/0321178 | A1 | 12/2010 | Deeds |
| 2010/0332518 | A1 | 12/2010 | Song et al. |
| 2011/0096011 | A1 | 4/2011 | Suzuki |
| 2011/0111728 | A1 | 5/2011 | Ferguson et al. |
| 2011/0133934 | A1* | 6/2011 | Tan ........................ G06F 1/1673 |
| | | | 340/573.1 |
| 2011/0151418 | A1 | 6/2011 | Delespaul et al. |
| 2011/0154390 | A1* | 6/2011 | Smith .................. H04N 21/482 |
| | | | 725/38 |
| 2011/0167383 | A1 | 7/2011 | Schuller et al. |
| 2011/0183650 | A1 | 7/2011 | McKee |
| 2011/0225547 | A1 | 9/2011 | Fong et al. |
| 2011/0239158 | A1 | 9/2011 | Barraclough et al. |
| 2011/0254684 | A1 | 10/2011 | Antoci |
| 2011/0265041 | A1 | 10/2011 | Ganetakos et al. |
| 2012/0005476 | A1 | 1/2012 | Wei et al. |
| 2012/0052920 | A1 | 3/2012 | Kobayashi et al. |
| 2012/0077463 | A1 | 3/2012 | Robbins et al. |
| 2012/0102437 | A1* | 4/2012 | Worley ................. G06F 3/0486 |
| | | | 345/173 |
| 2012/0105358 | A1 | 5/2012 | Momeyer et al. |
| 2012/0108215 | A1 | 5/2012 | Kameli |
| 2012/0117507 | A1 | 5/2012 | Tseng et al. |
| 2012/0126974 | A1 | 5/2012 | Phillips et al. |
| 2012/0135726 | A1 | 5/2012 | Luna et al. |
| 2012/0150970 | A1 | 6/2012 | Peterson et al. |
| 2012/0154431 | A1 | 6/2012 | Fram |
| 2012/0158511 | A1 | 6/2012 | Lucero et al. |
| 2012/0172088 | A1 | 7/2012 | Kirch et al. |
| 2012/0216127 | A1 | 8/2012 | Meyr |
| 2012/0276878 | A1 | 11/2012 | Othmer et al. |
| 2012/0276956 | A1 | 11/2012 | Tanioka |
| 2012/0304084 | A1 | 11/2012 | Kim et al. |
| 2013/0002580 | A1 | 1/2013 | Sudou |
| 2013/0007665 | A1* | 1/2013 | Chaudhri ............. G06F 3/0481 |
| | | | 715/833 |
| 2013/0063383 | A1 | 3/2013 | Anderssonreimer et al. |
| 2013/0065566 | A1 | 3/2013 | Gisby et al. |
| 2013/0091298 | A1 | 4/2013 | Ozzie et al. |
| 2013/0102281 | A1 | 4/2013 | Kanda et al. |

(56)  References Cited

U.S. PATENT DOCUMENTS

| | | |
|---|---|---|
| 2013/0138334 A1 | 5/2013 | Meredith et al. |
| 2013/0144653 A1 | 6/2013 | Poe et al. |
| 2013/0151961 A1 | 6/2013 | Sasaki |
| 2013/0159941 A1 | 6/2013 | Langlois et al. |
| 2013/0222236 A1 | 8/2013 | Gardenfors et al. |
| 2013/0227470 A1* | 8/2013 | Thorsander .......... G06F 3/0482 |
| | | 715/790 |
| 2013/0244633 A1 | 9/2013 | Jacobs et al. |
| 2013/0246275 A1 | 9/2013 | Joyce et al. |
| 2013/0268353 A1 | 10/2013 | Zeto et al. |
| 2013/0290879 A1* | 10/2013 | Greisson .......... H04M 1/72403 |
| | | 715/764 |
| 2013/0307809 A1 | 11/2013 | Sudou |
| 2013/0316744 A1 | 11/2013 | Newham et al. |
| 2013/0317688 A1 | 11/2013 | Uratani et al. |
| 2013/0321314 A1 | 12/2013 | Oh et al. |
| 2013/0322634 A1 | 12/2013 | Bennett et al. |
| 2013/0325951 A1 | 12/2013 | Chakra et al. |
| 2013/0332892 A1 | 12/2013 | Matsuki |
| 2013/0339436 A1 | 12/2013 | Gray |
| 2013/0346882 A1 | 12/2013 | Shiplacoff et al. |
| 2013/0347018 A1 | 12/2013 | Limp et al. |
| 2014/0005947 A1 | 1/2014 | Jeon et al. |
| 2014/0058873 A1 | 2/2014 | Sorensen et al. |
| 2014/0106677 A1 | 4/2014 | Altman |
| 2014/0118272 A1 | 5/2014 | Gunn |
| 2014/0129007 A1 | 5/2014 | Utter, II |
| 2014/0136633 A1 | 5/2014 | Murillo, Jr. et al. |
| 2014/0176426 A1 | 6/2014 | Morohoshi |
| 2014/0180595 A1 | 6/2014 | Brumback et al. |
| 2014/0189030 A1 | 7/2014 | Benchenaa et al. |
| 2014/0189533 A1 | 7/2014 | Krack et al. |
| 2014/0213295 A1 | 7/2014 | Conklin |
| 2014/0223358 A1 | 8/2014 | Park |
| 2014/0240122 A1 | 8/2014 | Roberts et al. |
| 2014/0244714 A1 | 8/2014 | Heiby |
| 2014/0244715 A1 | 8/2014 | Hodges et al. |
| 2014/0247928 A1 | 9/2014 | Gupta et al. |
| 2014/0258935 A1 | 9/2014 | Nishida et al. |
| 2014/0279728 A1 | 9/2014 | Skole |
| 2014/0282243 A1* | 9/2014 | Eye ....................... G06F 3/0482 |
| | | 715/810 |
| 2014/0304616 A1* | 10/2014 | Park ..................... G06F 3/0485 |
| | | 715/752 |
| 2014/0331175 A1* | 11/2014 | Mesguich Havilio ...................... |
| | | G06F 3/0481 |
| | | 715/863 |
| 2014/0344375 A1 | 11/2014 | Hauser et al. |
| 2014/0362702 A1 | 12/2014 | Luna |
| 2014/0368333 A1 | 12/2014 | Touloumtzis |
| 2015/0007049 A1 | 1/2015 | Langlois |
| 2015/0019963 A1 | 1/2015 | Park et al. |
| 2015/0026612 A1* | 1/2015 | Stahl ..................... G06F 3/0484 |
| | | 715/764 |
| 2015/0051721 A1 | 2/2015 | Cheng |
| 2015/0054733 A1* | 2/2015 | Pedersen ................. G06F 3/162 |
| | | 345/156 |
| 2015/0061862 A1 | 3/2015 | Lee et al. |
| 2015/0062862 A1 | 3/2015 | Baxter et al. |
| 2015/0067613 A1* | 3/2015 | Kim .................... G06F 3/04883 |
| | | 715/863 |
| 2015/0082446 A1 | 3/2015 | Flowers et al. |
| 2015/0089536 A1 | 3/2015 | Byerley |
| 2015/0100348 A1 | 4/2015 | Connery et al. |
| 2015/0133098 A1 | 5/2015 | Warr |
| 2015/0181373 A1 | 6/2015 | Xie et al. |
| 2015/0183558 A1 | 7/2015 | Crooms |
| 2015/0220774 A1 | 8/2015 | Ebersman et al. |
| 2015/0248389 A1 | 9/2015 | Kahn et al. |
| 2015/0286387 A1 | 10/2015 | Gu et al. |
| 2015/0286391 A1 | 10/2015 | Jacobs et al. |
| 2015/0334533 A1 | 11/2015 | Luo et al. |
| 2015/0347690 A1 | 12/2015 | Keen et al. |
| 2015/0347711 A1 | 12/2015 | Soli et al. |
| 2015/0350129 A1 | 12/2015 | Cary et al. |
| 2015/0350140 A1 | 12/2015 | Garcia et al. |
| 2015/0350146 A1 | 12/2015 | Cary et al. |
| 2015/0379476 A1 | 12/2015 | Chaudhri et al. |
| 2016/0028875 A1* | 1/2016 | Brown ................ G06F 3/04847 |
| | | 715/751 |
| 2016/0058336 A1 | 3/2016 | Blahnik et al. |
| 2016/0061623 A1 | 3/2016 | Pahwa et al. |
| 2016/0062540 A1 | 3/2016 | Yang et al. |
| 2016/0062570 A1 | 3/2016 | Dascola et al. |
| 2016/0073230 A1 | 3/2016 | Rahman et al. |
| 2016/0085397 A1 | 3/2016 | Jain |
| 2016/0098522 A1 | 4/2016 | Weinstein |
| 2016/0119389 A1 | 4/2016 | Gil et al. |
| 2016/0124592 A1 | 5/2016 | Kidron et al. |
| 2016/0157225 A1 | 6/2016 | Joshi et al. |
| 2016/0180026 A1 | 6/2016 | Kim et al. |
| 2016/0210099 A1 | 7/2016 | Hampapuram et al. |
| 2016/0232638 A1 | 8/2016 | Chen |
| 2016/0270717 A1 | 9/2016 | Luna et al. |
| 2016/0299526 A1 | 10/2016 | Inagaki et al. |
| 2016/0313869 A1 | 10/2016 | Jang et al. |
| 2016/0314670 A1 | 10/2016 | Roberts et al. |
| 2016/0320959 A1* | 11/2016 | Sheng ................... G06F 3/0488 |
| 2017/0083202 A1 | 3/2017 | Yang et al. |
| 2017/0126510 A1 | 5/2017 | Jones-McFadden et al. |
| 2017/0147197 A1 | 5/2017 | Yang et al. |
| 2017/0153795 A1 | 6/2017 | Yang et al. |
| 2017/0177797 A1 | 6/2017 | Kurniawan et al. |
| 2017/0213001 A1 | 7/2017 | Harrison |
| 2017/0225034 A1 | 8/2017 | Kass et al. |
| 2017/0274267 A1 | 9/2017 | Blahnik |
| 2017/0295476 A1 | 10/2017 | Webb |
| 2017/0300186 A1 | 10/2017 | Kuhar et al. |
| 2017/0300643 A1 | 10/2017 | Bezark et al. |
| 2017/0353836 A1 | 12/2017 | Gordon et al. |
| 2017/0364637 A1 | 12/2017 | Kshepakaran et al. |
| 2018/0024805 A1 | 1/2018 | Nakagawa |
| 2018/0056130 A1 | 3/2018 | Bitran et al. |
| 2018/0081918 A1 | 3/2018 | Gravenites et al. |
| 2018/0120985 A1 | 5/2018 | Wallace et al. |
| 2018/0121040 A1 | 5/2018 | Liu |
| 2018/0189343 A1 | 7/2018 | Embiricos et al. |
| 2018/0213354 A1 | 7/2018 | Wang et al. |
| 2018/0329584 A1 | 11/2018 | Williams et al. |
| 2018/0336530 A1 | 11/2018 | Johnson et al. |
| 2019/0018588 A1 | 1/2019 | Debates et al. |
| 2019/0034050 A1 | 1/2019 | Williams et al. |
| 2019/0057306 A1 | 2/2019 | Xue et al. |
| 2019/0286301 A1 | 9/2019 | Yang et al. |
| 2020/0008010 A1 | 1/2020 | Pai et al. |
| 2020/0152305 A1 | 5/2020 | Pelliccioni et al. |
| 2020/0186960 A1 | 6/2020 | Nolan |
| 2020/0245928 A1 | 8/2020 | Kang et al. |
| 2020/0380436 A1 | 12/2020 | Bonomo |
| 2020/0381099 A1 | 12/2020 | Crowley et al. |
| 2020/0382908 A1 | 12/2020 | Behzadi et al. |
| 2020/0409537 A1 | 12/2020 | Story et al. |
| 2021/0225482 A1 | 7/2021 | Crowley et al. |
| 2022/0300108 A1 | 9/2022 | Yang et al. |
| 2023/0017600 A1 | 1/2023 | Story et al. |
| 2023/0017837 A1 | 1/2023 | Behzadi et al. |
| 2023/0114054 A1 | 4/2023 | Crowley et al. |
| 2023/0208929 A1 | 6/2023 | Cary et al. |
| 2024/0012536 A1 | 1/2024 | Chen et al. |
| 2024/0013889 A1 | 1/2024 | Crowley et al. |
| 2024/0176441 A1 | 5/2024 | Yang et al. |
| 2024/0257986 A1 | 8/2024 | Damani et al. |
| 2025/0259730 A1 | 8/2025 | Crowley et al. |
| 2025/0260747 A1 | 8/2025 | Cary et al. |

FOREIGN PATENT DOCUMENTS

| | | |
|---|---|---|
| CN | 1429364 A | 7/2003 |
| CN | 1852335 A | 10/2006 |
| CN | 1950762 A | 4/2007 |
| CN | 101390371 A | 3/2009 |
| CN | 101535940 A | 9/2009 |
| CN | 101981987 A | 2/2011 |

(56) References Cited

FOREIGN PATENT DOCUMENTS

| | | | |
|---|---|---|---|
| CN | 102111505 | A | 6/2011 |
| CN | 102395128 | A | 3/2012 |
| CN | 102404458 | A | 4/2012 |
| CN | 103260059 | A | 8/2013 |
| CN | 103425119 | A | 12/2013 |
| CN | 103500079 | A | 1/2014 |
| CN | 103581413 | A | 2/2014 |
| CN | 103582873 | A | 2/2014 |
| CN | 103944811 | A | 7/2014 |
| CN | 105260078 | A | 1/2016 |
| CN | 105388998 | A | 3/2016 |
| CN | 105721667 | A | 6/2016 |
| CN | 106415559 | A | 2/2017 |
| CN | 108304106 | A | 7/2018 |
| CN | 108604327 | A | 9/2018 |
| EP | 1589734 | A2 | 10/2005 |
| EP | 1226699 | B1 | 6/2006 |
| EP | 2020648 | A2 | 2/2009 |
| EP | 2568409 | A1 | 3/2013 |
| EP | 2574026 | A1 | 3/2013 |
| EP | 2849042 | A1 | 3/2015 |
| EP | 2921899 | A2 | 9/2015 |
| EP | 3096235 | A1 | 11/2016 |
| EP | 3101882 | A2 | 12/2016 |
| EP | 3373122 | A1 | 9/2018 |
| JP | 11-45117 | A | 2/1999 |
| JP | 2002-366485 | A | 12/2002 |
| JP | 2003-330763 | A | 11/2003 |
| JP | 2005-352766 | A | 12/2005 |
| JP | 2006-79427 | A | 3/2006 |
| JP | 2006-113637 | A | 4/2006 |
| JP | 2006-129429 | A | 5/2006 |
| JP | 2006-217487 | A | 8/2006 |
| JP | 2007-28158 | A | 2/2007 |
| JP | 2007-199819 | A | 8/2007 |
| JP | 2008-104068 | A | 5/2008 |
| JP | 2009-193455 | A | 8/2009 |
| JP | 2010-61491 | A | 3/2010 |
| JP | 2012-198369 | A | 10/2012 |
| JP | 2012-234529 | A | 11/2012 |
| JP | 2013-12802 | A | 1/2013 |
| JP | 2013-48389 | A | 3/2013 |
| JP | 2013-511900 | A | 4/2013 |
| JP | 2013-93699 | A | 5/2013 |
| JP | 2013-127800 | A | 6/2013 |
| JP | 2014-27544 | A | 2/2014 |
| JP | 2014-57129 | A | 3/2014 |
| JP | 2014-123169 | A | 7/2014 |
| JP | 2014-135000 | A | 7/2014 |
| JP | 2014-519126 | A | 8/2014 |
| JP | 2016-537910 | A | 12/2016 |
| JP | 2016-538926 | A | 12/2016 |
| JP | 2017-117265 | A | 6/2017 |
| JP | 2017-515520 | A | 6/2017 |
| JP | 2017-521804 | A | 8/2017 |
| JP | 2017-526073 | A | 9/2017 |
| JP | 2017-182393 | A | 10/2017 |
| JP | 2017-529880 | A | 10/2017 |
| JP | 2017-532069 | A | 11/2017 |
| JP | 2018-504660 | A | 2/2018 |
| JP | 6382433 | B1 | 8/2018 |
| KR | 10-2016-0076264 | A | 6/2016 |
| KR | 10-2016-0077199 | A | 7/2016 |
| KR | 10-2017-0029014 | A | 3/2017 |
| WO | 2007/076210 | A1 | 7/2007 |
| WO | 2008/030776 | A2 | 3/2008 |
| WO | 2009/082377 | A1 | 7/2009 |
| WO | 2012/128824 | A1 | 9/2012 |
| WO | 2012/170446 | A2 | 12/2012 |
| WO | 2013/093558 | A1 | 6/2013 |
| WO | 2013/109916 | A1 | 7/2013 |
| WO | 2013/169842 | A2 | 11/2013 |
| WO | 2013/169865 | A2 | 11/2013 |
| WO | 2013/169870 | A1 | 11/2013 |
| WO | 2013/169875 | A2 | 11/2013 |
| WO | 2014/065846 | A1 | 5/2014 |
| WO | 2014/083001 | A2 | 6/2014 |
| WO | 2014/129655 | A1 | 8/2014 |
| WO | 2015/034163 | A1 | 3/2015 |
| WO | 2015/038684 | A1 | 3/2015 |
| WO | 2015/084353 | A1 | 6/2015 |
| WO | 2015/120358 | A1 | 8/2015 |
| WO | 2015/183558 | A1 | 12/2015 |
| WO | 2015/183756 | A1 | 12/2015 |
| WO | 2015/183828 | A1 | 12/2015 |
| WO | 2016/036472 | A1 | 3/2016 |
| WO | 2016/036582 | A2 | 3/2016 |
| WO | 2017/172046 | A1 | 10/2017 |
| WO | 2017/193515 | A1 | 11/2017 |

OTHER PUBLICATIONS

Result of Consultation received for European Patent Application No. 18170262.2, mailed on Jan. 18, 2021, 3 pages.

Applicant-Initiated Interview Summary received for U.S. Appl. No. 16/434,747, mailed on Mar. 18, 2022, 4 pages.

Non-Final Office Action received for U.S. Appl. No. 17/041,415, mailed on Mar. 29, 2022, 11 pages.

Notice of Allowance received for U.S. Appl. No. 14/475,471, mailed on Mar. 30, 2022, 3 pages.

Applicant-Initiated Interview Summary received for U.S. Appl. No. 16/669,187, mailed on Nov. 23, 2020, 3 pages.

International Search Report and Written Opinion received for PCT Patent Application No. PCT/US2020/034155, mailed on Sep. 17, 2020, 19 pages.

Invitation to Pay Additional Fees and Partial International Search Report received for PCT Patent Application No. PCT/US2020/035164, mailed on Oct. 16, 2020, 14 pages.

Invitation to Pay Additional Fees received for PCT Patent Application No. PCT/US2020/034155, mailed on Jul. 27, 2020, 12 pages.

Non-Final Office Action received for U.S. Appl. No. 16/669,187, mailed on Sep. 25, 2020, 40 pages.

Non-Final Office Action received for U.S. Appl. No. 16/880,714, mailed on Oct. 28, 2020, 11 pages.

Notice of Acceptance received for Australian Patent Application No. 2020200028, mailed on Nov. 10, 2020, 3 pages.

Office Action received for European Patent Application No. 15727130.5, mailed on Nov. 19, 2020, 5 pages.

Office Action received for Japanese Patent Application No. 2019000698, mailed on Oct. 23, 2020, 4 pages (2 pages of English Translation and 2 pages of Official Copy).

International Preliminary Report on Patentability received for PCT Patent Application No. PCT/US2020/035164, mailed on Dec. 16, 2021, 19 pages.

International Preliminary Report on Patentability received for PCT Patent Application No. PCT/US2020/034155, mailed on Dec. 16, 2021, 14 pages.

Record of Oral Hearing received for U.S. Appl. No. 14/475,471, mailed on Dec. 9, 2021, 22 pages.

Applicant-Initiated Interview Summary received for U.S. Appl. No. 16/880,714, mailed on Feb. 26, 2021, 5 pages.

International Search Report and Written Opinion received for PCT Patent Application No. PCT/US2020/035164, mailed on Feb. 8, 2021, 26 pages.

International Search Report and Written Opinion received for PCT Patent Application No. PCT/US2020/052041, mailed on Feb. 8, 2021, 18 pages.

Notice of Allowance received for Japanese Patent Application No. 2019-000698, mailed on Feb. 8, 2021, 4 pages (1 page of English Translation and 3 pages of Official Copy).

Office Action received for Australian Patent Application No. 2020239692, mailed on Jul. 20, 2021, 5 pages.

Intention to Grant received for European Patent Application No. 18170262.2, mailed on Oct. 27, 2021, 8 pages.

Final Office Action received for U.S. Appl. No. 14/475,446, mailed on Jun. 11, 2021, 23 pages.

(56) References Cited

OTHER PUBLICATIONS

Kern et al., "Context-Aware Notification for Wearable Computing", Perceptual Computing and Computer Vision, Proceedings of the Seventh IEEE International Symposium on Wearable Computers, 2003, 8 pages.

Non-Final Office Action received for U.S. Appl. No. 16/434,747, mailed on Jun. 10, 2021, 13 pages.

Notice of Allowance received for U.S. Appl. No. 16/880,714, mailed on Jun. 9, 2021, 6 pages.

Office Action received for Australian Patent Application No. 2020239692, mailed on Jan. 27, 2022, 3 pages.

Office Action received for Australian Patent Application No. 2021201059, mailed on Feb. 15, 2022, 4 pages.

Applicant Initiated Interview Summary received for U.S. Appl. No. 16/669,187, mailed on Jul. 2, 2021, 3 pages.

Search Report and Opinion received for Danish Patent Application No. PA202070620, mailed on Dec. 11, 2020, 9 pages.

Summons to Attend Oral Proceedings received for European Patent Application No. 18170262.2, mailed on Dec. 15, 2020, 5 pages.

Advisory Action received for U.S. Appl. No. 14/838,263, mailed on Jul. 12, 2018, 3 pages.

Applicant-Initiated Interview Summary received for U.S. Appl. No. 14/838,263, mailed on Jan. 17, 2020, 6 pages.

Benjamin, Jeff, "How Apple can solve the multiple iMessage alert conundrum", Available at: http://www.idownloadblog.com/2012/04/13/imessage-alert-priority/, Apr. 13, 2012, 5 pages.

Benjamin, Jeff, "Upcoming 'PushNotify' tweak will let you forward push notifications from iOS to the Mac", Available at: <http://www.idownloadblog.com/2014/04/08/upcoming-pushnotify-tweak-will-let-you-forward-push-notifications-from-ios-to-the-mac/>, Apr. 8, 2014, 5 pages.

"Cisco SPA300 Series and SPA500 Series IP Phones with Cisco Unified Communications UC320W", Cisco User Guide, 2011-2012, 95 pages.

Decision to Grant received for Korean Patent Application No. 10-2016-7032697, mailed on Jul. 16, 2018, 3 pages.

"Do Not Disturb Mode-Push to Pebble Not IPhone-Pebble Forums", Available at: <https://forums.getpebble.com/discussion/2949/do-not-disturb-mode-push-to-pebble-not-iphone> Accessed on Nov. 19, 2014, Mar. 2013, 3 pages.

Final Office Action received for U.S. Appl. No. 14/475,446, mailed on Jul. 14, 2017, 20 pages.

Final Office Action received for U.S. Appl. No. 14/475,471, mailed on Jun. 28, 2017, 16 pages.

Final Office Action received for U.S. Appl. No. 14/838,263, mailed on Feb. 21, 2019, 31 pages.

Final Office Action received for U.S. Appl. No. 14/838,263, mailed on Mar. 22, 2018, 33 pages.

International Preliminary Report on Patentability received for PCT Patent Application No. PCT/US2015/030591, mailed on Dec. 8, 2016, 10 pages.

International Preliminary Report on Patentability received for PCT Patent Application No. PCT/US2015/046805, mailed on Mar. 16, 2017, 8 pages.

International Preliminary Report on Patentability received for PCT Patent Application No. PCT/US2015/046807, mailed on Mar. 16, 2017, 13 pages.

International Search Report and Written Opinion received for PCT Patent Application No. PCT/US2015/030591, mailed on Jul. 21, 2015, 11 pages.

International Search Report and Written Opinion received for PCT Patent Application No. PCT/US2015/046805, mailed on Dec. 10, 2015, 11 pages.

International Search Report and Written Opinion received for PCT Patent Application No. PCT/US2015/046807, mailed on Apr. 1, 2016, 17 pages.

Invitation to Pay Additional Fees received for PCT Patent Application No. PCT/US2015/046807, mailed on Dec. 15, 2015, 7 pages.

Kissel, Joe, "An Alarming Abundance of Alerts", Available at <https://tidbits.com/article/13000>, May 13, 2012, 7 pages.

Nematoda, "Use Grow I Notifier to Send iOS Notifications Directly to Your Mac", Available at: <http://www.gizmocrazed.com/2011/12/use-growlnotifier-to-send-ios-notifications-directly-to-your-mac/>, Dec. 3, 2011, 8 pages.

Non-Final Office Action received for U.S. Appl. No. 14/475,446, mailed on Jun. 28, 2018, 21 pages.

Non-Final Office Action received for U.S. Appl. No. 14/475,446, mailed on Nov. 18, 2016, 24 pages.

Non-Final Office Action received for U.S. Appl. No. 14/475,471, mailed on Nov. 18, 2016, 19 pages.

Non-Final Office Action received for U.S. Appl. No. 14/475,471, mailed on Sep. 18, 2018, 25 pages.

Non-Final Office Action received for U.S. Appl. No. 14/838,263, mailed on Aug. 16, 2019, 33 pages.

Non-Final Office Action received for U.S. Appl. No. 14/838,263, mailed on Jul. 14, 2017, 34 pages.

Non-Final Office Action received for U.S. Appl. No. 14/838,263, mailed on Sep. 21, 2018, 33 pages.

Notice of Allowance received for Japanese Patent Application No. 2016-566998, mailed on Oct. 26, 2018, 2 pages.

Notice of Allowance received for Taiwanese Patent Application No. 104128702, mailed on Oct. 25, 2017, 3 pages.

Notice of Allowance received for U.S. Appl. No. 14/838,263, mailed on Mar. 24, 2020, 9 pages.

Office Action received for Australian Patent Application No. 2015267514, mailed on May 22, 2018, 3 pages.

Office Action received for Australian Patent Application No. 2018203708, mailed on Jan. 3, 2019, 4 pages.

Office Action received for Japanese Patent Application No. 2016-566998, mailed on Feb. 16, 2018, 13 pages.

Office Action received for Taiwanese Patent Application No. 104128702, mailed on Feb. 7, 2017, 12 pages.

"Pushbullet—Android Apps on Google Play", Available at: https://play.google.com/store/apps/details?id=com.pushbullet.android, Nov. 5, 2014, 3 pages.

"PushNotify Forwards Notifications from iPhone & iPad to your Mac", Available at: <http://ioshacker.com/cydia/pushnotify-forwards-notifications-iphone-ipad-mac>, 2014, 3 pages.

Ravenscraft, Eric, "Kinja Lifehacker Downloads", Available at: <http://lifehacker.com/how-to-use-pushbullet-to-get-notified-of-anything-on-an-1548595270>, Mar. 21, 2014, 9 pages.

Restriction Requirement received for U.S. Appl. No. 14/475,471, mailed on Jul. 15, 2016, 8 pages.

Advisory Action received for U.S. Appl. No. 16/669,187, mailed on Jan. 4, 2022, 4 pages.

Office Action received for Japanese Patent Application No. 2020-551585, mailed on Jan. 6, 2022, 11 pages (5 pages of English Translation and 6 pages of Official Copy).

Decision on Appeal received for U.S. Appl. No. 14/475,471, mailed on Nov. 16, 2021, 12 pages.

Final Office Action received for U.S. Appl. No. 16/434,747, mailed on Nov. 26, 2021, 14 pages.

Office Action received for Danish Patent Application No. PA202070620, mailed on Nov. 19, 2021, 2 pages.

Applicant-Initiated Interview Summary received for U.S. Appl. No. 16/434,747, mailed on Sep. 8, 2021, 4 pages.

Office Action received for Chinese Patent Application No. 202010009882.3, mailed on Aug. 9, 2021, 11 pages (5 pages of English Translation and 6 pages of Official Copy).

Advisory Action received for U.S. Appl. No. 14/475,446, mailed on Sep. 20, 2019, 12 pages.

Airize, "Notification & Control Center Problem Issue Solution", Available online at: "https://www.youtube.com/watch?v=K0zCueYlaTA", Dec. 6, 2013, 1 page.

Applicant-Initiated Interview Summary received for U.S. Appl. No. 14/475,471, mailed on Mar. 18, 2020, 5 pages.

Applicant-Initiated Interview Summary received for U.S. Appl. No. 14/475,471, mailed on Oct. 28, 2019, 5 pages.

Basu Saikat, "MS Outlook Tip: How to Automatically Organize Incoming Emails", Available online at: <http://www.makeuseof.com/tag/ms-outlook-productivity-tip-how-to-move-emails-to-individual-folders-automatically/>, Sep. 27, 2009, pp. 1-6.

(56)                    References Cited

OTHER PUBLICATIONS

Decision to Grant received for Danish Patent Application No. PA201770126, mailed on Mar. 27, 2018, 2 pages.
Decision to Grant received for European Patent Application No. 15759981.2, mailed on Jan. 8, 2020, 2 pages.
Extended European Search Report received for European Patent Application No. 18170262.2, mailed on Jul. 25, 2018, 8 pages.
Final Office Action received for U.S. Appl. No. 14/475,446, mailed on Apr. 18, 2019, 28 pages.
Final Office Action received for U.S. Appl. No. 14/475,471, mailed on Jul. 11, 2019, 18 pages.
Final Office Action received for U.S. Appl. No. 14/475,471, mailed on May 15, 2020, 19 pages.
Final Office Action received for U.S. Appl. No. 14/838,235, mailed on Jun. 15, 2016, 18 pages.
"How to Move Mail to Different Folders in Gmail", Available online at: <https://web.archive.org/web/20140731230338/http://www.wikihow.com/Move-Mail-to-Different-Folders-in-Gmail>, Jul. 31, 2014, pp. 1-4.
Intention to Grant received for Danish Patent Application No. PA201570550, mailed on Dec. 22, 2016, 2 pages.
Intention to Grant received for Danish Patent Application No. PA201770126, mailed on Jan. 19, 2018, 2 pages.
Intention to Grant received for European Patent Application No. 15759981.2, mailed on Aug. 12, 2019, 8 pages.
Intention to Grant received for European Patent Application No. 15759981.2, mailed on Mar. 21, 2019, 8 pages.
Intention to Grant received for European Patent Application No. 18170262.2, mailed on Jun. 30, 2020, 8 pages.
International Preliminary Report on Patentability received for PCT Patent Application No. PCT/US2015/044083, mailed on Mar. 16, 2017, 24 pages.
International Search Report and Written Opinion received for PCT Patent Application No. PCT/US2015/044083, mailed on Feb. 4, 2016, 33 pages.
Invitation to Pay Additional Fees received for PCT Patent Application No. PCT/US2015/044083, mailed on Nov. 4, 2015, 11 pages.
Iosvlog Daily, "iOS 7 Notification Center Complete Walkthrough", Available online at: "https://www.youtube.com/watch?v=gATXt-o42LA", Jun. 10, 2013, 1 page.
Leonard Jonathano, "How to: dismiss banner notifications or toast notifications on ios7", Available online at: "https://www.youtube.com/watch?v=vSjHnBFIW_M", Dec. 17, 2013, 1 page.
Lewis Jeffery, "iOS Notification Banner Pull Down to Notification Center in iOS 7 Beta 5", Available online at: "https://www.youtube.com/watch?v=nP0s6ETPxDg", Aug. 6, 2013, 1 page.
Non-Final Office Action received for U.S. Appl. No. 14/475,446, mailed on Mar. 18, 2020, 20 pages.
Non-Final Office Action received for U.S. Appl. No. 14/475,471, mailed on Dec. 19, 2019, 20 pages.
Non-Final Office Action received for U.S. Appl. No. 14/838,235, mailed on Jan. 5, 2016, 3 pages.
Non-Final Office Action received for U.S. Appl. No. 15/425,273, mailed on Oct. 3, 2018, 10 pages.
Non-Final Office Action received for U.S. Appl. No. 15/431,435, mailed on Jun. 8, 2017, 13 pages.
Notice of Acceptance received for Australian Patent Application No. 2015312369, mailed on Mar. 21, 2018, 3 pages.
Notice of Acceptance received for Australian Patent Application No. 2018204430, mailed on Jun. 26, 2019, 3 pages.
Notice of Acceptance received for Australian Patent Application No. 2019246830, mailed on Oct. 24, 2019, 3 pages.
Notice of Allowance received for Chinese Patent Application No. 201510549056.7, mailed on Jul. 2, 2019, 2 pages (1 page of English Translation and 1 page of Official Copy).
Notice of Allowance received for Chinese Patent Application No. 201520669842.6, mailed on May 18, 2016, 4 pages (2 pages of English Translation and 2 pages of Official Copy).

Notice of Allowance received for Chinese Patent Application No. 201580028073.4, mailed on Oct. 22, 2019, 2 pages (1 page of English Translation and 1 page of Official Copy).
Notice of Allowance received for Chinese Patent Application No. 201620830403.3, mailed on Sep. 8, 2017, 2 pages (1 page of English Translation and 1 page of Official Copy).
Notice of Allowance received for Danish Patent Application No. PA201570550, mailed on Mar. 20, 2017, 2 pages.
Notice of Allowance received for Japanese Patent Application No. 2017-510297, mailed on May 7, 2018, 4 pages (1 page of English Translation and 3 pages of Official copy).
Notice of Allowance received for Japanese Patent Application No. 2018-072632, mailed on Dec. 7, 2018, 4 pages (1 page of English Translation and 3 pages of Official Copy).
Notice of Allowance received for Korean Patent Application No. 10-2017-7005628, mailed on Jun. 18, 2018, 5 pages (2 page of English Translation and 3 pages of Official Copy).
Notice of Allowance received for Korean Patent Application No. 10-2018-7027006, mailed on May 23, 2019, 4 pages (1 pages of English Translation and 3 pages of Official Copy).
Notice of Allowance received for Korean Patent Application No. 10-2019-7024901, mailed on May 12, 2020, 5 pages (2 pages of English Translation and 3 pages of Official Copy).
Notice of Allowance received for Taiwanese Patent Application No. 104128704, mailed on Feb. 21, 2018, 5 pages (2 pages of English Translation and 3 pages of Official Copy).
Notice of Allowance received for U.S. Appl. No. 14/838,235, mailed on Dec. 29, 2016, 4 pages.
Notice of Allowance received for U.S. Appl. No. 14/838,235, mailed on Oct. 4, 2016, 7 pages.
Notice of Allowance received for U.S. Appl. No. 15/425,273, mailed on Mar. 7, 2019, 8 pages.
Notice of Allowance received for U.S. Appl. No. 15/431,435, mailed on Jan. 23, 2018, 8 pages.
Office Action received for Australian Patent Application No. 2015101188, issued on Apr. 14, 2016, 3 pages.
Office Action received for Australian Patent Application No. 2015267514 mailed on May 25, 2017, 3 pages.
Office Action received for Australian Patent Application No. 2015312369, mailed on Mar. 29, 2017, 3 pages.
Office Action received for Australian Patent Application No. 2017100197, mailed on Apr. 28, 2017, 4 pages.
Office Action received for Australian Patent Application No. 2017100198, mailed on Apr. 20, 2017, 4 pages.
Office Action received for Australian Patent Application No. 2018203708, mailed on Aug. 15, 2019, 5 pages.
Office Action received for Australian Patent Application No. 2018204430, mailed on Aug. 15, 2018, 5 pages.
Office Action received for Chinese Patent Application No. 201510549056.7, mailed on Aug. 7, 2018, 7 pages (2 pages of English Translation and 5 pages of Official Copy).
Office Action received for Chinese Patent Application No. 201510549056.7, mailed on Mar. 15, 2019, 7 pages (3 pages of English Translation and 4 pages of Official Copy).
Office Action received for Chinese Patent Application No. 201510549056.7, mailed on Nov. 24, 2017, 15 pages (6 pages of English Translation and 9 pages of Official Copy).
Office Action received for Chinese Patent Application No. 201520669842.6, mailed on Dec. 4, 2015, 7 pages (4 pages of English Translation and 3 Pages of Official Copy).
Office Action received for Chinese Patent Application No. 201580028073.4, mailed on Feb. 2, 2019, 18 pages (10 pages of English Translation and 8 pages of Official Copy).
Office Action received for Chinese Patent Application No. 201620830403.3, mailed on Jun. 7, 2017, 2 pages (1 page of English Translation and 1 page of Official Copy).
Office Action received for Chinese Patent Application No. 201620830403.3, mailed on Mar. 7, 2017, 3 pages (2 pages of English Translation and 1 page of Official Copy).
Office Action received for Danish Patent Application No. PA201570550, mailed on Dec. 7, 2015, 6 pages.
Office Action received for Danish Patent Application No. PA201570550, mailed on Jan. 19, 2016, 2 pages.

(56) References Cited

OTHER PUBLICATIONS

Office Action received for Danish Patent Application No. PA201570550, mailed on Oct. 19, 2016, 3 pages.

Office Action received for Danish Patent Application No. PA201770125, mailed on Jan. 26, 2018, 5 pages.

Office Action received for Danish Patent Application No. PA201770125, mailed on Jul. 20, 2018, 2 pages.

Office Action received for Danish Patent Application No. PA201770126, mailed on Oct. 18, 2017, 3 pages.

Office Action received for European Patent Application No. 15727130.5, mailed on Feb. 14, 2020, 4 pages.

Office Action received for European Patent Application No. 15727130.5, mailed on Jun. 8, 2018, 5 pages.

Office Action received for European Patent Application No. 15727130.5, mailed on Mar. 13, 2019, 4 pages.

Office Action received for European Patent Application No. 15759981.2, mailed on Apr. 19, 2018, 6 pages.

Office Action received for European Patent Application No. 15759981.2, mailed on Aug. 6, 2018, 10 pages.

Office Action received for European Patent Application No. 15759981.2, mailed on May 16, 2018, 6 pages.

Office Action received for European Patent Application No. 18170262.2, mailed on Dec. 9, 2019, 3 pages.

Office Action received for European Patent Application No. 18170262.2, mailed on May 16, 2019, 6 pages.

Office Action received for European Patent Application No. 18170262.2, mailed on May 27, 2019, 6 pages.

Office Action received for Japanese Patent Application No. 2017-510297, mailed on Dec. 4, 2017, 5 pages (2 pages of English Translation and 3 pages of Official Copy).

Office Action received for Japanese Patent Application No. 2017-510297, mailed on Jul. 10, 2017, 10 pages (5 pages of English Translation and 5 pages of Official Copy).

Office Action received for Japanese Patent Application No. 2018-072632, mailed on Jul. 9, 2018, 5 pages (2 pages of English Translation and 3 pages of Official Copy).

Office Action received for Japanese Patent Application No. 2019-000698, mailed on Mar. 9, 2020, 8 pages (4 pages of English Translation and 4 pages of Official Copy).

Office Action received for Korean Patent Application No. 10-2017-7005628, mailed on Jan. 30, 2018, 6 pages (2 pages of English Translation and 4 pages of official Copy).

Office Action received for Korean Patent Application No. 10-2017-7005628, mailed on May 10, 2017, 12 pages (5 pages of English Translation and 7 pages of Official Copy).

Office Action received for Korean Patent Application No. 10-2018-7027006, mailed on Jan. 14, 2019, 6 pages (2 pages of English Translation and 4 pages of Official Copy).

Office Action received for Korean Patent Application No. 10-2019-7024901, mailed on Sep. 26, 2019, 6 pages (2 pages of English Translation and 4 pages of Official Copy).

Office Action received for Taiwanese Patent Application No. 104128704, mailed on Jul. 31, 2017, 7 pages (3 pages of English Translation and 4 pages of Official Copy).

Office Action received for Taiwanese Patent Application No. 104128704, mailed on Nov. 2, 2016, 12 pages (5 pages of English Translation and 7 pages of Official Copy).

Patterson Ben, "iOS 7 tip: Alerts, banners, and badgesâwhat's the difference?", Available online at: "https://web.archive.org/web/20140128072440/http://heresthethingblog.com/2014/01/22/ios-7-tip-whats-difference-alert/", Jan. 22, 2014, 5 pages.

Restriction Requirement received for U.S. Appl. No. 14/475,446, mailed on Jul. 18, 2016, 8 pages.

"Samsung User Manual", SM-R380_UM_EU_Eng_D13_140411.pdf, Apr. 2014, 78 pages.

Samsung, "Samsung Gear 2 User manual", Online Available: https://data2.manualslib.com/pdf3/76/7550/754923-samsung/gear_2.pdf?7eb313a9f65b1566bcf9ff58661c6b3a&take=binary, XP055464984, Apr. 9, 2014, pp. 1-97.

Search Report and Opinion received for Netherlands Patent Application No. 2015354, mailed on Jun. 22, 2017, 24 pages (10 pages of English Translation and 14 pages of Official Copy).

Search Report and Opinion received for Netherlands Patent Application No. 2019878, mailed on Apr. 6, 2018, 24 pages (12 pages of English Translation and 12 pages of Official Copy).

Search Report received for Danish Patent Application No. PA201770125, mailed on May 5, 2017, 10 pages.

Search Report received for Danish Patent Application No. PA201770126, mailed on Apr. 26, 2017, 8 pages.

"User Manual", Available Online at: http://www.manualslib.com/download/754923/Samsung-Gear-2.html, 2014, pp. 1-97.

Supplemental Notice of Allowance received for U.S. Appl. No. 16/880,714, mailed on Sep. 16, 2021, 2 pages.

Non-Final Office Action received for U.S. Appl. No. 14/475,446, mailed on Mar. 9, 2021, 22 pages.

Office Action received for Chinese Patent Application No. 201810654707.2, mailed on Mar. 1, 2021, 23 pages (8 pages of English translation and 15 pages of official copy).

Final Office Action received for U.S. Appl. No. 16/669,187, mailed on Mar. 31, 2021, 46 pages.

Notice of Allowance received for U.S. Appl. No. 16/880,714, mailed on Mar. 19, 2021, 7 pages.

Brief Communication Regarding Oral Proceedings received for European Patent Application No. 18170262.2, mailed on Oct. 4, 2021, 2 pages.

Intention to Grant received for European Patent Application No. 15727130.5, mailed on Oct. 19, 2021, 8 pages.

Decision to Grant received for European Patent Application No. 15727130.5, mailed on Mar. 3, 2022, 3 pages.

Decision to Grant received for European Patent Application No. 18170262.2, mailed on Mar. 11, 2022, 2 pages.

Non-Final Office Action received for U.S. Appl. No. 17/020,382, mailed on Mar. 3, 2022, 12 pages.

Office Action received for Danish Patent Application No. PA202070620, mailed on May 10, 2021, 5 pages.

Applicant-Initiated Interview Summary received for U.S. Appl. No. 14/475,446, mailed on May 3, 2021, 3 pages.

Examiner's Answer to Appeal Brief received for U.S. Appl. No. 14/475,471, mailed on Apr. 23, 2021, 12 pages.

Notice of Allowance received for Chinese Patent Application No. 202010009882.3 mailed on Jan. 14, 2022, 4 pages (1 page of English Translation and 3 pages of Official Copy).

Notice of Allowance received for U.S. Appl. No. 14/475,471, mailed on Jan. 26, 2022, 6 pages.

Office Action received for Chinese Patent Application No. 201810654707.2 mailed on Jan. 11, 2022, 11 pages (5 pages of English Translation and 6 pages of Official Copy).

Corrected Notice of Allowance received for U.S. Appl. No. 16/669,187, mailed on Sep. 6, 2022, 2 pages.

Extended European Search Report received for European Patent Application No. 22157146.6, mailed on Sep. 7, 2022, 9 pages.

Notice of Allowance received for U.S. Appl. No. 17/041,415, mailed on Aug. 31, 2022, 7 pages.

Office Action received for Korean Patent Application No. 10-2020-7033395, mailed on Aug. 29, 2022, 11 pages (4 pages of English Translation and 7 pages of Official Copy).

Non-Final Office Action received for U.S. Appl. No. 17/835,334, mailed on Sep. 22, 2022, 11 pages.

Notice of Allowance received for Chinese Patent Application No. 202111611270.2, mailed on Sep. 21, 2022, 4 pages (1 page of English Translation and 3 pages of Official Copy).

Supplemental Notice of Allowance received for U.S. Appl. No. 17/041,415, mailed on Sep. 20, 2022, 2 pages.

Applicant Initiated Interview Summary received for U.S. Appl. No. 17/020,382, mailed on May 10, 2022, 2 pages.

Examiner's Answer to Appeal Brief received for U.S. Appl. No. 14/475,446, mailed on Apr. 29, 2022, 12 pages.

Office Action received for Chinese Patent Application No. 201810654707.2 mailed on Apr. 2, 2022, 16 pages (6 pages of English Translation and 10 pages of Official Copy).

Applicant-Initiated Interview Summary received for U.S. Appl. No. 17/041,415, mailed on Jun. 29, 2022, 2 pages.

(56) References Cited

OTHER PUBLICATIONS

Corrected Notice of Allowance received for U.S. Appl. No. 17/020,382, mailed on Jul. 7, 2022, 2 pages.

Notice of Allowance received for U.S. Appl. No. 17/020,382, mailed on Jun. 24, 2022, 8 pages.

Final Office Action received for U.S. Appl. No. 17/835,334, mailed on Dec. 22, 2022, 11 pages.

Notice of Acceptance received for Australian Patent Application No. 2021201059, mailed on Aug. 10, 2022, 3 pages.

Notice of Allowance received for U.S. Appl. No. 16/669,187, mailed on Aug. 8, 2022, 5 pages.

Decision on Appeal received for U.S. Appl. No. 14/475,446, mailed on Dec. 30, 2022, 28 pages.

Notice of Allowance received for Japanese Patent Application No. 2020-551585, mailed on Jul. 22, 2022, 4 pages (1 page of English Translation and 3 pages of Official Copy).

Office Action received for Chinese Patent Application No. 201810654707.2, mailed on Jun. 22, 2022, 14 pages (4 pages of English Translation and 10 pages of Official Copy).

Office Action received for European Patent Application No. 20732041.7, mailed on Dec. 6, 2022, 9 pages.

Applicant-Initiated Interview Summary received for U.S. Appl. No. 17/835,334, mailed on Oct. 31, 2022, 3 pages.

Invitation to Pay Search Fees received for European Patent Application No. 20760607.0, mailed on Nov. 21, 2022, 3 pages.

Notice of Allowance received for Japanese Patent Application No. 2021-037591, mailed on Nov. 18, 2022, 4 pages (1 page of English Translation and 3 pages of Official Copy).

Record of Oral Hearing received for U.S. Appl. No. 14/475,446, mailed on Nov. 18, 2022, 15 pages.

Extended European Search Report received for European Patent Application No. 22158560.7, mailed on Jun. 10, 2022, 12 pages.

Office Action received for Chinese Patent Application No. 202111611270.2, mailed on May 10, 2022, 16 pages (8 pages of English Translation and 8 pages of Official Copy).

Office Action received for Japanese Patent Application No. 2021-037591, mailed on Jun. 6, 2022, 6 pages (3 pages of English Translation and 3 pages of Official Copy).

Office Action received for Australian Patent Application No. 2021201059, mailed on May 25, 2022, 3 pages.

Supplemental Notice of Allowance received for U.S. Appl. No. 17/041,415, mailed on Oct. 13, 2022, 2 pages.

Notice of Acceptance received for Australian Patent Application No. 2020239692, mailed on Apr. 6, 2022, 3 pages.

Notice of Allowance received for U.S. Appl. No. 16/434,747, mailed on Apr. 28, 2022, 8 pages.

Notice of Allowance received for U.S. Appl. No. 16/669,187, mailed on Apr. 25, 2022, 9 pages.

Supplemental Notice of Allowance received for U.S. Appl. No. 18/078,444, mailed on Jun. 15, 2023, 2 pages.

Advisory Action received for U.S. Appl. No. 17/835,334, mailed on Feb. 8, 2023, 3 pages.

Applicant-Initiated Interview Summary received for U.S. Appl. No. 17/835,334, mailed on Jan. 27, 2023, 4 pages.

Office Action received for Chinese Patent Application No. 201810654707.2, mailed on Dec. 28, 2022, 13 pages (5 pages of English Translation and 8 pages of Official Copy).

Office Action received for European Patent Application No. 20760607.0, mailed on Feb. 1, 2023, 13 pages.

Board Decision received for Chinese Patent Application No. 201810654707.2, mailed on Apr. 13, 2023, 2 pages (1 page of English Translation and 1 page of Official Copy).

International Preliminary Report on Patentability received for PCT Patent Application No. PCT/US2020/052041, mailed on Mar. 23, 2023, 15 pages.

Notice of Allowance received for U.S. Appl. No. 18/078,444, mailed on May 12, 2023, 9 pages.

Office Action received for Australian Patent Application No. 2022204568, mailed on May 22, 2023, 4 pages.

Notice of Acceptance received for Australian Patent Application No. 2022204568, mailed on Jul. 27, 2023, 3 pages.

Notice of Allowance received for U.S. Appl. No. 17/835,334, mailed on Aug. 16, 2023, 8 pages.

Office Action received for Chinese Patent Application No. 201810654707.2, mailed on Jul. 6, 2023, 10 pages (5 pages of English Translation and 5 pages of Official Copy).

Non-Final Office Action received for U.S. Appl. No. 17/835,334, mailed on Mar. 1, 2023, 11 pages.

Office Action received for Australian Patent Application No. 2022204568, mailed on Mar. 11, 2023, 4 pages.

Intention to Grant received for European Patent Application No. 20732041.7, mailed on Feb. 5, 2024, 9 pages.

Office Action received for Korean Patent Application No. 10-2023-7018399, mailed on Jan. 24, 2024, 11 pages (4 pages of English Translation and 7 pages of Official Copy).

Applicant-Initiated Interview Summary received for U.S. Appl. No. 18/115,683, mailed on Nov. 21, 2023, 4 pages.

Non-Final Office Action received for U.S. Appl. No. 18/115,683, mailed on Oct. 4, 2023, 14 pages.

Notice of Allowance received for Chinese Patent Application No. 201810654707.2, mailed on Sep. 24, 2023, 2 pages (1 page of English Translation and 1 page of Official Copy).

Notice of Allowance received for U.S. Appl. No. 18/078,444, mailed on Aug. 31, 2023, 6 pages.

Office Action received for Australian Patent Application No. 2022235611, mailed on Sep. 8, 2023, 3 pages.

Office Action received for European Patent Application No. 20760607.0, mailed on Aug. 17, 2023, 7 pages.

Office Action received for Japanese Patent Application No. 2022-131993, mailed on Sep. 15, 2023, 6 pages (3 pages of English Translation and 3 pages of Official Copy).

Supplemental Notice of Allowance received for U.S. Appl. No. 18/078,444, mailed on Oct. 16, 2023, 4 pages.

Office Action received for Australian Patent Application No. 2022235611, mailed on Mar. 6, 2024, 2 pages.

Office Action received for European Patent Application No. 22158560.7, mailed on Feb. 13, 2024, 10 pages.

Sony Ericsson Mobile COMM.,"User guide SmartWatch MN2", Available online at: https://manualzz.com/doc/23127468/sony-smartwatch-mn2-user-guide, Dec. 2011. 19 pages.

Notice of Allowance received for U.S. Appl. No. 17/835,334, mailed on Jan. 5, 2024, 8 pages.

Office Action received for European Patent Application No. 20760607.0, mailed on Jan. 3, 2024, 7 pages.

Notice of Allowance received for Japanese Patent Application No. 2022-131993, mailed on Dec. 18, 2023, 4 pages (1 page of English Translation and 3 pages of Official Copy).

Office Action received for Australian Patent Application No. 2022235611, mailed on Dec. 6, 2023, 3 pages.

Office Action received for Chinese Patent Application No. 202080040230.4, mailed on Feb. 24, 2024, 11 pages (5 pages of English Translation and 6 pages of Official Copy).

Office Action received for Japanese Patent Application No. 2022-202284, mailed on Mar. 25, 2024, 6 pages (3 pages of English Translation and 3 pages of Official Copy).

Final Office Action received for U.S. Appl. No. 18/115,683, mailed on May 9, 2024, 13 pages.

Notice of Acceptance received for Australian Patent Application No. 2022235611, mailed on May 17, 2024, 3 pages.

Decision to Grant received for European Patent Application No. 20732041.7, mailed on May 31, 2024, 2 pages.

Office Action received for European Patent Application No. 22157146.6, mailed on May 24, 2024, 5 pages.

Applicant-Initiated Interview Summary received for U.S. Appl. No. 18/115,683, mailed on Jul. 3, 2024, 3 pages.

Office Action received for European Patent Application No. 20760607.0, mailed on Jul. 12, 2024, 10 pages.

Extended European Search Report received for European Patent Application No. 24173644.6, mailed on Jul. 24, 2024, 8 pages.

Corrected Notice of Allowance received for U.S. Appl. No. 17/950,817, mailed on Mar. 28, 2025, 2 pages.

(56) References Cited

OTHER PUBLICATIONS

Intention to Grant received for European Patent Application No. 20760607.0, mailed on Mar. 25, 2025, 10 pages.

Notice of Allowance received for U.S. Appl. No. 17/950,817, mailed on Mar. 18, 2025, 5 pages.

Notice of Allowance received for U.S. Appl. No. 18/370,833, mailed on Mar. 19, 2025, 10 pages.

Decision to Grant received for European Patent Application No. 20760607.0, mailed on May 15, 2025, 3 pages.

Notice of Allowance received for U.S. Appl. No. 18/370,833, mailed on May 22, 2025, 6 pages.

Applicant-Initiated Interview Summary received for U.S. Appl. No. 18/115,683, mailed on Nov. 14, 2024, 3 pages.

Corrected Notice of Allowance received for U.S. Appl. No. 17/955,366, mailed on Jan. 6, 2025, 2 pages.

Final Office Action received for U.S. Appl. No. 18/115,683, mailed on Nov. 22, 2024, 14 pages.

Intention to Grant received for European Patent Application No. 20760607.0, mailed on Dec. 23, 2024, 10 pages.

Non-Final Office Action received for U.S. Appl. No. 17/955,366, mailed on Nov. 5, 2024, 10 pages.

Non-Final Office Action received for U.S. Appl. No. 18/115,683, mailed on Sep. 26, 2024, 14 pages.

Non-Final Office Action received for U.S. Appl. No. 18/370,833, mailed on Jan. 29, 2025, 11 pages.

Notice of Acceptance received for Australian Patent Application No. 2023251432, mailed on Jan. 17, 2025, 3 pages.

Notice of Allowance received for Chinese Patent Application No. 202080040230.4, mailed on Jul. 31, 2024, 2 pages (1 page of English Translation and 1 page of Official Copy).

Notice of Allowance received for Korean Patent Application No. 10-2023-7018399, mailed on Sep. 30, 2024, 8 pages (2 pages of English Translation and 6 pages of Official Copy).

Notice of Allowance received for U.S. Appl. No. 17/950,817, mailed on Nov. 8, 2024, 9 pages.

Notice of Allowance received for U.S. Appl. No. 17/950,817, mailed on Nov. 27, 2024, 2 pages.

Notice of Allowance received for U.S. Appl. No. 17/955,366, mailed on Dec. 16, 2024, 5 pages.

Office Action received for Australian Patent Application No. 2023251432, mailed on Nov. 13, 2024, 4 pages.

Office Action received for Japanese Patent Application No. 2022-202284, mailed on Sep. 20, 2024, 7 pages (3 pages of English Translation and 4 pages of Official Copy).

Corrected Notice of Allowance received for U.S. Appl. No. 17/955,366, mailed on Jun. 17, 2025, 2 pages.

Corrected Notice of Allowance received for U.S. Appl. No. 18/370,833, mailed on Jun. 5, 2025, 2 pages.

Notice of Allowance received for U.S. Appl. No. 17/955,366, mailed on May 30, 2025, 5 pages.

Corrected Notice of Allowance received for U.S. Appl. No. 17/950,817, mailed on Apr. 15, 2025, 2 pages.

Corrected Notice of Allowance received for U.S. Appl. No. 18/370,833, mailed on Apr. 23, 2025, 2 pages.

Applicant-Initiated Interview Summary received for U.S. Appl. No. 18/370,833, mailed on Feb. 12, 2025, 4 pages.

Notice of Allowance received for Japanese Patent Application No. 2022-202284, mailed on Feb. 7, 2025, 4 pages (1 page of English Translation and 3 pages of Official Copy).

Notice of Allowance received for Japanese Patent Application No. 2024-004643, mailed on Feb. 10, 2025, 4 pages (1 page of English Translation and 3 pages of Official Copy).

Office Action received for Japanese Patent Application No. 2024-218951, mailed on Dec. 8, 2025, 7 pages (3 pages of English Translation and 4 pages of Official Copy).

Applicant-Initiated Interview Summary received for U.S. Appl. No. 18/433,262, mailed on Nov. 10, 2025, 6 pages.

Extended European Search Report received for European Patent Application No. 25173936.3, mailed on Jul. 29, 2025, 9 pages.

Intention to Grant received for European Patent Application No. 24173644.6, mailed on Oct. 23, 2025, 9 pages.

Non-Final Office Action received for U.S. Appl. No. 18/433,262, mailed on Oct. 1, 2025, 10 pages.

Office Action received for European Patent Application No. 22157146.6, mailed on Aug. 28, 2025, 5 pages.

* cited by examiner

Portable Multifunction Device 100

206      210      212

208

200

Speaker 111      Optical Sensor 164      Proximity Sensor 166

208

210 is SIM card slot
212 is headphone jack

202

Touch Screen 112

Contact Intensity Sensor(s) 165

Tactile Output Generator(s) 167

203

Microphone 113      Home 204      Accelerometer(s) 168

External Port 124

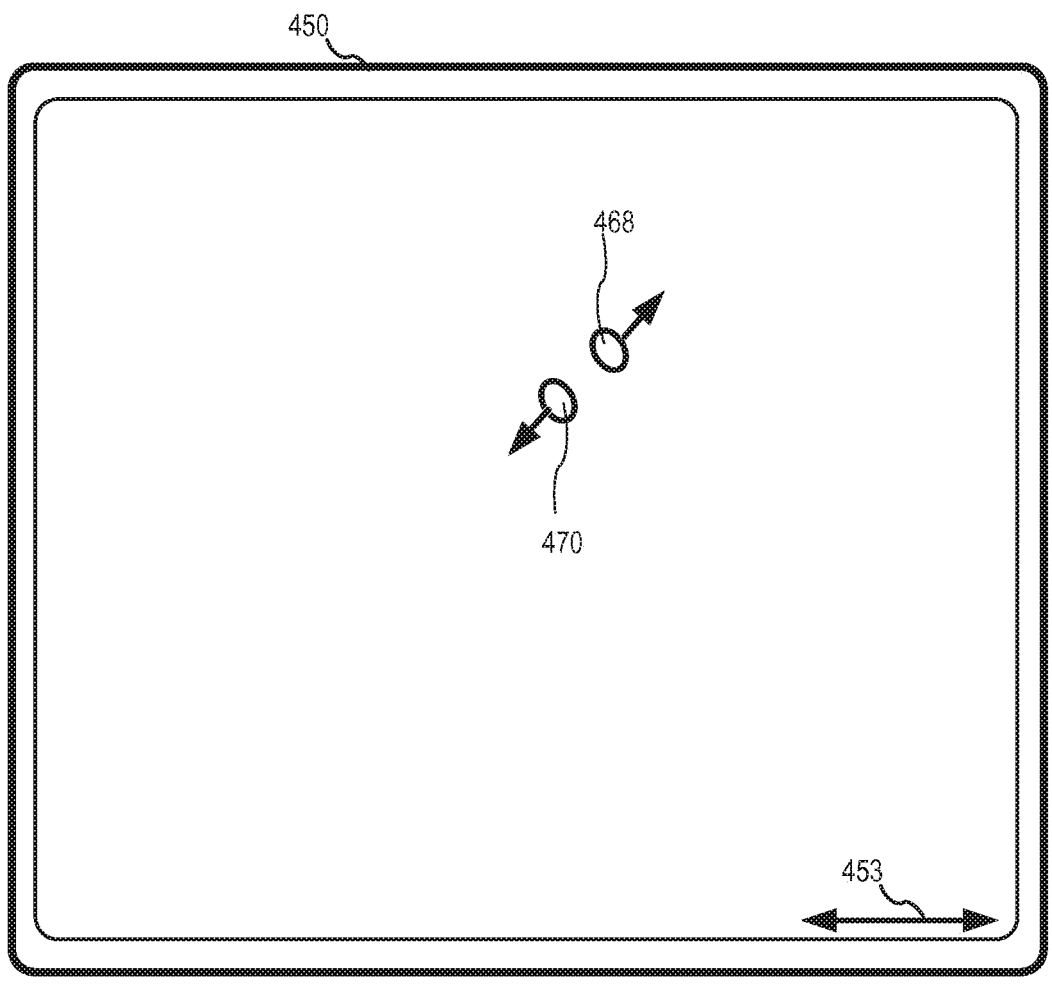
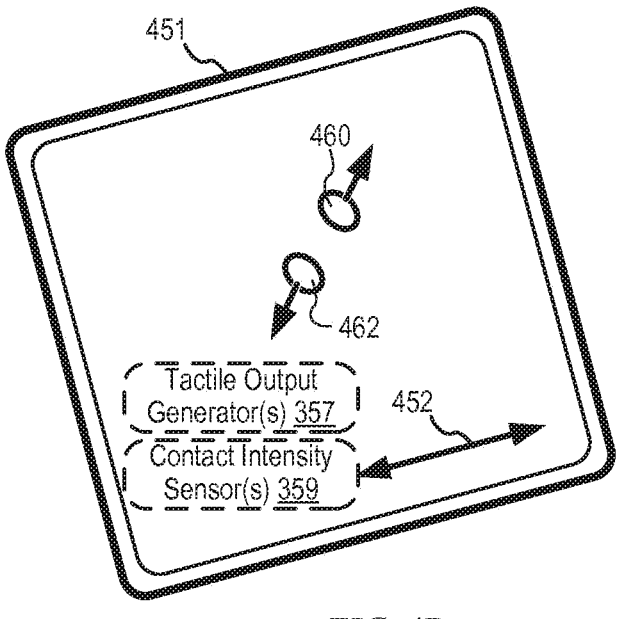
*FIG. 4B*

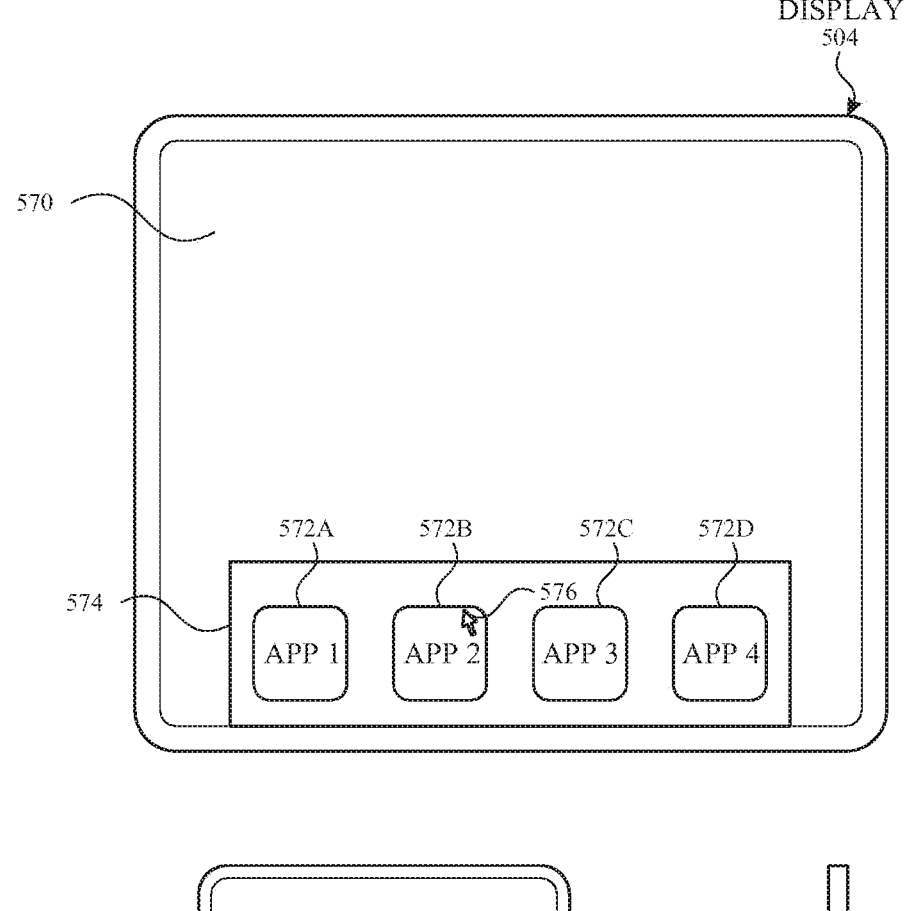
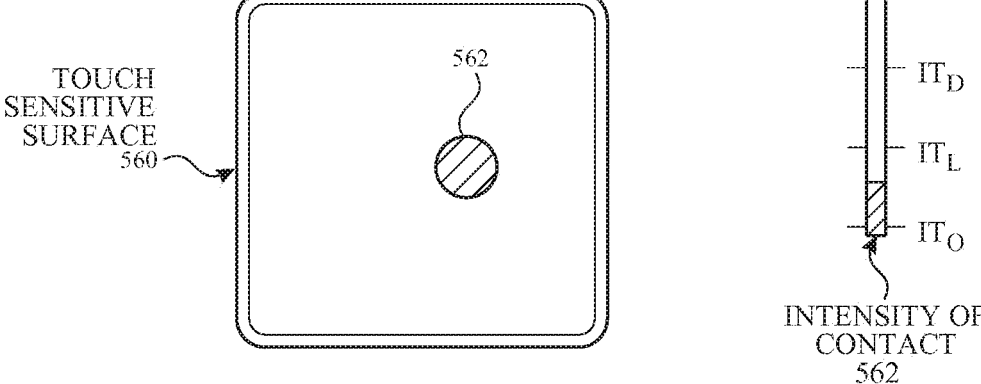
*FIG. 5E*

DISPLAY
504

570

578A    DOC 1

578B    DOC 2

578C    DOC 3

576

574    APP 1    APP 2    APP 3    APP 4

572B

TOUCH
SENSITIVE
SURFACE
560

562

$IT_D$ $IT_L$ $IT_O$

INTENSITY OF
CONTACT
562

500

500

1102          1106

500

504

602          1110

500

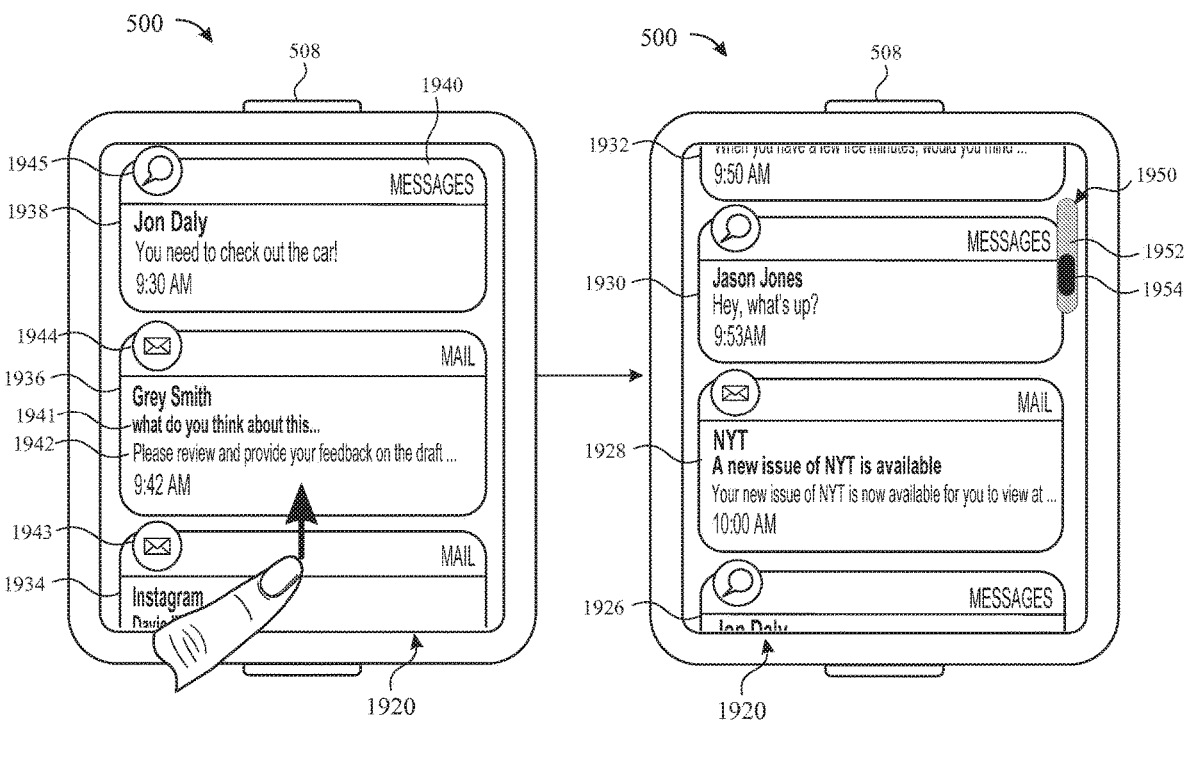
FIG. 19B                    FIG. 19C

Pick up dry cleaning

| | | |
|---|---|---|
| Jon Daly | | now |
| Have time for coffee? | | |
| Hi, when you have a chance... | | 9:58 AM |
| You need to check out the car! | | 9:30 AM |
| NYT | | 10:00 AM |
| A new issue of NYT is available | | |
| Jason Jones | | 9:53 AM |
| Hey, what's up? | | |
| Instagram | | 9:45 AM |
| Davie liked your post | | |
| Grey Smith | | 9:42 AM |
| what do you think about this... | | |

Pick up dry cleaning

| | | |
|---|---|---|
| Jon Daly | | |
| Have time for coffee? | | now |
| You need to check out the car! | | 9:50 AM |
| Hi, when you have a chance... | | 9:50 AM |
| NYT | | 10:00 AM |
| A new issue of NYT is available | | |
| Jason Jones | | 9:53 AM |
| Hey, what's up? | | |
| Instagram | | 9:45 AM |
| Davie liked your post | | |
| Grey Smith | | 9:42 AM |
| what do you think about this... | | |

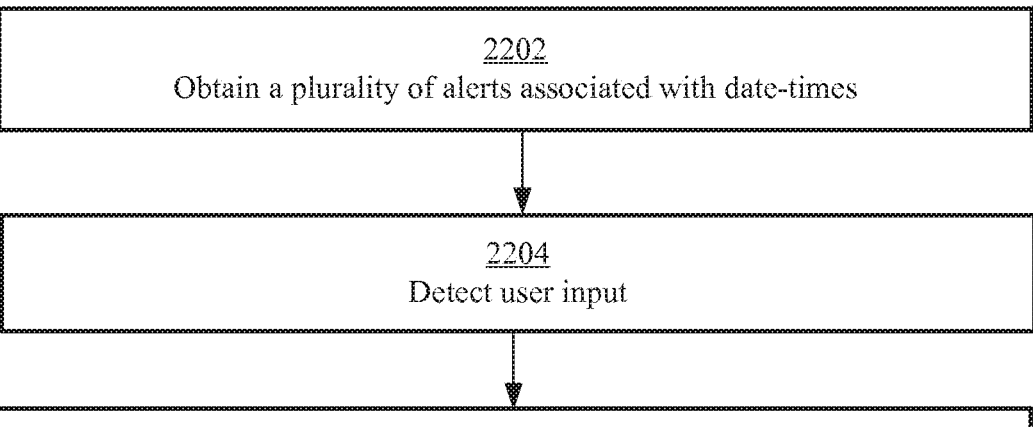

2202
Obtain a plurality of alerts associated with date-times

2204
Detect user input

2206

In response to detecting user input, obtain a current date-time, and display notification interface with a first notification representing a first alert with a date-time before the current date-time, a second notification representing a second alert with a date-time after the current date-time, and graphical separator between them, where the first and second alerts correspond to different installed applications.

Optionally, detect a second user input. In response to detecting the second user input, scroll the notification interface in accordance with the user input.

Optionally, if the graphical separator is scrolled to a boundary of the touchscreen, cease to scroll the graphical separator while continuing to scroll the additional notifications in accordance with the second user input.

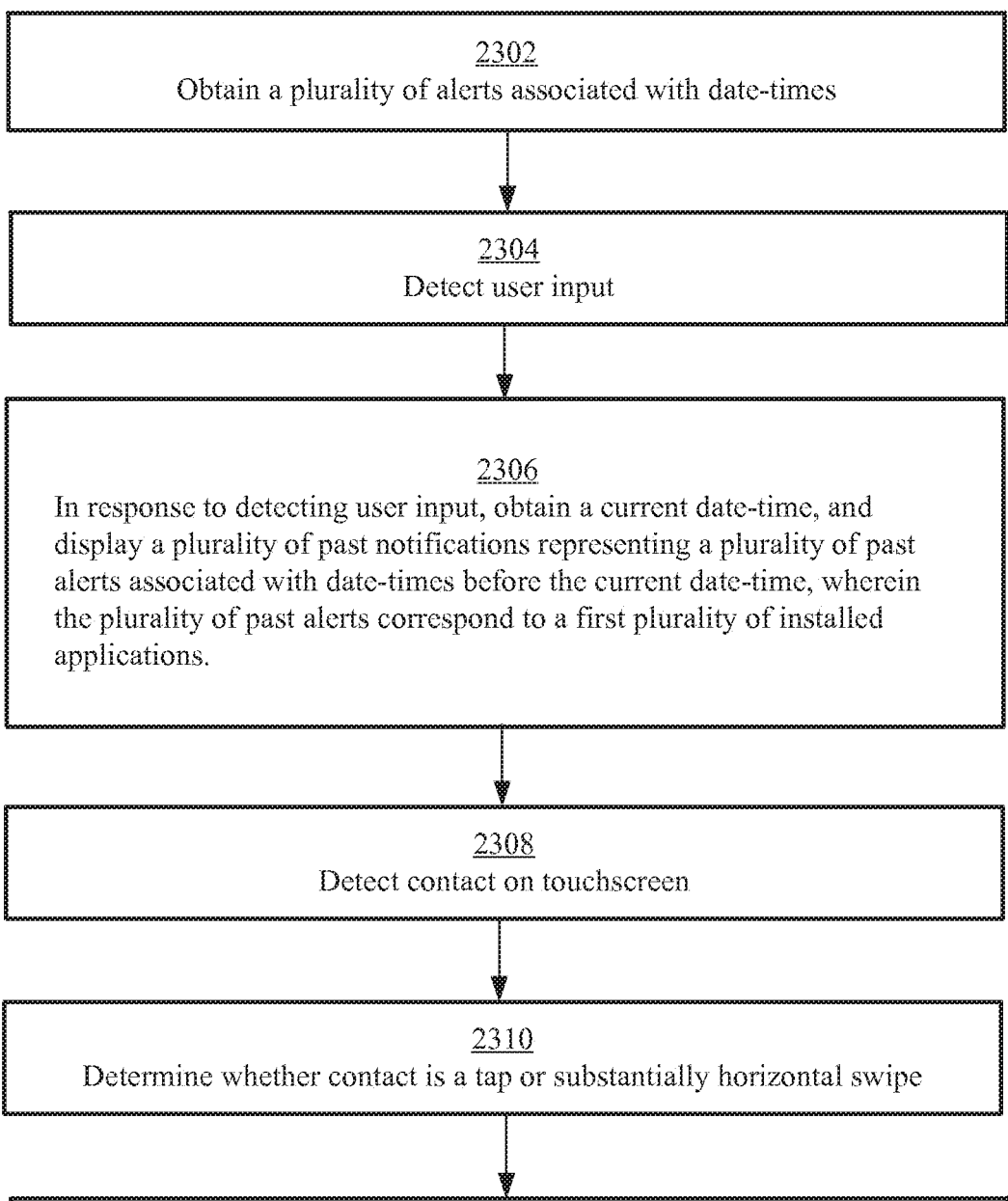

2302
Obtain a plurality of alerts associated with date-times

2304
Detect user input

2306
In response to detecting user input, obtain a current date-time, and display a plurality of past notifications representing a plurality of past alerts associated with date-times before the current date-time, wherein the plurality of past alerts correspond to a first plurality of installed applications.

2308
Detect contact on touchscreen

2310
Determine whether contact is a tap or substantially horizontal swipe

2312
In accordance with a determination that contact is a subtantially horiztonal swipe, display a plurality of future notifications representing a plurality of future alerts associated with date-times after the current date-time, wherein the plurality of future alerts correspond to a second plurality of installed applications.

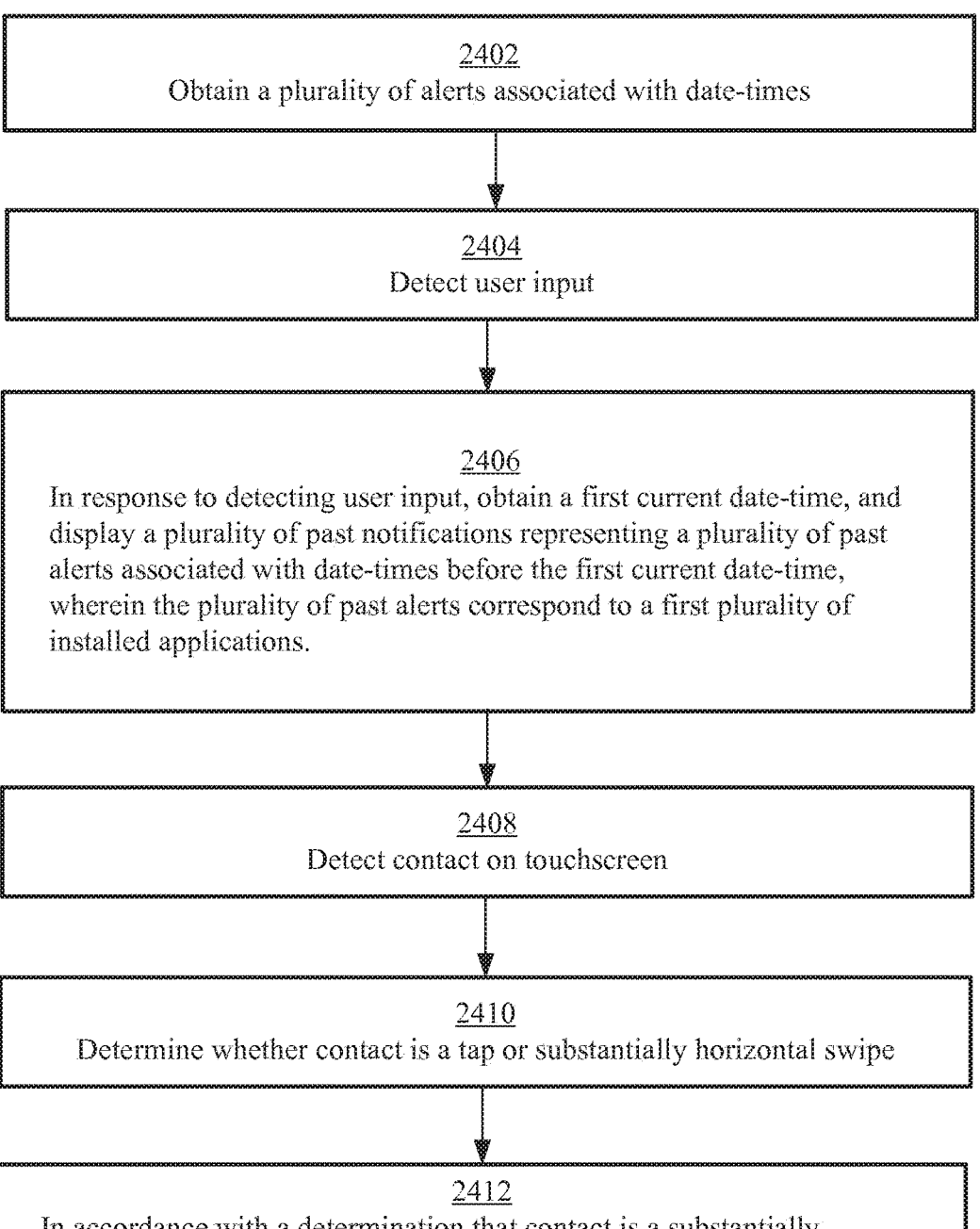

2402
Obtain a plurality of alerts associated with date-times

2404
Detect user input

2406
In response to detecting user input, obtain a first current date-time, and display a plurality of past notifications representing a plurality of past alerts associated with date-times before the first current date-time, wherein the plurality of past alerts correspond to a first plurality of installed applications.

2408
Detect contact on touchscreen

2410
Determine whether contact is a tap or substantially horizontal swipe

2412
In accordance with a determination that contact is a substantially horizontal swipe, obtain a second current date-time, and display single future notification representing the most immediate upcoming alert relative to the second current date-time.

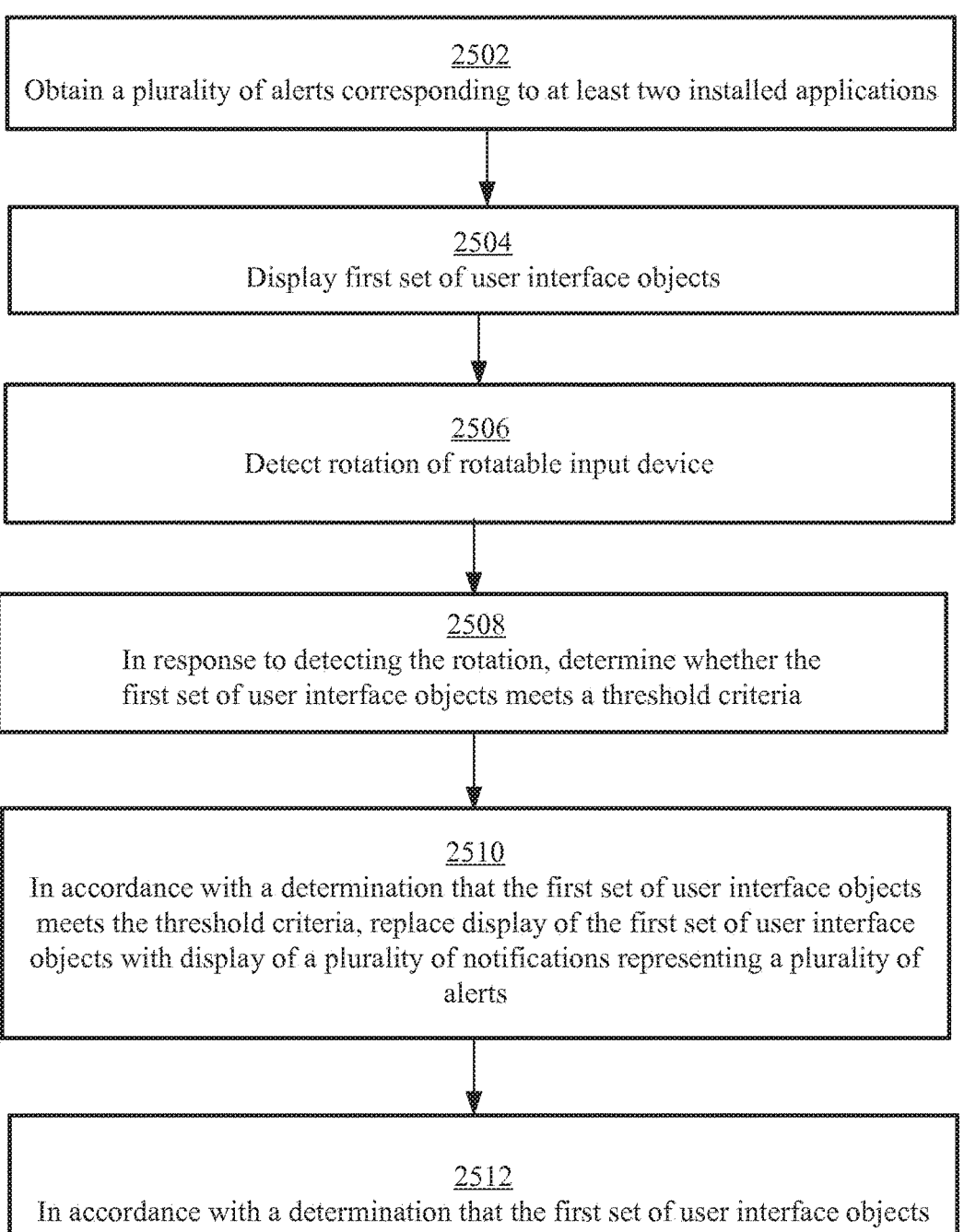

2502
Obtain a plurality of alerts corresponding to at least two installed applications 2504
Display first set of user interface objects 2506
Detect rotation of rotatable input device 2508
In response to detecting the rotation, determine whether the
first set of user interface objects meets a threshold criteria 2510
In accordance with a determination that the first set of user interface objects
meets the threshold criteria, replace display of the first set of user interface
objects with display of a plurality of notifications representing a plurality of
alerts 2512
In accordance with a determination that the first set of user interface objects
does not meet the threshold criteria, display a second set of user interface
objects, wherein the second set is larger than the first set and comprises the first
set.

Figure 32:
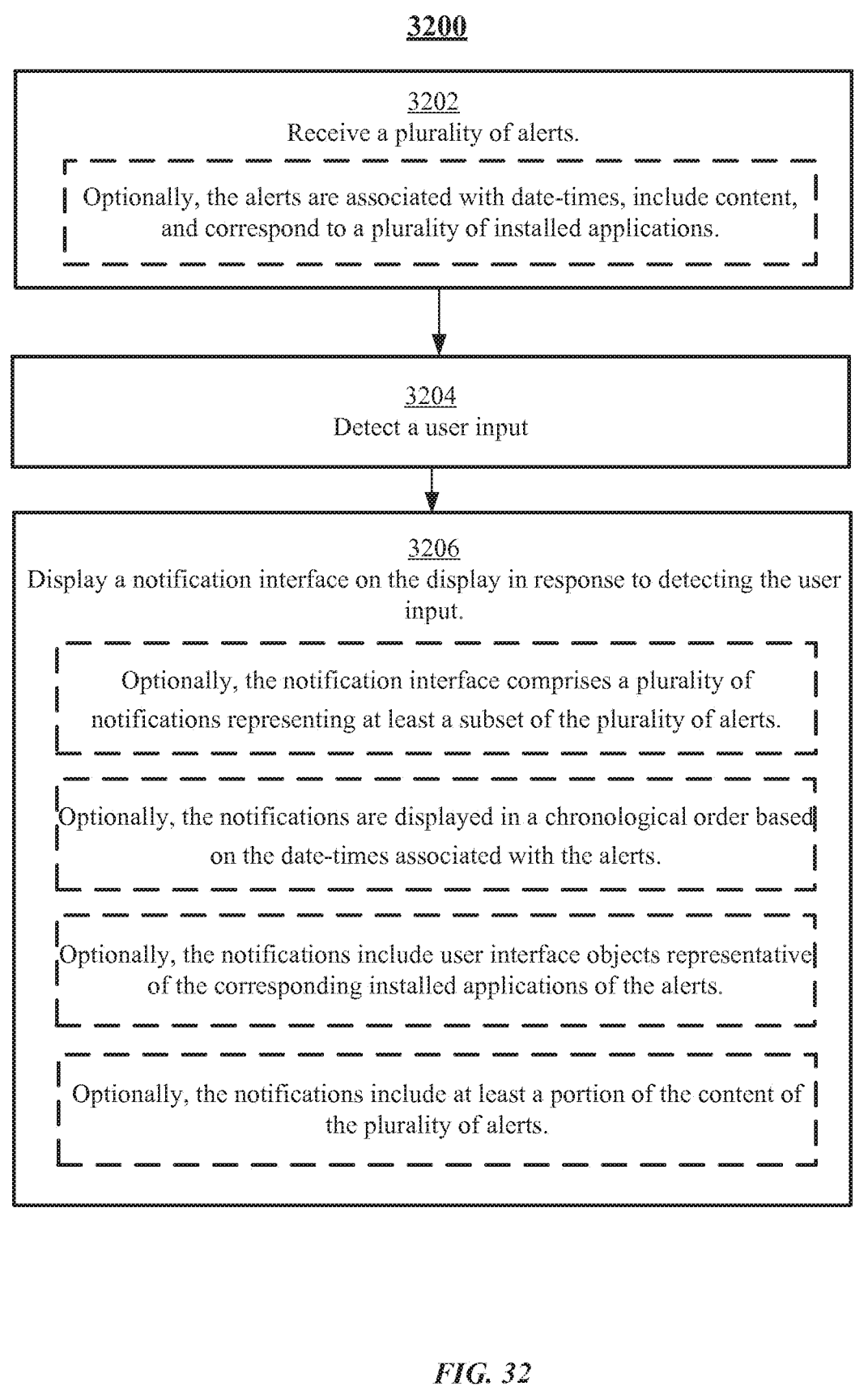

3202
Receive a plurality of alerts.

Optionally, the alerts are associated with date-times, include content, and correspond to a plurality of installed applications.

3204
Detect a user input

3206
Display a notification interface on the display in response to detecting the user input.

Optionally, the notification interface comprises a plurality of notifications representing at least a subset of the plurality of alerts.

Optionally, the notifications are displayed in a chronological order based on the date-times associated with the alerts.

Optionally, the notifications include user interface objects representative of the corresponding installed applications of the alerts.

Optionally, the notifications include at least a portion of the content of the plurality of alerts.

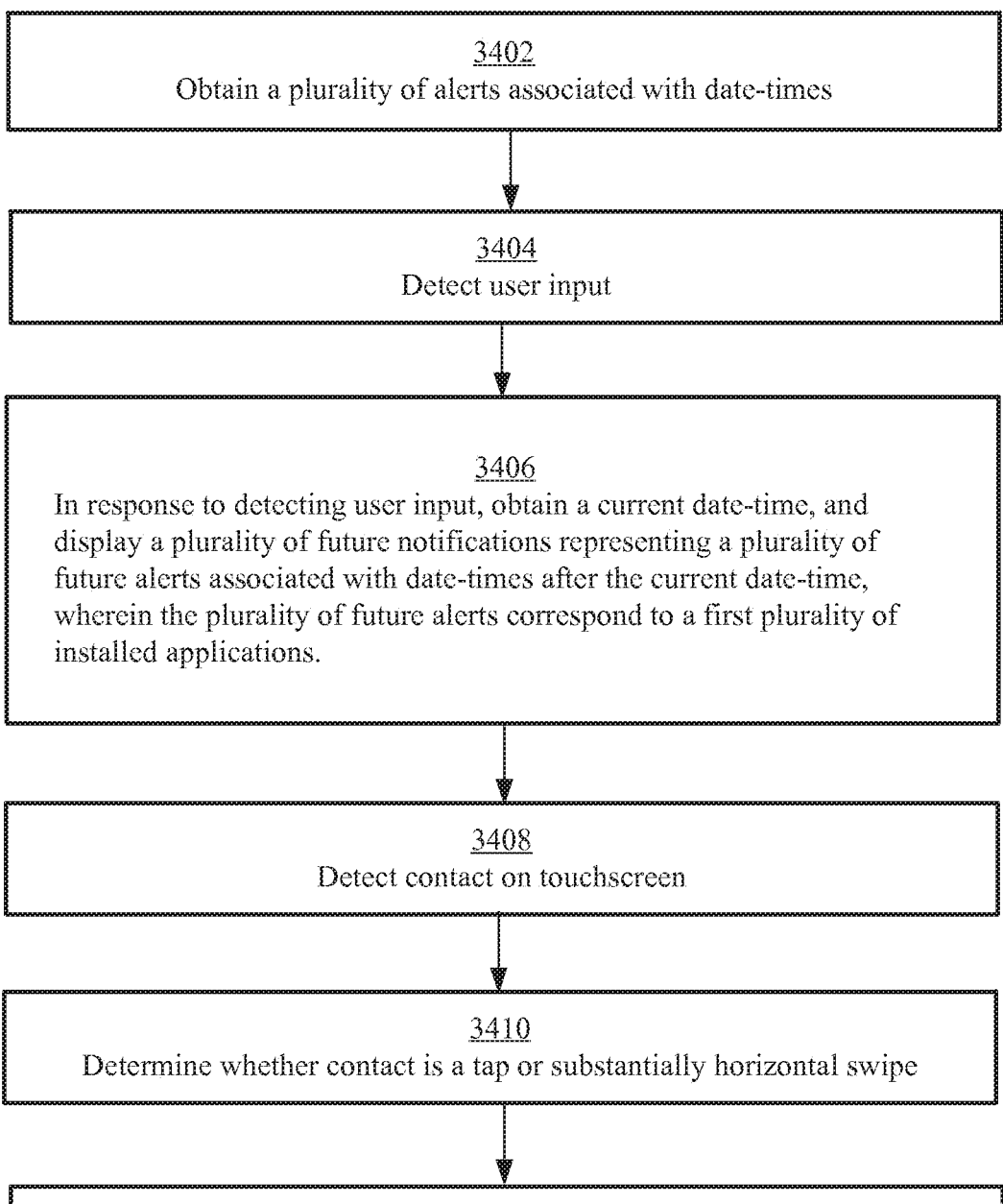

3402
Obtain a plurality of alerts associated with date-times

3404
Detect user input

3406
In response to detecting user input, obtain a current date-time, and display a plurality of future notifications representing a plurality of future alerts associated with date-times after the current date-time, wherein the plurality of future alerts correspond to a first plurality of installed applications.

3408
Detect contact on touchscreen

3410
Determine whether contact is a tap or substantially horizontal swipe

3412
In accordance with a determination that contact is a substantially horizontal swipe, display a plurality of past notifications representing a plurality of past alerts associated with date-times before the current date-time, wherein the plurality of past alerts correspond to a second plurality of installed applications.

*FIG. 34*

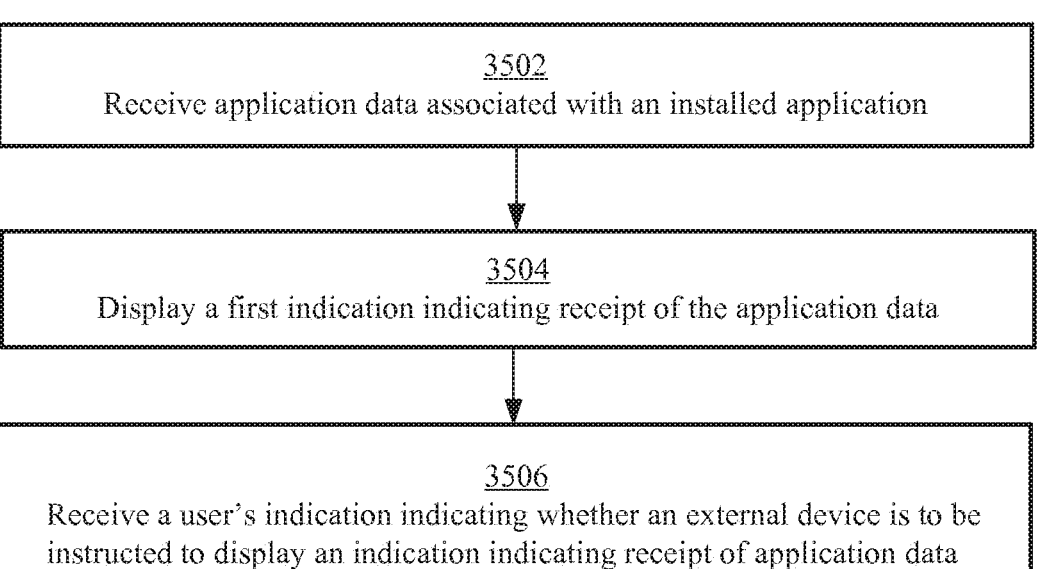

3500

3502
Receive application data associated with an installed application

3504
Display a first indication indicating receipt of the application data

3506
Receive a user's indication indicating whether an external device is to be instructed to display an indication indicating receipt of application data associated with the installed application 3508
In response to the user's indication to instruct the external device, send data to the external device, where the data causes the external device to display a second indication indicating receipt of the application data

*FIG. 35*

REDUCED-SIZE NOTIFICATION INTERFACE

CROSS-REFERENCE TO RELATED APPLICATIONS

This application is a continuation of U.S. patent application Ser. No. 14/838,263 entitled "Reduced-Size Notification Interface" filed on Aug. 27, 2015, which claims priority to U.S. Provisional Patent Application Ser. No. 62/044,953, entitled "Reduced-Size Notification Interface," filed on Sep. 2, 2014, and to U.S. Provisional Application Ser. No. 62/129,924, entitled "Reduced-Size Notification Interface," filed on Mar. 8, 2015. The content of these applications is hereby incorporated by reference for all purposes.

This application relates to U.S. Provisional Patent Application Ser. No. 62/044,894 entitled "Reduced-Size Interfaces for Managing Alerts," filed Sep. 2, 2014; U.S. Provisional Patent Application Ser. No. 62/129,818 entitled "Reduced-Size Interfaces for Managing Alerts," filed Mar. 7, 2015; U.S. Provisional Patent Application Ser. No. 62/044,990 entitled "Physical Activity and Workout Monitor," filed Sep. 2, 2014; U.S. Provisional Patent Application Ser. No. 62/129,828 entitled "Physical Activity and Workout Monitor," filed Mar. 7, 2015; U.S. patent application Ser. No. 14/475,446 entitled "Coordination of Message Alert Presentations Across Devices Based on Device Modes," filed Sep. 2, 2014; U.S. patent application Ser. No. 14/475,471 entitled "Message Processing By Subscriber App Prior To Message Forwarding," filed Sep. 2, 2014; International Patent Application Serial No. PCT/US2013/040061, entitled "Device, Method, and Graphical User Interface for Displaying User Interface Objects Corresponding to an Application," filed May 8, 2013 and International Patent Application Serial No. PCT/US2013/069483, entitled "Device, Method, and Graphical User Interface for Transitioning Between Touch Input to Display Output Relationships," filed Nov. 11, 2013. The contents of these applications are hereby incorporated by reference in their entirety.

FIELD

The disclosed examples relate generally to user interfaces of electronic devices, and more specifically to techniques for displaying and managing alert notifications.

BACKGROUND

Reduced-size electronic devices (e.g., devices that are smaller than typical cellular phones) that are designed to be worn by a user can conveniently display notifications for a wide variety of alerts, such as calendar alerts, emails, clock alarms, stock market alerts, and text messages. The relatively small screen size of a reduced-size electronic device may limit the amount of information that can be comfortably viewed, however, thus limiting the number of notifications that can be displayed on a single screen and increasing the importance of prioritizing display of relevant information.

SUMMARY

In accordance with some embodiments, a method is performed at an electronic device with a touch-sensitive display. The method includes: obtaining a plurality of alerts associated with date-times; detecting a user input; in response to detecting the user input: obtaining a current date-time, and displaying a notification interface on the display, the notification interface comprising: a first notification representing a first alert of the plurality of alerts associated with a date-time after the current date-time, a second notification representing a second alert of the plurality of alerts associated with a date-time before the current date-time, and a graphical separator between the first notification and the second notification, wherein the graphical separator comprises an indication of the current date-time, wherein the first alert and the second alert correspond to different installed applications.

In accordance with some embodiments, a method is performed at an electronic device with a touch-sensitive display. The method includes: obtaining a plurality of alerts associated with date-times; detecting a first user input; in response to detecting the first user input: obtaining a first current date-time, and displaying a plurality of past notifications representing a plurality of past alerts from the plurality of alerts, wherein the plurality of past alerts are associated with date-times before the current date-time, and wherein the plurality of past alerts correspond to a first plurality of installed applications; detecting a contact on the touch-sensitive display; determining whether the contact is a tap or a substantially horizontal swipe; in response to a determination that the contact is a substantially horizontal swipe: obtaining a second current date-time, and displaying a plurality of future notifications representing a plurality of future alerts from the plurality of alerts, wherein the plurality of future alerts are associated with date-times after the second current date-time, and wherein the plurality of future alerts correspond to a second plurality of installed applications.

In accordance with some embodiments, a method is performed at an electronic device with a touch-sensitive display. The method includes: obtaining a plurality of alerts associated with date-times; detecting a first user input; in response to detecting the first user input: obtaining a first current date-time; displaying a plurality of future notifications representing a plurality of future alerts from the plurality of alerts, wherein the plurality of future alerts are associated with date-times after the first current date-time, and wherein the plurality of future alerts correspond to a first plurality of installed applications; detecting a contact on the display; determining whether the contact is a tap or a substantially horizontal swipe; in accordance with a determination that the contact is a substantially horizontal swipe: obtaining a second current date-time; and displaying a plurality of past notifications representing a plurality of past alerts from the plurality of alerts, wherein the plurality of past alerts are associated with date-times before the second current date-time, and wherein the plurality of past alerts correspond to a second plurality of installed applications.

In accordance with some embodiments, a method is performed at an electronic device with a touch-sensitive display. The method includes: obtaining a plurality of alerts associated with date-times; detecting a first user input; in response to detecting the first user input: obtaining a first current date-time; displaying a plurality of future notifications representing a plurality of future alerts from the plurality of alerts, wherein the plurality of future alerts are associated with date-times after the first current date-time, and wherein the plurality of future alerts correspond to a first plurality of installed applications; detecting a contact on the display; determining whether the contact is a tap or a substantially horizontal swipe; in accordance with a determination that the contact is a substantially horizontal swipe: obtaining a second current date-time; and displaying a plurality of past notifications representing a plurality of past alerts from the plurality of alerts, wherein the plurality of past alerts are associated with date-times before the second current date-time, and wherein the plurality of past alerts correspond to a second plurality of installed applications.

In accordance with some embodiments, a method is performed at an electronic device with a touch-sensitive display and a rotatable input mechanism. The method includes: obtaining a plurality of alerts; displaying a first set of user interface objects; detecting a rotation of the rotatable input mechanism; in response to detecting the rotation: determining whether the first set of user interface objects meets a threshold criteria; in accordance with a determination that the first set of user interface objects meets the threshold criteria, replacing display of the first set of user interface objects with display of a plurality of notifications representing at least a subset of the plurality of alerts; and in accordance with a determination that the first set of user interface objects does not meet the threshold criteria, displaying a second set of user interface objects, wherein the second set is larger than the first set and comprises the first set.

In accordance with some embodiments, a method is performed at an electronic device with a touch-sensitive display, the electronic device having an installed application, the electronic device configured to communicate wirelessly with an external device. The method includes: receiving application data associated with the installed application: displaying, on the touch-sensitive display of the electronic device, a first indication indicating receipt of the application data; receiving a user's indication indicating whether the electronic device is to instruct the external device to display an indication indicating receipt, by the electronic device, of application data associated with the installed application; and in response to the user's indication to instruct the external device: sending data to the external device, wherein the data causes the external device to display a second indication indicating receipt of the application data.

In accordance with some embodiments, a method is performed at an electronic device with a touch-sensitive display. The method includes: receiving a plurality of alerts, wherein the alerts are associated with date-times, wherein the alerts include content, and wherein the alerts correspond to a plurality of installed applications; detecting a user input; and in response to detecting the user input, displaying a notification interface on the display, the notification interface comprising a plurality of notifications representing at least a subset of the plurality of alerts, wherein the notifications are displayed in a chronological order based on the date-times associated with the alerts, and wherein the notifications include user interface objects representative of the corresponding installed applications of the alerts, and wherein the notifications include at least a portion of the content of the plurality of alerts.

In accordance with some embodiments, a non-transitory computer-readable storage medium storing one or more programs comprising instructions is disclosed. The instructions, when executed by one or more processors of an electronic device with a touch-sensitive display cause the electronic device to: obtain a plurality of alerts associated with date-times; detect a user input; in response to detecting the user input: obtain a current date-time, and display a notification interface on the display, the notification interface comprising: a first notification representing a first alert of the plurality of alerts associated with a date-time after the current date-time, a second notification representing a second alert of the plurality of alerts associated with a date-time before the current date-time, and a graphical separator between the first notification and the second notification, wherein the graphical separator comprises an indication of the current date-time, wherein the first alert and the second alert correspond to different installed applications.

In accordance with some embodiments, a non-transitory computer-readable storage medium storing one or more programs comprising instructions is disclosed. The instructions, when executed by one or more processors of an electronic device with a touch-sensitive display cause the electronic device to: obtain a plurality of alerts associated with date-times; detect a first user input; in response to detecting the first user input: obtain a first current date-time, and display a plurality of past notifications representing a plurality of past alerts from the plurality of alerts, wherein the plurality of past alerts are associated with date-times before the current date-time, and wherein the plurality of past alerts correspond to a first plurality of installed applications; detect a contact on the touch-sensitive display; determine whether the contact is a tap or a substantially horizontal swipe; in response to a determination that the contact is a substantially horizontal swipe: obtain a second current date-time, and display a plurality of future notifications representing a plurality of future alerts from the plurality of alerts, wherein the plurality of future alerts are associated with date-times after the second current date-time, and wherein the plurality of future alerts correspond to a second plurality of installed applications.

In accordance with some embodiments, a non-transitory computer-readable storage medium storing one or more programs comprising instructions is disclosed. The instructions, when executed by one or more processors of an electronic device with a touch-sensitive display cause the electronic device to: obtain a plurality of alerts associated with date-times; detect a first user input; in response to detecting the first user input: obtain a first current date-time; display a plurality of future notifications representing a plurality of future alerts from the plurality of alerts, wherein the plurality of future alerts are associated with date-times after the first current date-time, and wherein the plurality of future alerts correspond to a first plurality of installed applications; detect a contact on the display; determine whether the contact is a tap or a substantially horizontal swipe; in accordance with a determination that the contact is a substantially horizontal swipe: obtain a second current date-time; and display a plurality of past notifications representing a plurality of past alerts from the plurality of alerts, wherein the plurality of past alerts are associated with date-times before the second current date-time, and wherein the plurality of past alerts correspond to a second plurality of installed applications.

In accordance with some embodiments, a non-transitory computer-readable storage medium storing one or more programs comprising instructions is disclosed. The instructions, when executed by one or more processors of an electronic device with a touch-sensitive display cause the electronic device to: obtain a plurality of alerts associated with date-times; detect a first user input; in response to detecting the first user input: obtain a first current date-time; display a plurality of future notifications representing a plurality of future alerts from the plurality of alerts, wherein the plurality of future alerts are associated with date-times after the first current date-time, and wherein the plurality of future alerts correspond to a first plurality of installed applications; detect a contact on the display; determine whether the contact is a tap or a substantially horizontal swipe; in accordance with a determination that the contact is a substantially horizontal swipe: obtain a second current date-time; and display a plurality of past notifications representing a plurality of past alerts from the plurality of alerts, wherein the plurality of past alerts are associated with date-times before the second current date-time, and wherein the plurality of past alerts correspond to a second plurality of installed applications.

In accordance with some embodiments, a non-transitory computer-readable storage medium storing one or more programs comprising instructions is disclosed. The instructions, when executed by one or more processors of an electronic device with a touch-sensitive display and a rotatable input mechanism cause the electronic device to: obtain a plurality of alerts; display a first set of user interface objects; detect a rotation of the rotatable input mechanism; in response to detecting the rotation: determine whether the first set of user interface objects meets a threshold criteria; in accordance with a determination that the first set of user interface objects meets the threshold criteria, replace display of the first set of user interface objects with display of a plurality of notifications representing at least a subset of the plurality of alerts; and in accordance with a determination that the first set of user interface objects does not meet the threshold criteria, display a second set of user interface objects, wherein the second set is larger than the first set and comprises the first set.

In accordance with some embodiments, a non-transitory computer-readable storage medium storing one or more programs comprising instructions is disclosed. The instructions, when executed by one or more processors of an electronic device with a touch-sensitive display, the electronic device having an installed application, the electronic device configured to communicate wirelessly with an external device, cause the electronic device to: receive application data associated with the installed application; display, on the touch-sensitive display of the electronic device, a first indication indicating receipt of the application data; receive a user's indication indicating whether the electronic device is to instruct the external device to display an indication indicating receipt, by the electronic device, of application data associated with the installed application; and in response to the user's indication to instruct the external device: send data to the external device, wherein the data causes the external device to display a second indication indicating receipt of the application data.

In accordance with some embodiments, a non-transitory computer-readable storage medium storing one or more programs comprising instructions is disclosed. The instructions, when executed by one or more processors of an electronic device with a touch-sensitive display cause the electronic device to: receive a plurality of alerts, wherein the alerts are associated with date-times, wherein the alerts include content, and wherein the alerts correspond to a plurality of installed applications: detect a user input: and in response to detecting the user input, display a notification interface on the display, the notification interface comprising a plurality of notifications representing at least a subset of the plurality of alerts, wherein the notifications are displayed in a chronological order based on the date-times associated with the alerts, and wherein the notifications include user interface objects representative of the corresponding installed applications of the alerts, and wherein the notifications include at least a portion of the content of the plurality of alerts.

In accordance with some embodiments, a transitory computer-readable storage medium storing one or more programs comprising instructions is disclosed. The instructions, when executed by one or more processors of an electronic device with a touch-sensitive display cause the electronic device to: obtain a plurality of alerts associated with date-times; detect a user input; in response to detecting the user input: obtain a current date-time, and display a notification interface on the display, the notification interface comprising: a first notification representing a first alert of the plurality of alerts associated with a date-time after the current date-time, a second notification representing a second alert of the plurality of alerts associated with a date-time before the current date-time, and a graphical separator between the first notification and the second notification, wherein the graphical separator comprises an indication of the current date-time, wherein the first alert and the second alert correspond to different installed applications.

In accordance with some embodiments, a transitory computer-readable storage medium storing one or more programs comprising instructions is disclosed. The instructions, when executed by one or more processors of an electronic device with a touch-sensitive display cause the electronic device to: obtain a plurality of alerts associated with date-times; detect a first user input; in response to detecting the first user input: obtain a first current date-time, and display a plurality of past notifications representing a plurality of past alerts from the plurality of alerts, wherein the plurality of past alerts are associated with date-times before the current date-time, and wherein the plurality of past alerts correspond to a first plurality of installed applications; detect a contact on the touch-sensitive display; determine whether the contact is a tap or a substantially horizontal swipe; in response to a determination that the contact is a substantially horizontal swipe: obtain a second current date-time, and display a plurality of future notifications representing a plurality of future alerts from the plurality of alerts, wherein the plurality of future alerts are associated with date-times after the second current date-time, and wherein the plurality of future alerts correspond to a second plurality of installed applications.

In accordance with some embodiments, a transitory computer-readable storage medium storing one or more programs comprising instructions is disclosed. The instructions, when executed by one or more processors of an electronic device with a touch-sensitive display cause the electronic device to: obtain a plurality of alerts associated with date-times; detect a first user input; in response to detecting the first user input: obtain a first current date-time; display a plurality of future notifications representing a plurality of future alerts from the plurality of alerts, wherein the plurality of future alerts are associated with date-times after the first current date-time, and wherein the plurality of future alerts correspond to a first plurality of installed applications; detect a contact on the display; determine whether the contact is a tap or a substantially horizontal swipe; in accordance with a determination that the contact is a substantially horizontal swipe: obtain a second current date-time; and display a plurality of past notifications representing a plurality of past alerts from the plurality of alerts, wherein the plurality of past alerts are associated with date-times before the second current date-time, and wherein the plurality of past alerts correspond to a second plurality of installed applications.

In accordance with some embodiments, a transitory computer-readable storage medium storing one or more programs comprising instructions is disclosed. The instructions, when executed by one or more processors of an electronic device with a touch-sensitive display cause the electronic device to: obtain a plurality of alerts associated with date-times; detect a first user input; in response to detecting the first user input: obtain a first current date-time; display a plurality of future notifications representing a plurality of future alerts from the plurality of alerts, wherein the plurality of future alerts are associated with date-times after the first current date-time, and wherein the plurality of future alerts correspond to a first plurality of installed applications; detect a contact on the display; determine whether the contact is a tap or a substantially horizontal swipe; in accordance with a determination that the contact is a substantially horizontal swipe: obtain a second current date-time; and display a plurality of past notifications representing a plurality of past alerts from the plurality of alerts, wherein the plurality of past alerts are associated with date-times before the second current date-time, and wherein the plurality of past alerts correspond to a second plurality of installed applications.

In accordance with some embodiments, a transitory computer-readable storage medium storing one or more programs comprising instructions is disclosed. The instructions, when executed by one or more processors of an electronic device with a touch-sensitive display and a rotatable input mechanism cause the electronic device to: obtain a plurality of alerts; display a first set of user interface objects; detect a rotation of the rotatable input mechanism; in response to detecting the rotation: determine whether the first set of user interface objects meets a threshold criteria; in accordance with a determination that the first set of user interface objects meets the threshold criteria, replace display of the first set of user interface objects with display of a plurality of notifications representing at least a subset of the plurality of alerts; and in accordance with a determination that the first set of user interface objects does not meet the threshold criteria, display a second set of user interface objects, wherein the second set is larger than the first set and comprises the first set.

In accordance with some embodiments, a transitory computer-readable storage medium storing one or more programs comprising instructions is disclosed. The instructions, when executed by one or more processors of an electronic device with a touch-sensitive display, the electronic device having an installed application, the electronic device configured to communicate wirelessly with an external device, cause the electronic device to: receive application data associated with the installed application; display, on the touch-sensitive display of the electronic device, a first indication indicating receipt of the application data; receive a user's indication indicating whether the electronic device is to instruct the external device to display an indication indicating receipt, by the electronic device, of application data associated with the installed application; and in response to the user's indication to instruct the external device: send data to the external device, wherein the data causes the external device to display a second indication indicating receipt of the application data.

In accordance with some embodiments, a transitory computer-readable storage medium storing one or more programs comprising instructions is disclosed. The instructions, when executed by one or more processors of an electronic device with a touch-sensitive display cause the electronic device to: receive a plurality of alerts, wherein the alerts are associated with date-times, wherein the alerts include content, and wherein the alerts correspond to a plurality of installed applications: detect a user input: and in response to detecting the user input, display a notification interface on the display, the notification interface comprising a plurality of notifications representing at least a subset of the plurality of alerts, wherein the notifications are displayed in a chronological order based on the date-times associated with the alerts, and wherein the notifications include user interface objects representative of the corresponding installed applications of the alerts, and wherein the notifications include at least a portion of the content of the plurality of alerts.

In some embodiments, an electronic device comprising a touch-sensitive display can obtain a plurality of alerts associated with date-times. The device can detect a user input, and in response to detecting the user input, the device can obtain a current date-time and display a notification interface on the display, the notification interface comprising: a first notification representing a first alert of the plurality of alerts associated with a date-time after the current date-time, a second notification representing a second alert of the plurality of alerts associated with a date-time before the current date-time, and a graphical separator between the first notification and the second notification, wherein the graphical separator comprises an indication of the current date-time, wherein the first alert and the second alert correspond to different installed applications.

In some embodiments, an electronic device comprising a touch-sensitive display can obtain a plurality of alerts associated with date-times. The device can detect a first user input, and in response to detecting the first user input, obtain a first current date-time and display a plurality of past notifications representing a plurality of past alerts from the plurality of alerts, wherein the plurality of past alerts are associated with date-times before the current date-time, and wherein the plurality of past alerts correspond to a first plurality of installed applications. The device can detect a contact on the touch-sensitive display, and determine whether the contact is a tap or a substantially horizontal swipe. In response to a determination that the contact is a substantially horizontal swipe, the device can obtain a second current date-time, and display a plurality of future notifications representing a plurality of future alerts from the plurality of alerts, wherein the plurality of future alerts are associated with date-times after the second current date-time, and wherein the plurality of future alerts correspond to a second plurality of installed applications.

In some embodiments, an electronic device comprising a touch-sensitive display can obtain a plurality of alerts associated with date-times. The device can detect a first user input, and in response to detecting the first user input, obtain a first current date-time and display a plurality of future notifications representing a plurality of future alerts from the plurality of alerts, wherein the plurality of future alerts are associated with date-times after the first current date-time, and wherein the plurality of future alerts correspond to a first plurality of installed applications. The device can detect a contact on the display, and determine whether the contact is a tap or a substantially horizontal swipe. In accordance with a determination that the contact is a substantially horizontal swipe, the device can obtain a second current date-time and display a plurality of past notifications representing a plurality of past alerts from the plurality of alerts, wherein the plurality of past alerts are associated with date-times before the second current date-time, and wherein the plurality of past alerts correspond to a second plurality of installed applications.

In some embodiments, an electronic device comprising a touch-sensitive display can obtain a plurality of alerts associated with date-times. The device can detect a first user input, and in response to detecting the first user input, obtain a first current date-time and display a plurality of past notifications representing a plurality of past alerts from the plurality of alerts, wherein the plurality of past alerts are associated with date-times before the first current date-time, and wherein the plurality of past alerts correspond to a first plurality of installed applications. The device can detect a contact on the display, and determine whether the contact is a tap or a substantially horizontal swipe. In accordance with a determination that the contact is a substantially horizontal swipe, the device can obtain a second current date-time, and display a single future notification representing the most immediate upcoming alert in the plurality of alerts relative to the second current date-time.

In some embodiments, an electronic device comprising a touch-sensitive display and a rotatable input mechanism can obtain a plurality of alerts, and display a first set of user interface objects. The device can detect a rotation of the rotatable input mechanism, and in response to detecting the rotation, the device can determine whether the first set of user interface objects meets a threshold criteria. In accordance with a determination that the first set of user interface objects meets the threshold criteria, the device can replace display of the first set of user interface objects with display of a plurality of notifications representing at least a subset of the plurality of alerts. In accordance with a determination that the first set of user interface objects does not meet the threshold criteria, the device can display a second set of user interface objects, wherein the second set is larger than the first set and comprises the first set.

In some embodiments, an electronic device comprising a touch-sensitive display and having an installed application, where the electronic device is configured to communicate wirelessly with an external device, can receive application data associated with the installed application. The device can display, on the touch-sensitive display of the electronic device, a first indication indicating receipt of the application data. The device can receive a user's indication indicating whether the electronic device is to instruct the external device to display an indication indicating receipt, by the electronic device, of application data associated with the installed application. In response to the user's indication to instruct the external device, the device can send data to the external device, wherein the data causes the external device to display a second indication indicating receipt of the application data.

In some embodiments, at an electronic device with a touch-sensitive display can receive a plurality of alerts, where the alerts are associated with date-times, include content, and correspond to a plurality of installed applications. The device can detect a user input and, in response to detecting the user input, display a notification interface on the display. The notification interface can include a plurality of notifications representing at least a subset of the plurality of alerts, where the notifications are displayed in a chronological order based on the date-times associated with the alerts. The notifications include user interface objects representative of the corresponding installed applications of the alerts and include at least a portion of the content of the plurality of alerts.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5E-5H illustrate detection of a gesture having an intensity of contact.

FIGS. 6-21B illustrate exemplary user interfaces for displaying notifications.

FIGS. 22-25 are flow diagrams illustrating exemplary processes for displaying a notification interface.

FIG. 32 is a flow diagram illustrating an exemplary process for displaying a notification interface.

FIGS. 34-35 are flow diagrams illustrating exemplary processes for displaying a notification interface.

DESCRIPTION OF EMBODIMENTS

Figure 1A:
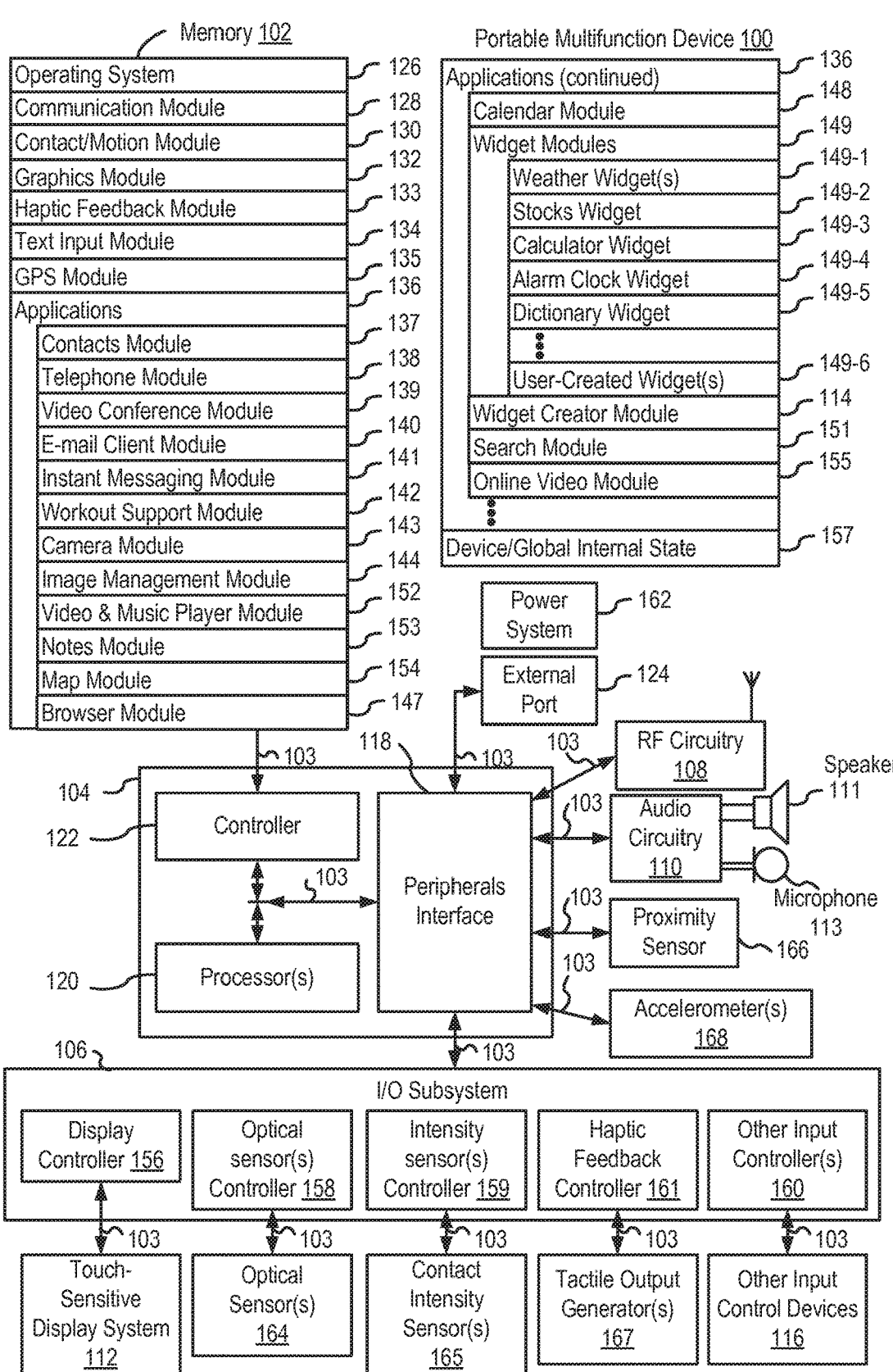
FIG. 1A is a block diagram illustrating a portable multifunction device with a touch-sensitive display in accordance with some embodiments.

The following description sets forth exemplary methods, parameters and the like. It should be recognized, however, that such description is not intended as a limitation on the scope of the present disclosure but is instead provided as a description of exemplary embodiments.

There is a need for electronic devices that provide efficient notification interfaces to a user. For example, ease of use for viewing and managing notifications for alerts corresponding to a variety of applications can increase user efficiency. Such techniques can reduce the cognitive burden on a user who uses notifications, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing notifications. FIGS. 6-21B illustrate exemplary user interfaces for notifications. The user interfaces in the figures are also used to illustrate the processes described below, including the processes in FIGS. 22-25, 32, and 34-35.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 2005/0190059, "Acceleration-based Theft Detection System for Portable Electronic Devices," and U.S. Patent Publication No. 2006/0017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
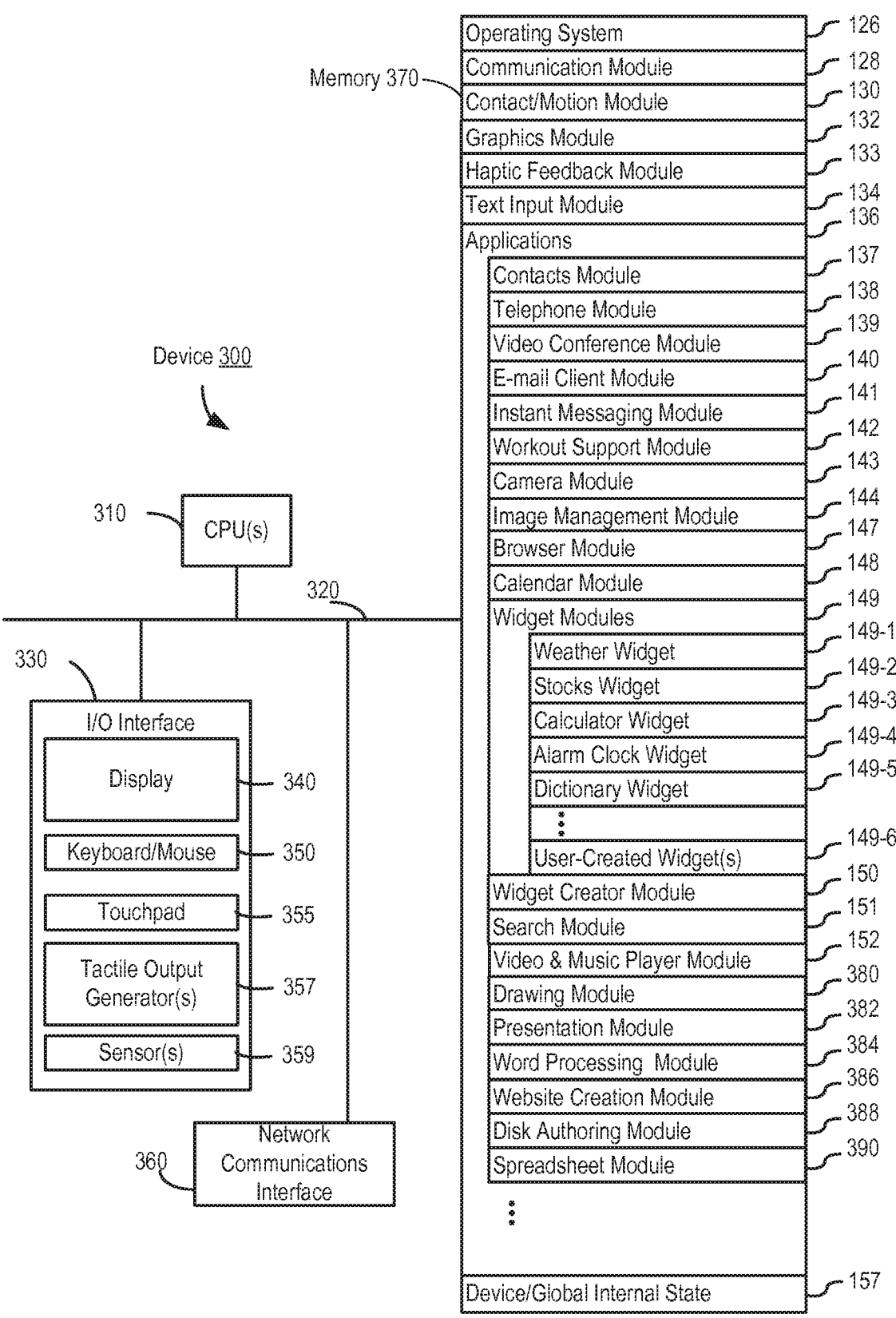
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112: sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book: deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
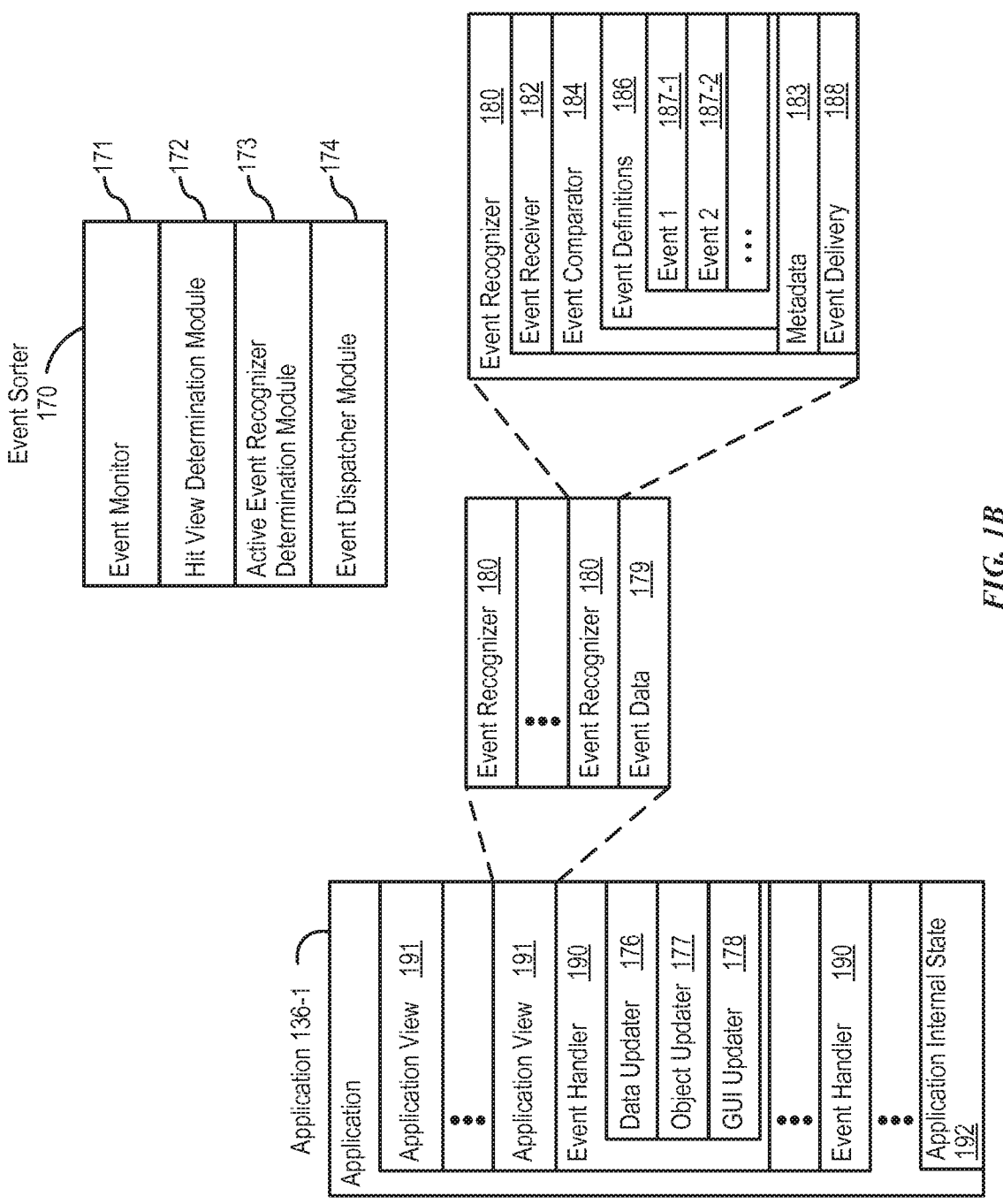
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions: detected eye movements; biometric inputs; and/or any combination thereof are optionally utilized as inputs corresponding to sub-events which define an event to be recognized.

Figure 2:
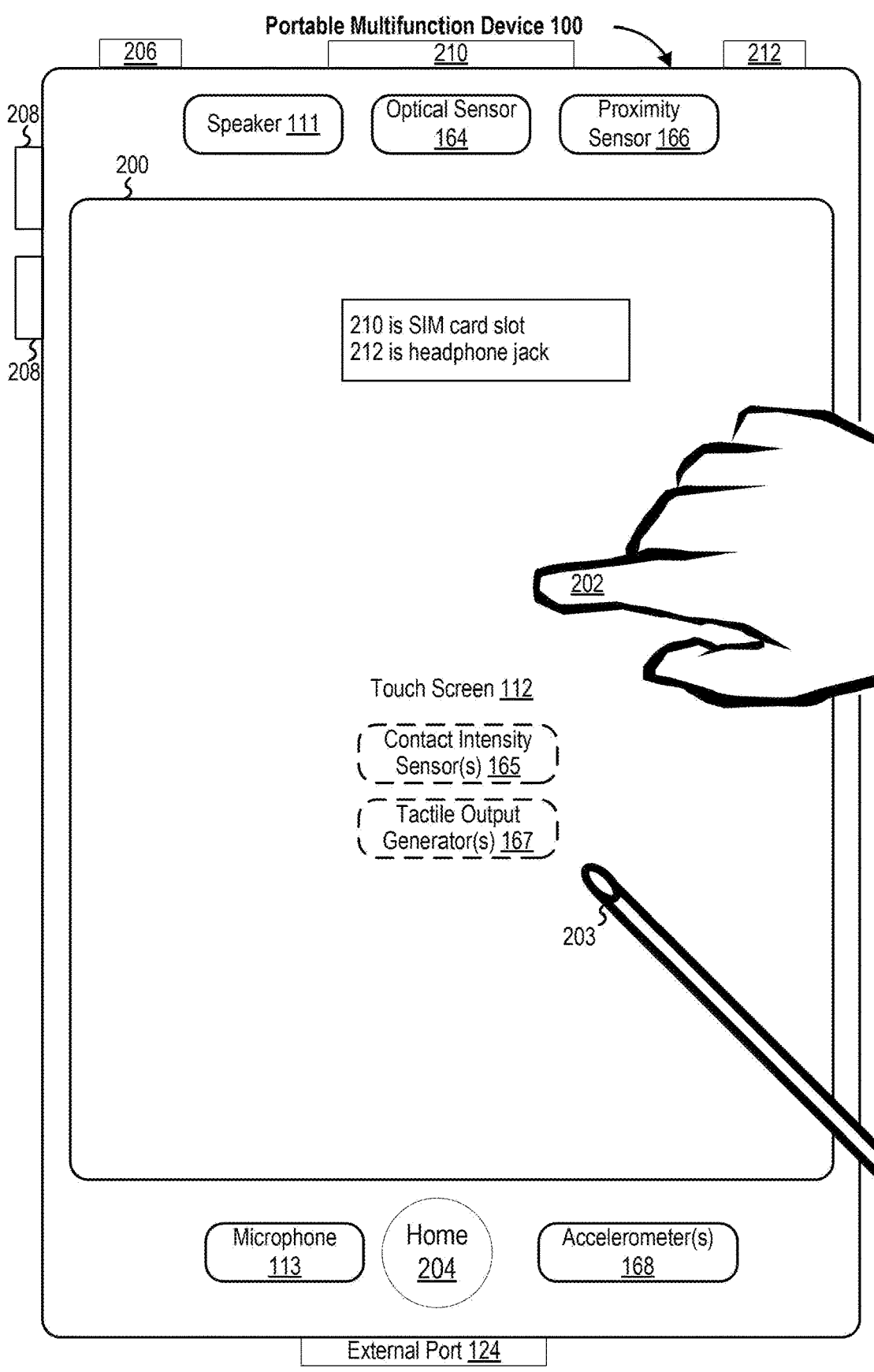
FIG. 2 illustrates a portable multifunction device having a touchscreen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, subscriber identity module (SIM) cardslot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
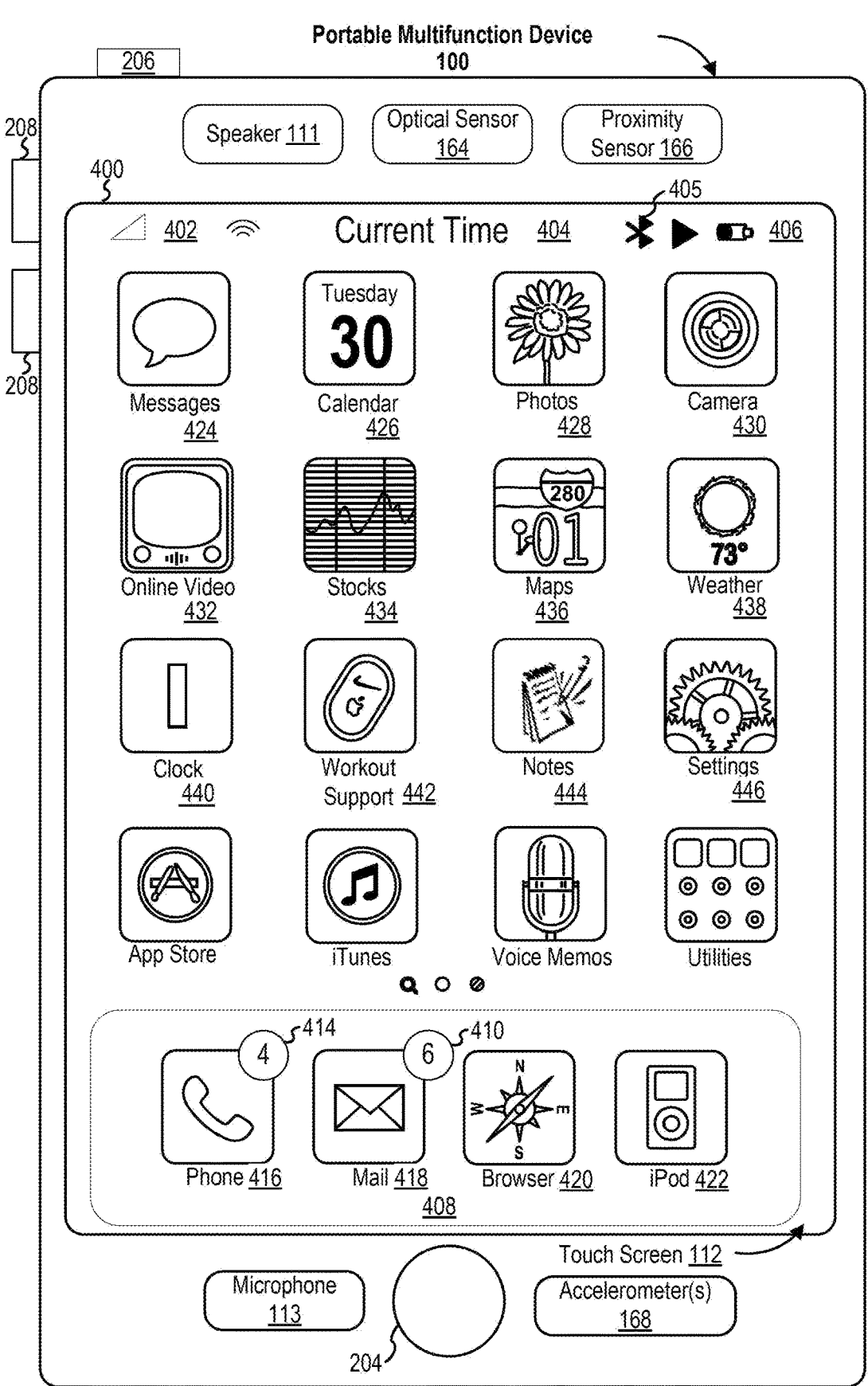
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather,"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
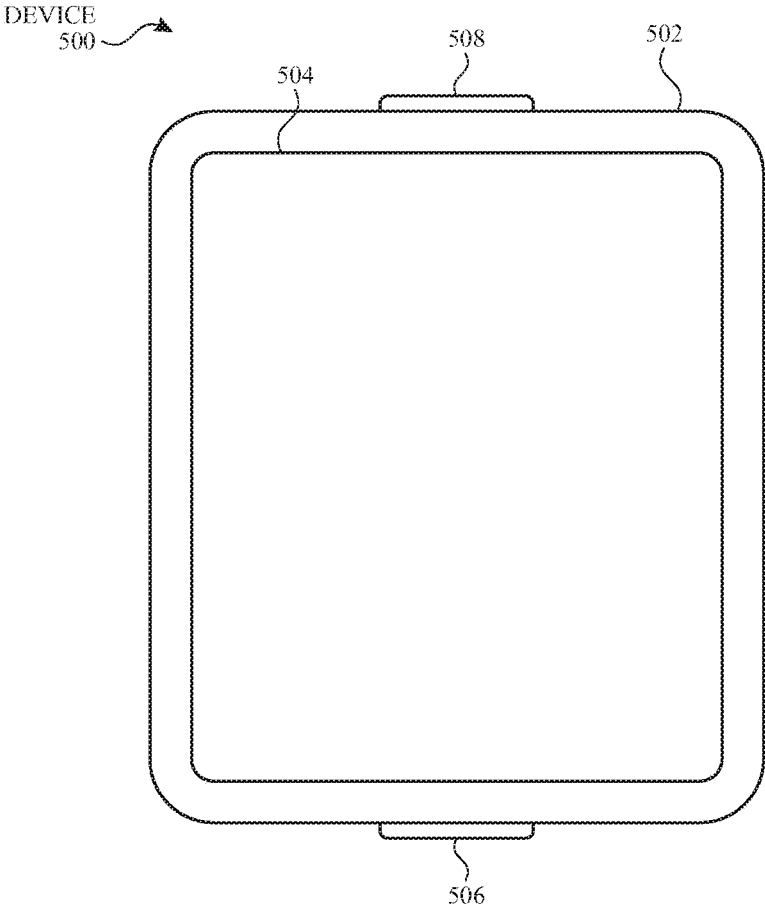
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touchscreen 504. Alternatively, or in addition to touchscreen 504, device 500 has a display and a touch-sensitive surface. As with devices 100 and 300, in some embodiments, touchscreen 504 (or the touch-sensitive surface) may have one or more intensity sensors for detecting intensity of contacts (e.g., touches) being applied. The one or more intensity sensors of touchscreen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013 and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
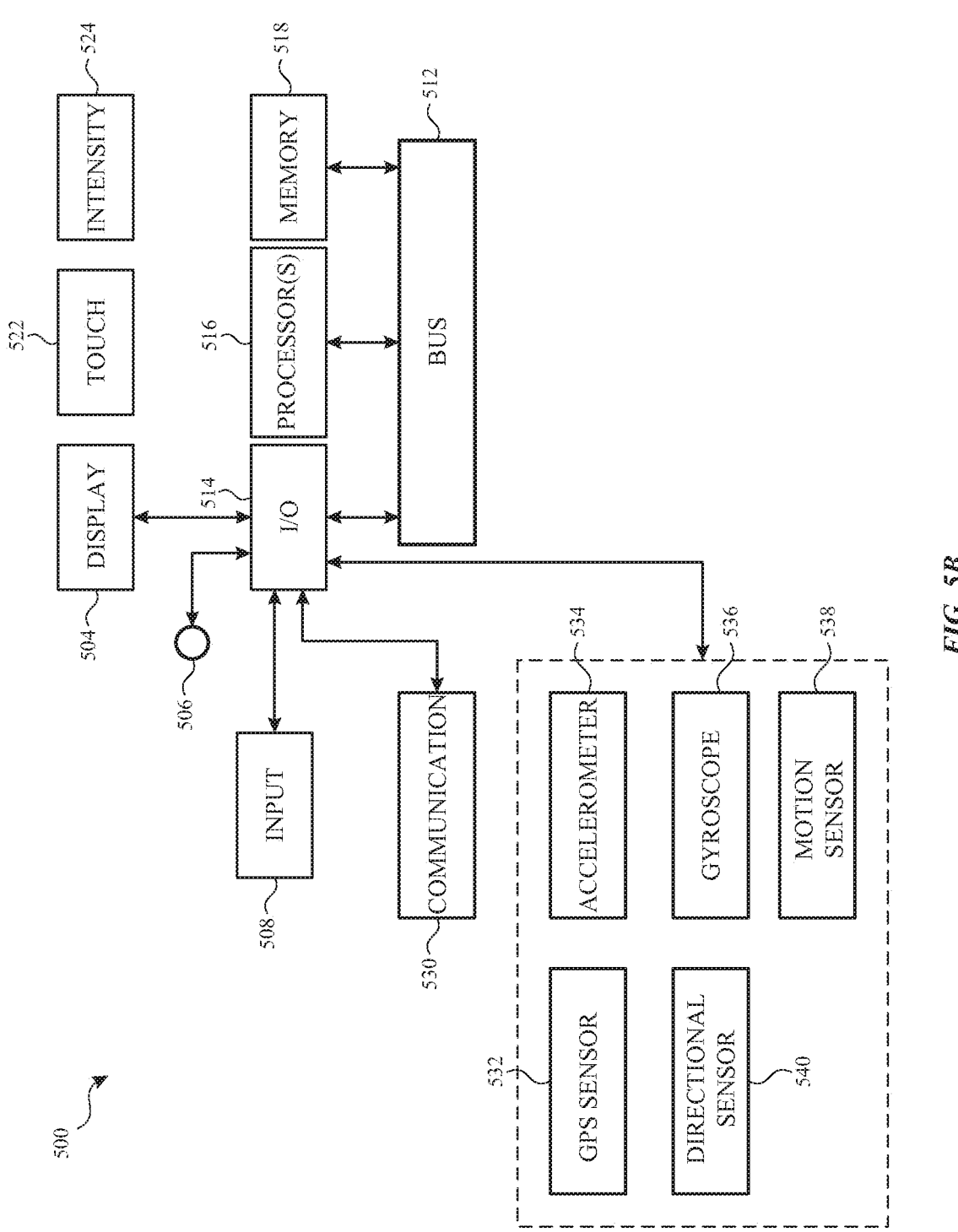
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth™, near field communication (NFC), cellular and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 2200-2500 (FIGS. 22-25). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

Figure 5C:
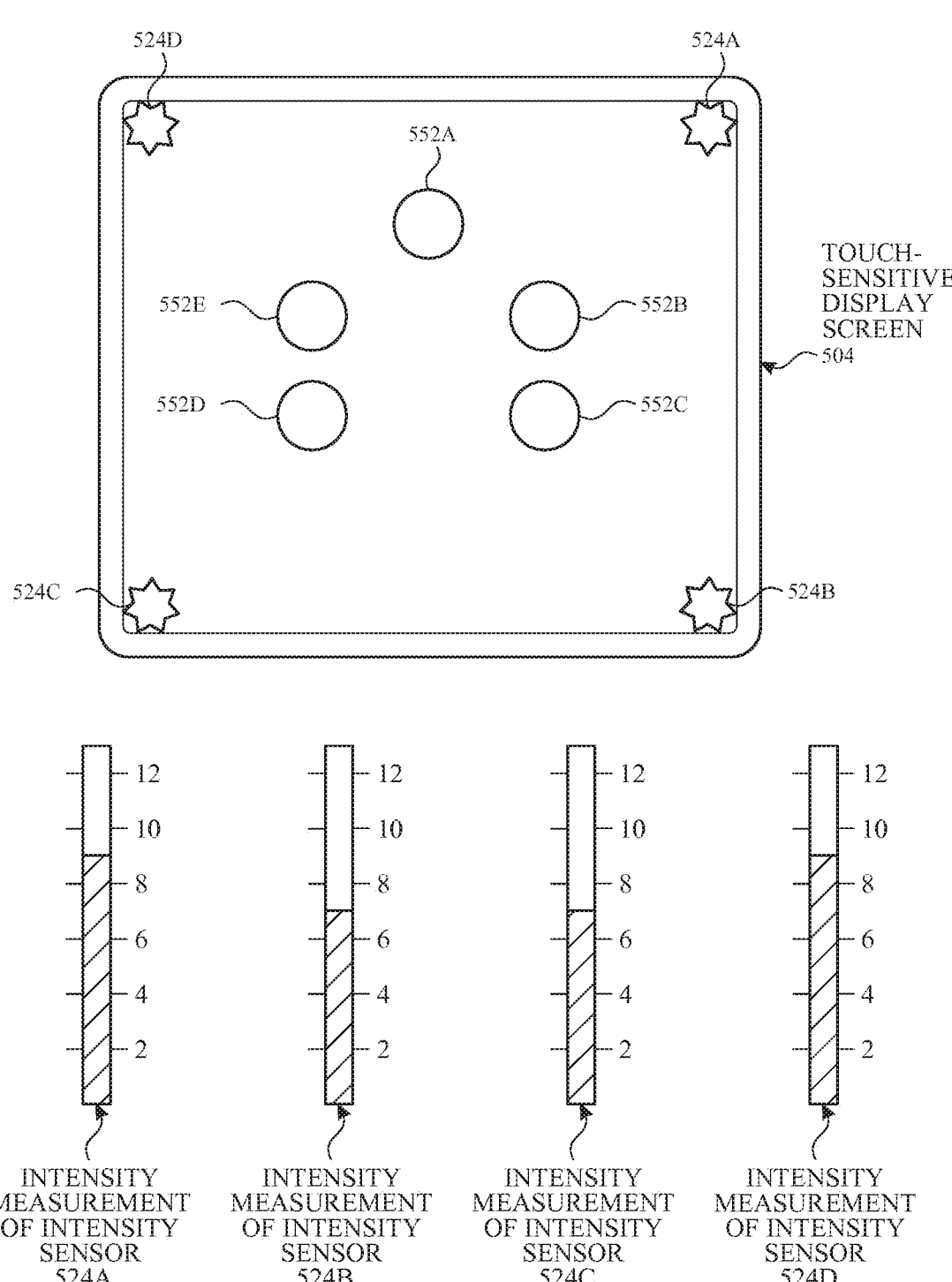
FIG. 5C illustrates detection of contacts with intensity sensors.
Figure 5D:
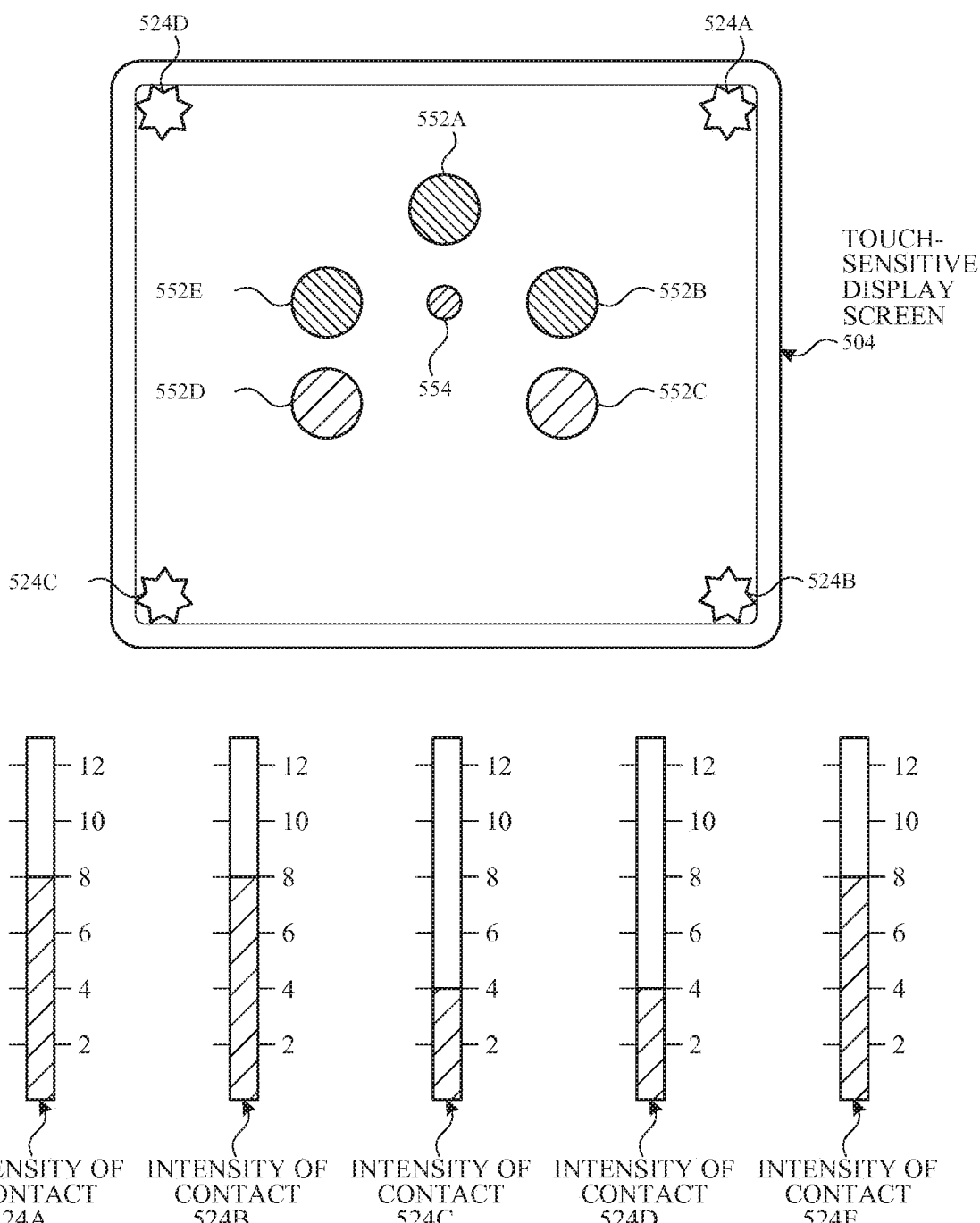
FIG. 5D illustrates assigning an aggregate intensity to contacts.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of an unweighted sliding-average smoothing algorithm, a triangular smoothing algorithm, a median filter smoothing algorithm, and/or an exponential smoothing algorithm. In some circumstances, these smoothing algorithms may eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5F:
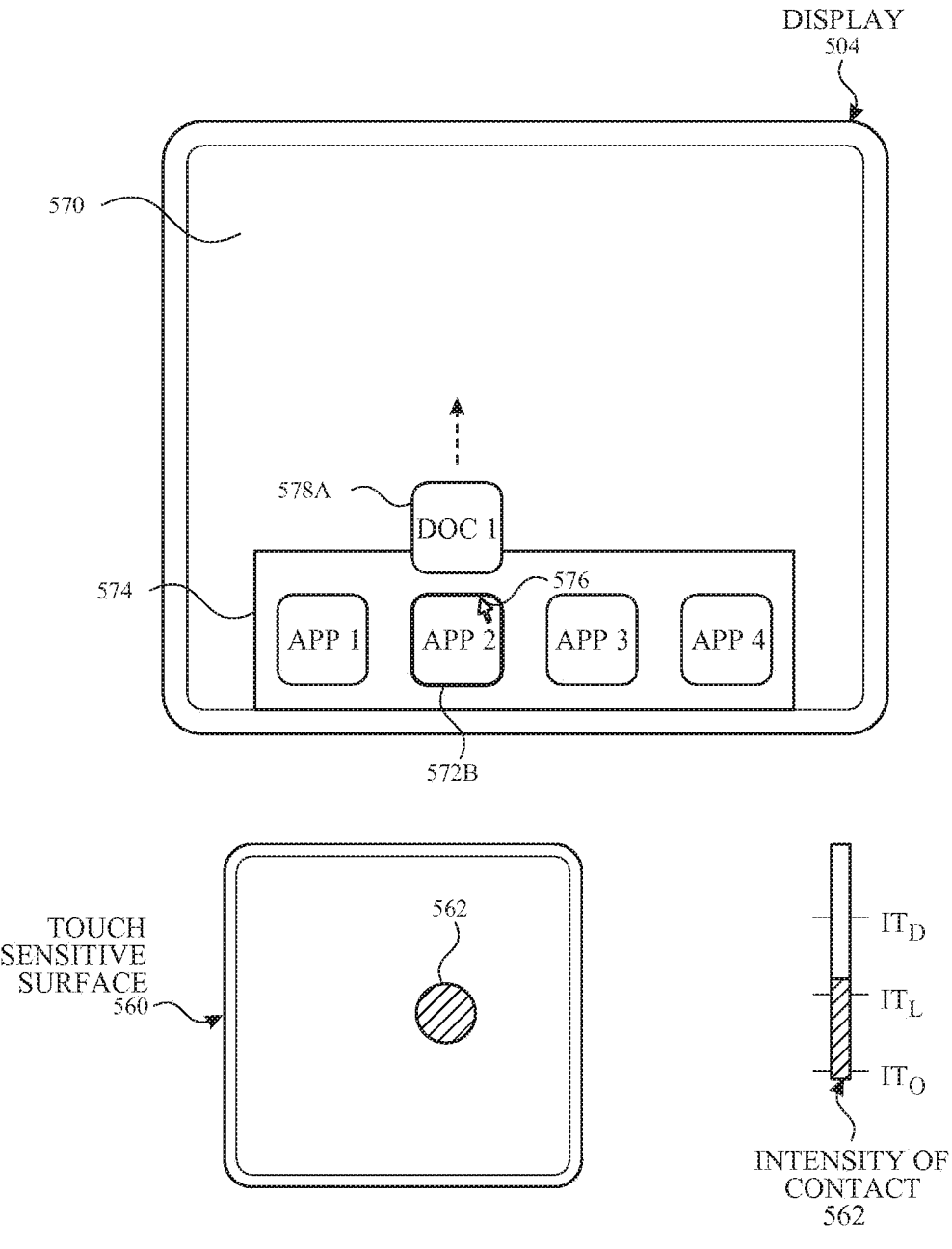
Figure 5G:
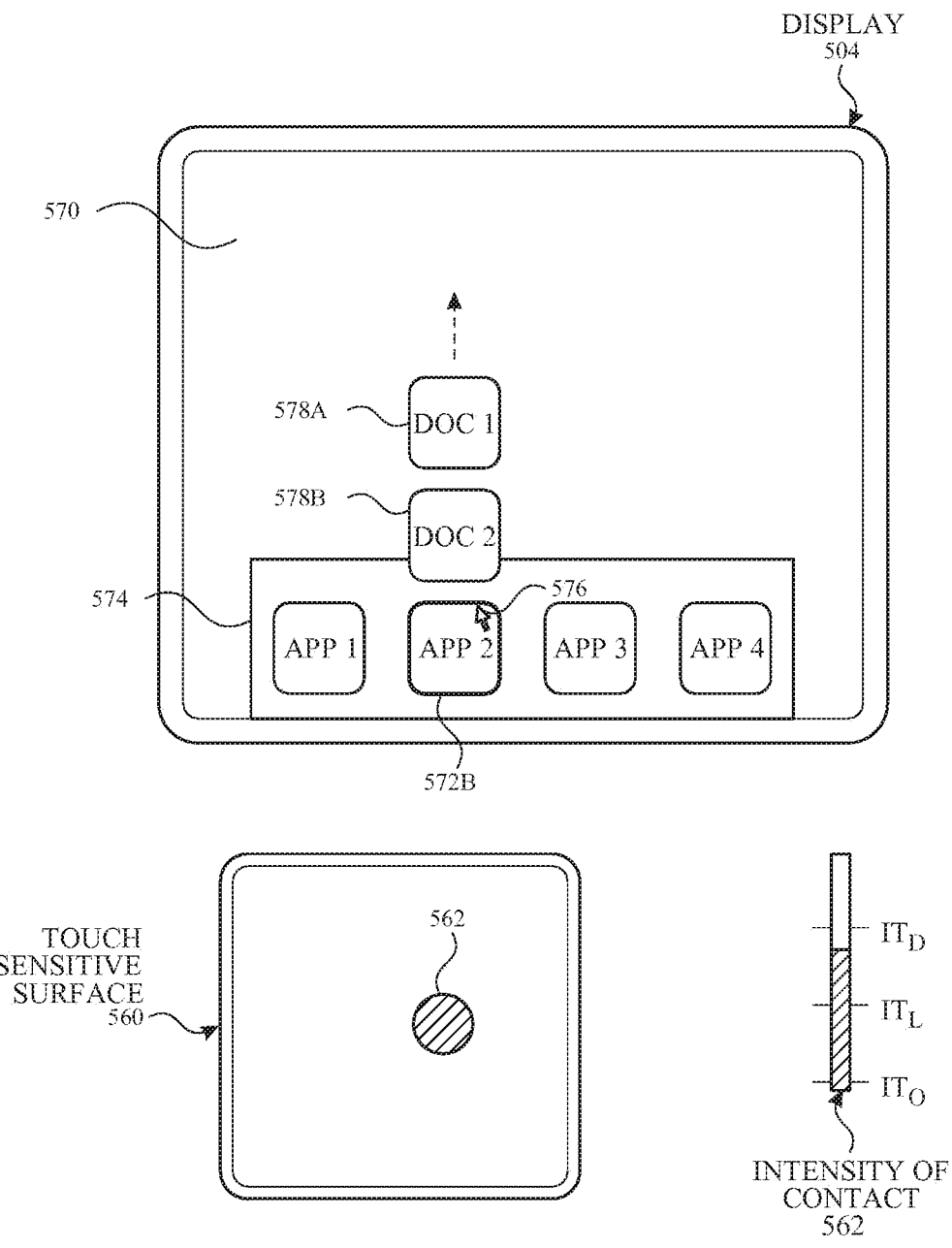
Figure 5H:
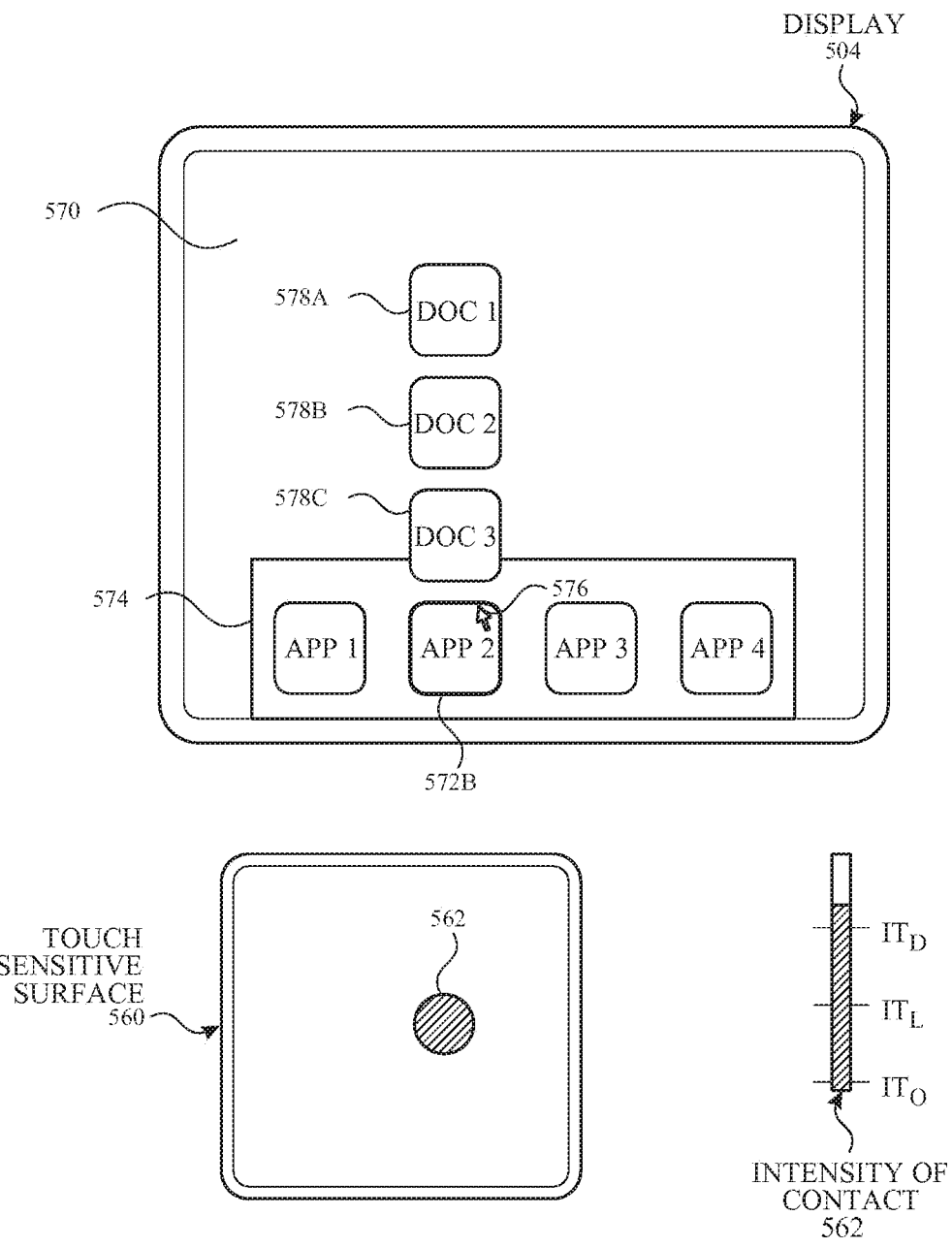

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed towards embodiments of user interfaces ("U") and associated processes that may be implemented on a multifunction device with a display and a touch-sensitive surface, such as devices 100, 300, and/or 500, to improve a user's experience in viewing and managing alert notifications.

1. Notification User Interfaces

The current disclosure describes user interfaces for displaying multiple notifications representing multiple alerts obtained by device 500. Device 500 can obtain alerts from installed applications running on device 500, or can obtain alerts from installed applications running on an external device that is in communication with device 500, for example. In some embodiments, device 500 obtains alerts by receiving the alerts from an application or an external device.

In some embodiments, an alert can be a text message, calendar alert, voicemail, clock alarm, system alert, weather alert, email, or fitness alert, for example. An alert may be associated with a date and a time, referred to as a "date-time," that characterizes the date and time the alert was sent or received, or the date and time of an upcoming alert event, for example. An alert date-time may be a future (e.g., upcoming) date-time or a past date-time, relative to the current date and time. An alert date-time may be a timestamp assigned to the alert by device 500 or by an external device, or may be a date and time assigned within an application (e.g., a date and time associated with a calendar reminder or clock alarm). An alert may be a timeless alert; that is, an alert that is not associated with a specific date-time, such as a task reminder or location-based alert that is triggered when device 500 is in a specific location, or within a predefined geofence.

A received alert may include information, such as a source of the alert, an application corresponding to the alert, a date-time, and alert content. The alert content may be the body of a text message, a voicemail message, an image, or text associated with a calendar reminder, for example. A notification representing an alert may include at least a portion of the alert information.

The notification user interfaces described below are illustrated by way of exemplary sequences of screens that device 500 can display after receiving multiple alerts and detecting various user inputs. In these sequences, the arrows indicate the order in which the screens are displayed.

a. Future and Past Notifications on Single Screen

Figure 6:
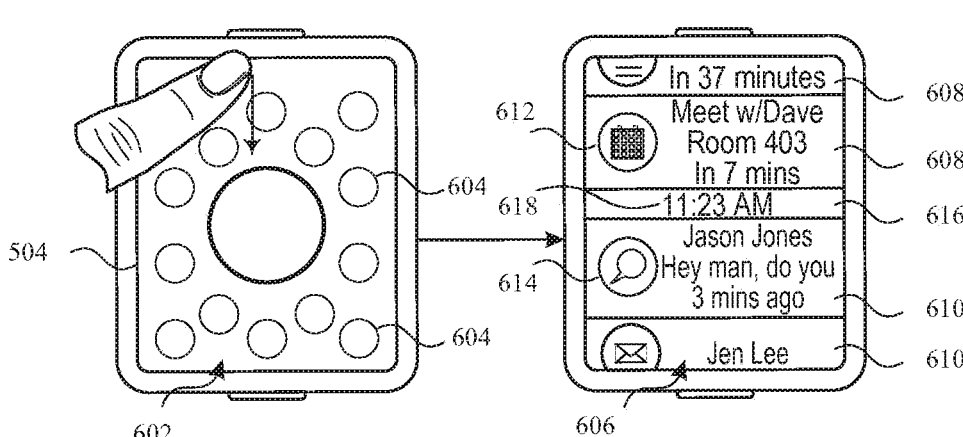

In some embodiments, device 500 can display multiple future and past notifications in a single notification interface screen. For example, FIG. 6 depicts a sequence of screens that device 500 can display on touchscreen 504 after receiving multiple alerts. Initially, in some embodiments, home screen 602 is displayed on touchscreen 504. Home screen 602 may include a plurality of user interface objects 604 associated with a plurality of applications, services, or other functions that may be launched from home screen 602. In some embodiments, home screen 602 includes a clock face.

In response to detecting a contact on touchscreen 504, device 500 can determine a current date-time and display notification interface screen 606. In some embodiments, the contact is a substantially vertical swipe, such as a downward swipe, or flick on touchscreen 504. In some embodiments, the contact is a touch or tap on a user interface object 604 displayed on home screen 602.

Notification interface screen 606 includes multiple future notifications 608 that represent alerts associated with date-times that are after the current date-time. Notification interface screen 606 also includes multiple past notifications 610 that represent alerts that are associated with date-times that are before the current date-time.

Notification interface screen 606 also includes a graphical separator 616. In some embodiments, a graphical separator may be a contiguous, predefined area of the display used to separate some notifications from other notifications. In some embodiments, the graphical separator comprises an indication of the current time 618, and is displayed between future notifications (e.g., 608) and past notifications (e.g., 610) as depicted in FIG. 6.

In some embodiments, each notification 608, 610 corresponds to a single alert received by device 500. As will be discussed with respect to FIG. 14, in some embodiments, multiple alerts may be represented by a single grouped notification in a notification interface screen.

In the example depicted in FIG. 6, past notifications and future notifications are displayed chronologically, such that the most immediate upcoming alert is represented by a future notification that is immediately above the graphical separator, and the most recent past alert is represented by a past notification that is immediately below the graphical separator. Future notifications that are displayed farther above the graphical separator are associated with date times that are farther in the future; past notifications that are displayed farther below the graphical separator are associated with date times that are farther in the past. In some embodiments, notifications are displayed in other orders, as will be discussed in more detail with respect to FIGS. 19-21.

Figure 7:
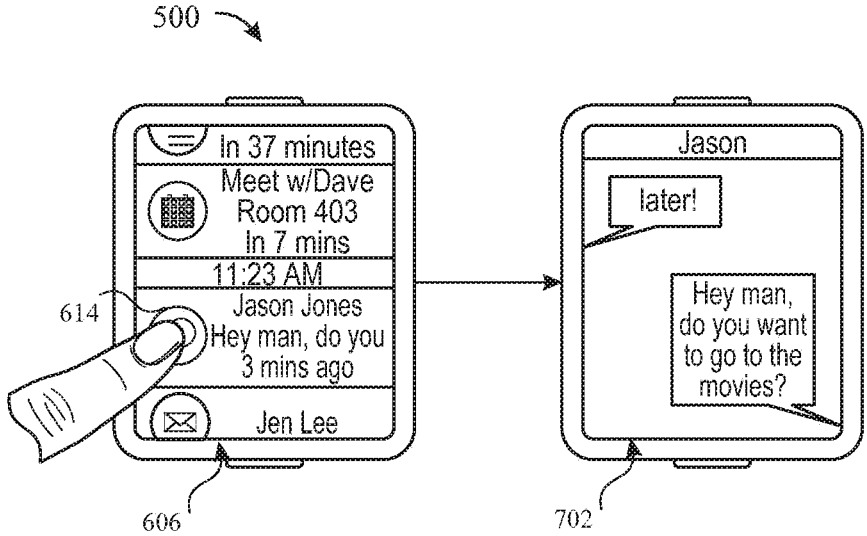

In some embodiments, a notification 608, 610 includes an application affordance 612, 614 for launching an application that corresponds to the alert represented by the notification. In some embodiments, launching the application corresponding to the alert causes the application to be displayed on touchscreen 504, and may include opening the alert within the application for viewing, editing, or responding to the alert. In some embodiments, if the alert is a text message, launching the application displays a text message conversation that includes the text message. For example, as depicted in FIG. 7, in response to detecting a contact on application affordance 614, device 500 launches the text message application and displays a conversation that includes the text message. The contact may be a touch or tap on application affordance 614, for example.

Figure 8:
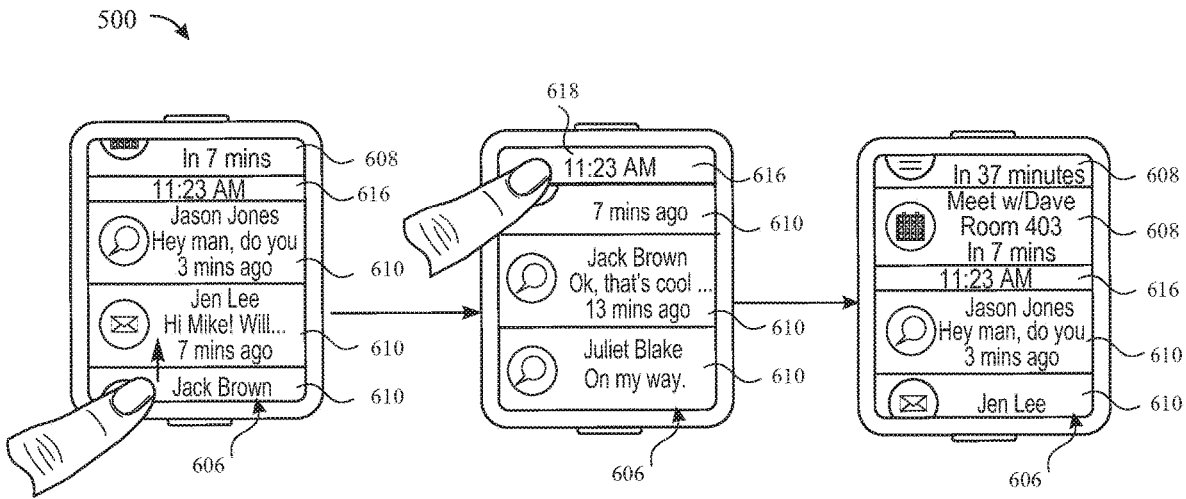

As depicted in FIG. 8, in some embodiments, in response to detecting a user input, device 500 scrolls the notification interface (including graphical separator 616) to display additional future notifications 608 or past notifications 610. In some embodiments, the user input is a vertical swipe or flick on touchscreen 504, such as indicated in FIG. 8. In some embodiments, device 500 scrolls notification interface screen 606 in the same direction as the swipe or flick.

As depicted in FIG. 8, in some embodiments, if graphical separator 616 is scrolled in a direction (e.g., up or down) to a boundary of touchscreen 504, such as the top or bottom of touchscreen 504, device 100 can cease to scroll graphical separator 616 and continue to display graphical separator 616 at the boundary of touchscreen 104 while continuing to scroll the notifications 608, 610 in the same direction. Thus, the graphical separator may "stick" to the top or bottom of the screen while device 100 continues to scroll the notifications in the same direction. In response to detecting a user input for scrolling in the opposite direction, such as a swipe or flick in the opposite direction, device 100 can scroll the notification interface in accordance with the user input, and resume scrolling the graphical separator away from the boundary of touchscreen 504 so that it continues to provide a visible separation between past and future notifications and, optionally, additional useful information such as a time of day. Moreover, the location of the graphical separator provides a visual cue as to whether the currently displayed notifications are past notifications (e.g., if the graphical separator is at or near the top of the display) or future notifications (e.g., if the graphical separator is at or near the bottom of the display).

As depicted in FIG. 8, in some embodiments, if notification interface 606 has been scrolled out of its initial position, then device 500 can refresh notification interface 606 in response to detecting a contact on graphical separator 616. In some embodiments, device 500 can refresh notification interface screen 606 by re-displaying notification interface screen 606 in its initial, un-scrolled position. In some embodiments, when notification interface screen 606 is refreshed, device 500 determines a new current date-time and updates the display positions of notifications 608, 610 based on the new current date-time. For example, one or more future notifications may have become past notifications if their associated date-times have passed when notification interface is refreshed, such that they are displayed on the same side of the graphical separator as the other past notifications.

Figure 9:
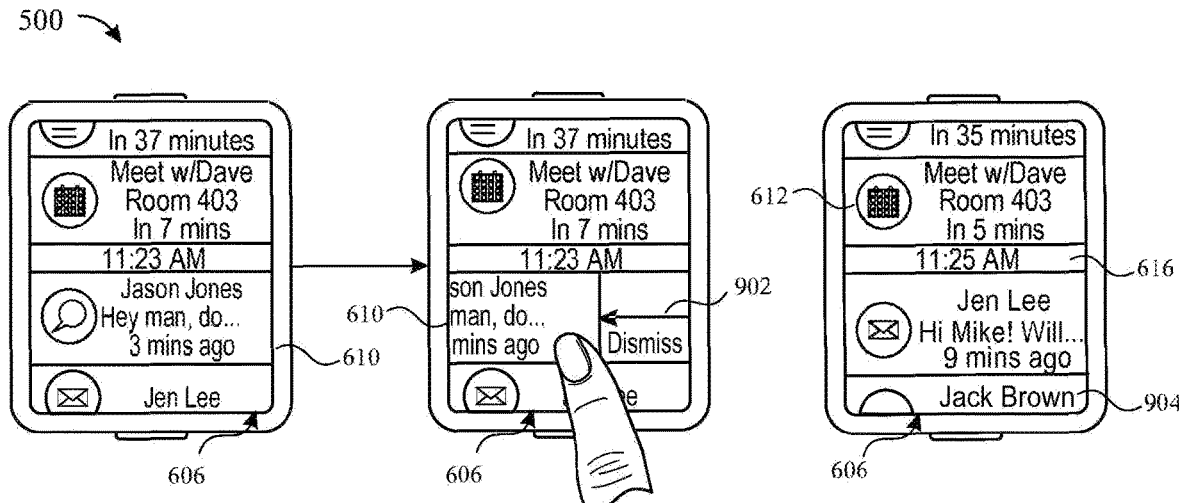

A user may wish to dismiss a notification from a notification interface so that it is no longer displayed in the notification interface. As depicted in FIG. 9, in some embodiments, if device 500 detects a contact on a notification 610 that meets a dismissal criteria, then device 500 dismisses notification 610. In some embodiments, a dismissed notification is excluded from subsequent notification interfaces displayed by device 500.

In some embodiments, the contact meets the dismissal criteria if it is a horizontal swipe or flick on the notification. In some embodiments, the contact meets the dismissal criteria if the distance of the swipe or flick across the touchscreen exceeds a threshold distance. In some embodiments, the threshold distance is a quarter, half, or % of the horizontal width of touchscreen 504.

Returning to FIG. 9, in some embodiments, in response to detecting a movement of a contact (such as a horizontal swipe) on touchscreen 504 at a location corresponding to notification 610, device 500 can slide notification 610 on the touchscreen in the direction of the movement of the contact and display a dismissal indicator 902 adjacent to the notification. The dismissal indicator 902 may provide the user with a visual cue that, if the movement of the contact is continued in the same direction, the notification will be dismissed. After displaying the dismissal indicator, in some embodiments, if the contact meets the threshold criteria, then in response to detecting the release of the contact, device 500 can dismiss notification 610, remove the dismissal indicator 902 from touchscreen 504, and re-display the notification interface 606 excluding the dismissed notification 610. If the contact does not meet the threshold criteria (for example, if the movement of the contact does not exceed a threshold distance), device 500 can display an animation that slides notification 610 back to its initial position on the display, and remove the dismissal indicator 902 from the display. In some embodiments, dismissing notification 610 involves displaying an animation that slides notification 610 off of touchscreen 504 in the direction of the swipe or flick.

Figure 10:
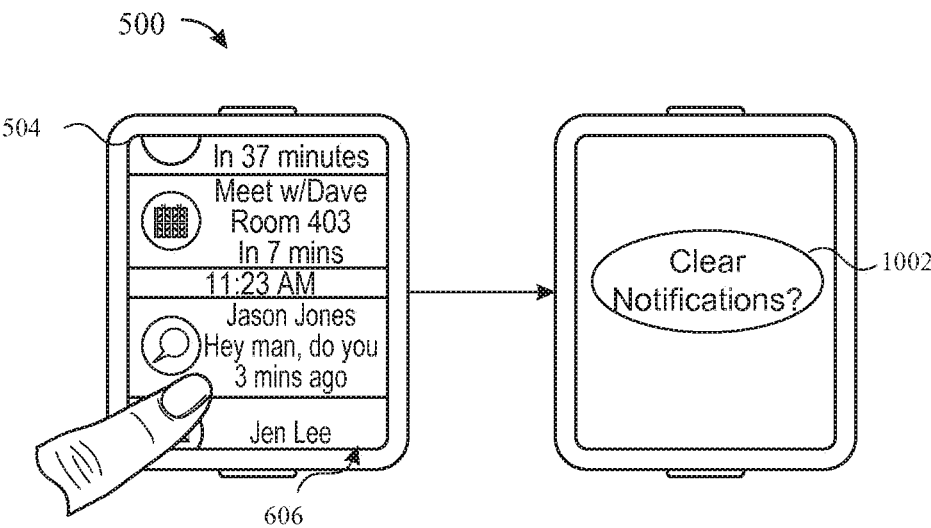

In some cases, a user may wish to dismiss more than one notification at a time from a notification interface. As depicted in FIG. 10, in response to detecting a contact on touchscreen 504 while displaying notification interface 606, device 500 can determine whether the characteristic intensity of the contact exceeds a threshold intensity. If the characteristic intensity exceeds the threshold intensity (for example, if the contact is a hard push on touchscreen 504), the device 500 can display affordance 1002 for dismissing multiple notifications from the notification interface. In some embodiments, device 500 can display affordance 1002 in response to detecting a liftoff of a contact having a characteristic intensity that exceeds a threshold intensity.

In some embodiments, the response to the contact may be location-independent; that is, a contact anywhere on touchscreen 504 that has a characteristic intensity above a threshold intensity may cause device 500 to display affordance 1002. In contrast, if the characteristic intensity of the contact is below the threshold intensity, device 500 can respond in a different manner. For example, if the contact is detected on a displayed notification, and the characteristic intensity is below the threshold intensity (e.g., the contact is a touch or tap on a notification, where the contact does not have a characteristic intensity above the threshold intensity during the touch or tap), device 500 can respond by displaying alert content, as described below with respect to FIG. 1A.

In some embodiments, displaying affordance 1002 involves replacing display of notification interface screen 606 with display of affordance 1002. In some embodiments, displaying affordance 1002 involves displaying affordance 1002 overlaid on notification interface screen 606.

In some embodiments, in response to detecting a selection of affordance 1002, device 500 can dismiss all of the notifications that are included in the notification interface. In some embodiments, in response to detecting a selection of affordance 1002, device 500 can dismiss some subset of the notifications, such as the past notifications or future notifications.

Figure 11A:
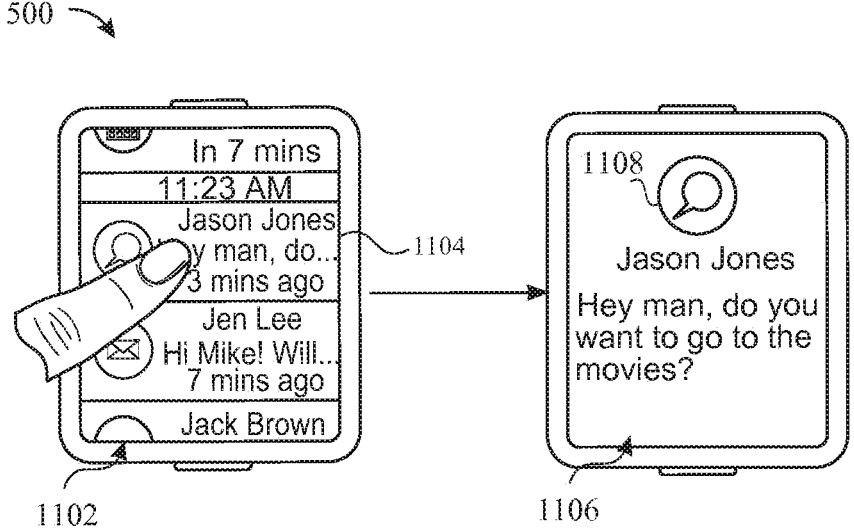

As previously discussed, an alert may include alert content, such as the body of a text message or email, an audio message, or additional alert details. As depicted in FIG. 11A, in some embodiments, in response to detecting a contact on a notification 1104 representing an alert in notification interface screen 1102, device 500 can replace display of notification interface screen 1102 with alert details screen 1106, which includes some or all of the alert content. The contact may be a touch or tap on notification 1104, for example. In some embodiments, device 500 can display alert details screen 1106 in response to detecting a liftoff of the contact. In some embodiments, alert details screen 1106 includes application affordance 1108 which, when selected, can launch the application corresponding to the alert.

Figure 11B:
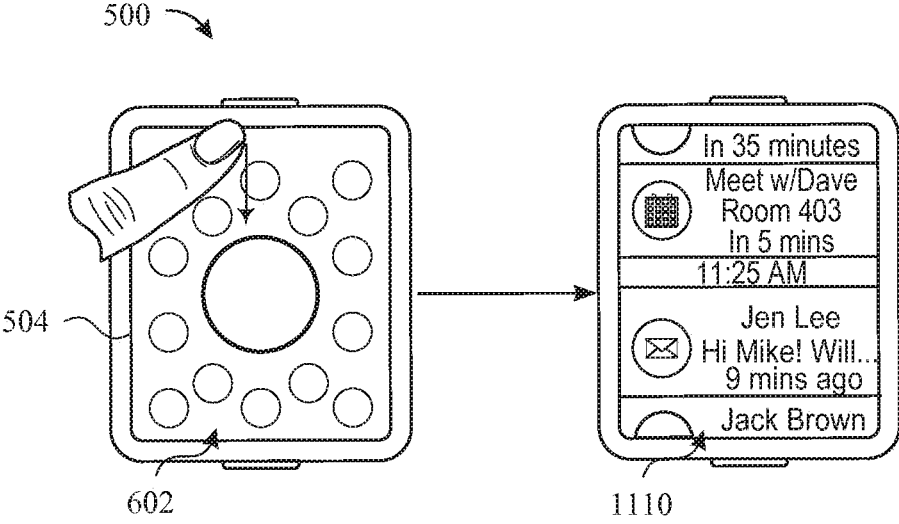

As depicted in FIG. 11B, in some embodiments, after displaying alert details screen 1106, device 500 can exclude notification 1104 from subsequently displayed notification interface screen 1110.

b. Next-Up Notification and Past Notifications on Single Screen

Figure 12:
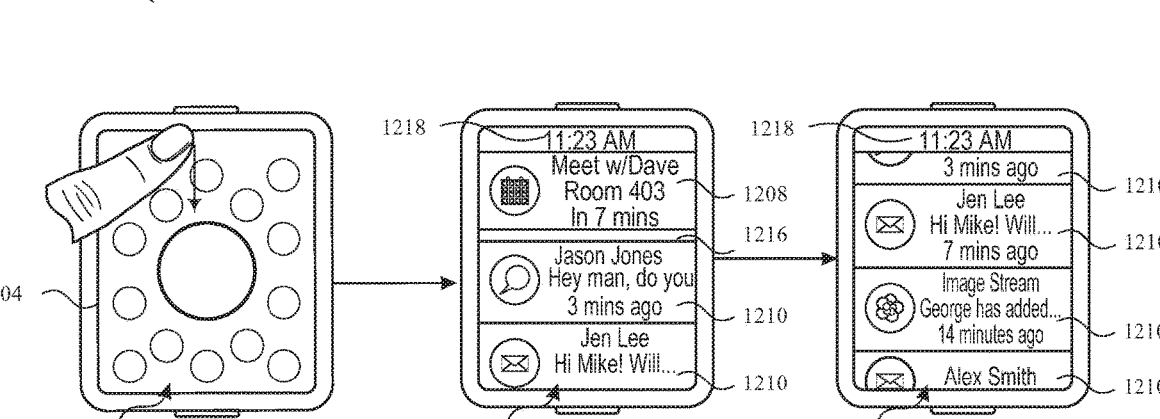

FIG. 12 depicts another exemplary sequence of screens that device 500 can display on touchscreen 504 after receiving multiple alerts and detecting a user input invoking a notification interface, as described with respect to FIG. 6. This sequence is similar to the sequence depicted in FIG. 6, however, instead of the notification interface displaying multiple future notifications, notification interface screen 1206 displays a single, "next up" notification 1208 above graphical separator 1216 and multiple past notifications 1210 below graphical separator 1216. In some embodiments, the "next up" notification 1210 is the next immediate upcoming alert, based on the current date-time. As with the previous example, past notifications 1210 in notification interface screen 1206 represent alerts having date-times that are in the past relative to the current date and time.

Graphical separator 1216 of notification interface screen 1206 does not include an indication of the current time. However, notification interface screen 1206 includes an indication of the current time 1218 displayed at the top of notification interface screen 1206.

Notification interface screen 1206 can be scrolled to display additional past notifications. Device 500 can scroll notification interface screen 1206 in response to user inputs as described with respect to FIG. 6. For example, in response to detecting an upward swipe or flick on touchscreen 504, device 500 can scroll notification interface screen 1206 to display additional past notifications. However, in exemplary notification interface 1206, graphical separator 1216 does not "stick" to a boundary of touchscreen 504. In response to detecting a contact on the indication of the current time 1218, device 500 can re-display notification interface screen 1206 in its initial, un-scrolled position, as previously described.

c. Future and Past Notifications on Separate Screens

Figure 13:
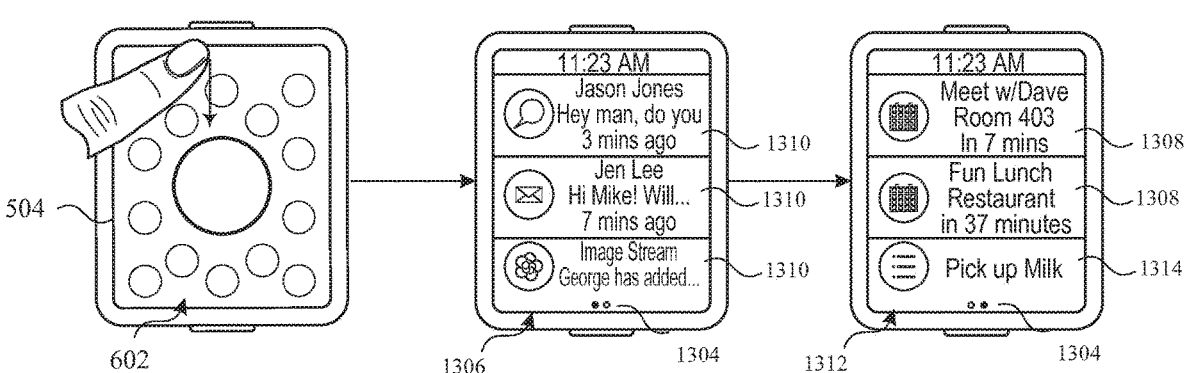

In some embodiments, device 500 can display a notification interface with future notifications on one screen and past notifications on another screen. For example, FIG. 13 depicts a sequence of screens that device 500 can display on touchscreen 504 when a notification interface is invoked as described with respect to FIG. 6.

In response to detecting a user input to invoke the notification interface from home screen 602, device 500 can display notification interface screen 1306. Notification interface screen 1306 includes multiple past notifications 1310 representing past alerts. In some embodiments, the past notifications 1310 are displayed in a chronological order, starting with the most recently passed past notification.

In response to detecting a contact on touchscreen 504 while displaying notification interface screen 1306, device 500 can replace display of notification interface screen 1306 with display of notification interface screen 1312. In some embodiments, the contact is a horizontal swipe or flick on touchscreen 504, such as a right to left swipe or flick.

In some embodiments, replacing display of notification interface screen 1306 with notification interface screen 1312 involves horizontally translating notification interface screen 1306 off of touchscreen 504 on one side while horizontally translating notification interface screen 1312 onto touchscreen 504 from the other side, such that portions of both screens are simultaneously visible during the transition from one screen to another.

Notification interface screen 1312 displays multiple future notifications 1308 representing future alerts. The future notifications are displayed in a chronological order, starting with the most immediately upcoming notification. In this example, notification interface screen 1312 also includes a timeless notification 1314 that represents an alert that is not associated with a date-time. In some embodiments, timeless notifications are displayed with the past notifications instead of with the future notifications.

In some embodiments, notification interface screens 1306, 1312 do not include a graphical separator, because past and future notifications are not displayed on the same screen in the same manner as in, for example, notification interface screen 606.

In the example of FIG. 13, notification interface screens 1306 and 1312 include page indicators 1304 to provide a visual indication to the user of the number and relative position of additional screens that may be displayed in response to horizontal contacts. For example, the leftmost page indicator of screen 1306 is solidly filled and the page indicator adjacent to it is not filled, suggesting that a left horizontal swipe may display another screen (e.g., screen 1312).

d. Missed Notifications, Up Next, and Activity on Separate Screens

Figure 14:
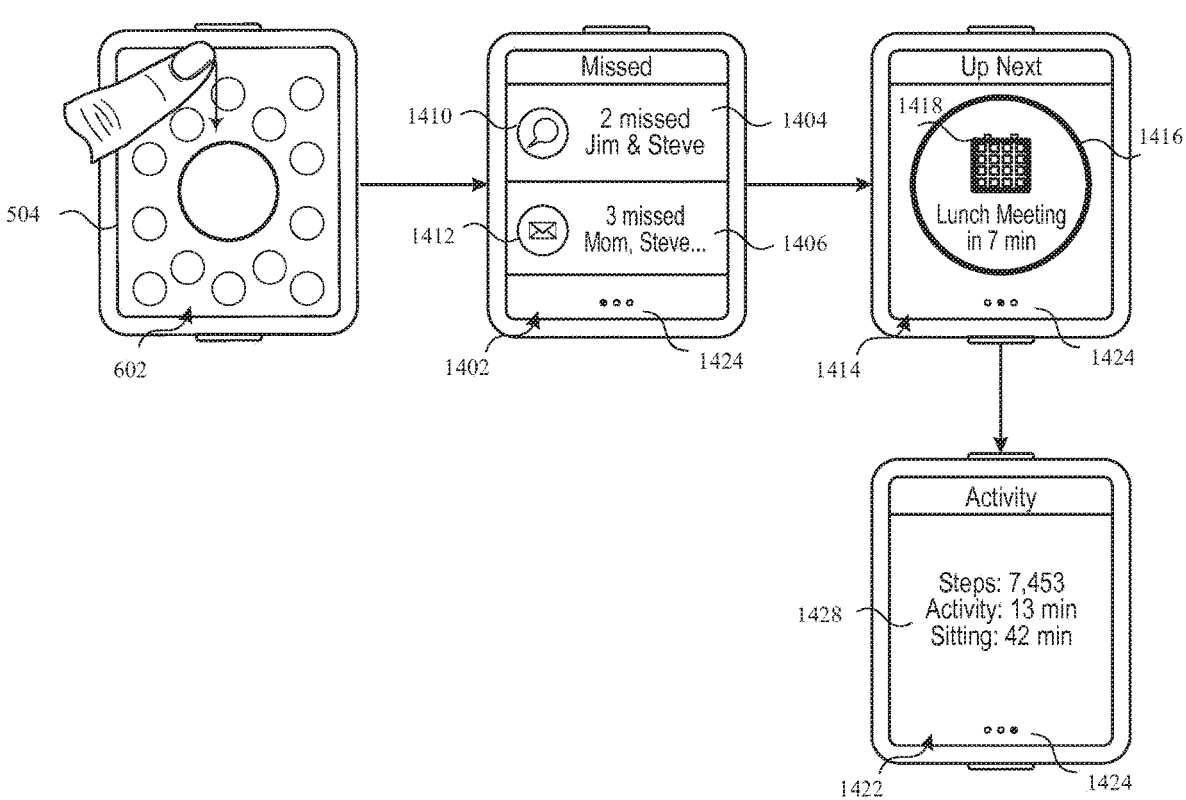

In some embodiments, device 500 can display a notification interface with past notifications on a first screen, a single "Up Next" notification on a second screen, and a summary of user physical activity on a third screen. For example, FIG. 14 depicts a sequence of screens that device 500 can display on touchscreen 504 when a notification interface is invoked as described with respect to FIG. 6.

In response to detecting a user input to invoke a notification interface, device 500 can display notification interface screen 1402. Notification interface screen includes notifications representing multiple past alerts. However, in this example, rather than displaying multiple past notifications that each represent a single past alert as depicted in FIG. 6 (for example), notification interface screen 1402 aggregates the notifications into multiple grouped past notifications 1404, 1406, where each grouped notification represents multiple past alerts that correspond to the same application. For example, grouped notification 1404 represents two past text message alerts, while grouped notification 1406 represents three past email alerts. In some embodiments, grouped notifications can include an application affordance 1410, 1412 for launching an application corresponding to the alerts represented by the grouped notification. In some embodiments, launching the application opens the application and displays the application inbox with a list of the alerts represented by the grouped notification. In some embodiments, the alerts represented by grouped notifications 1404, 1404 in notification interface screen 1402 are alerts that were missed. In some embodiments, a missed alert is an alert for which the associated content has not been displayed, or that was received when touchscreen 504 was dark or inactive.

In response to detecting a contact on touchscreen 504 while displaying notification interface screen 1402, device 500 can replace display of notification interface screen 1402 with display of notification interface screen 1414. In some embodiments, the contact is a horizontal swipe or flick on touchscreen 504, such as a swipe or flick from right to left on touchscreen 504.

As previously discussed with respect to FIG. 13, in some embodiments, replacing display of notification interface screen 1402 with notification interface screen 1414 involves horizontally translating notification interface screen 1402 off of touchscreen 504 on one side while horizontally translating notification interface screen 1414 onto touchscreen 504 from the other side, such that portions of both screens are simultaneously visible during the transition from one screen to another.

In some embodiments, notification interface screen 1414 includes an up-next notification 1416 representing the most immediate future alert. In some embodiments, the up-next notification 1416 includes an application affordance 1418 for launching an application corresponding to the alert represented by up-next notification 1416. In some embodiments, notification interface screen 1414 provides the user with a quick snapshot of their next upcoming event or activity.

The up-next notification can represent a variety of alerts that correspond to different applications. For example, an up-next notification could be a calendar alert, a bus departure time, or an airline boarding gate (provided by a travel application, for example). Such alerts may be received from an external electronic device or from an installed application executing on device 500.

Figures 15A, 15B, 15C, 15D:
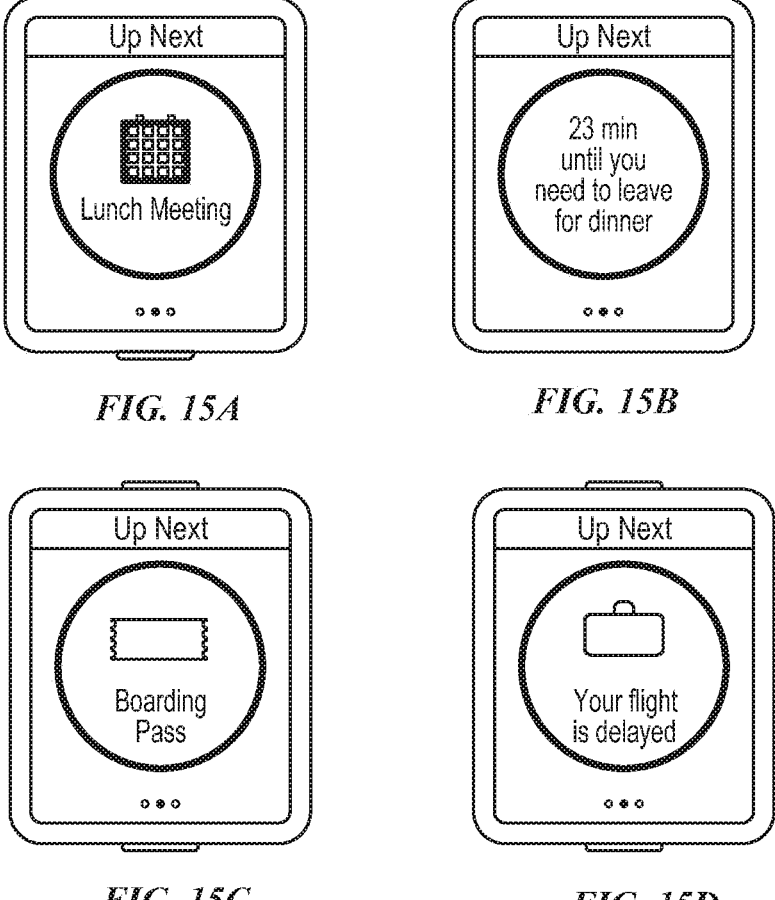

FIGS. 15A-D depict exemplary up-next notifications representing alerts that correspond to different applications. FIG. 15A depicts an up-next notification representing an alert that may correspond to a calendar application. FIG. 15B depicts an up-next notification representing an alert that may correspond to restaurant reservation application. FIGS. 15C-D depict up-next notifications that may correspond to an airline travel application.

Figure 16:
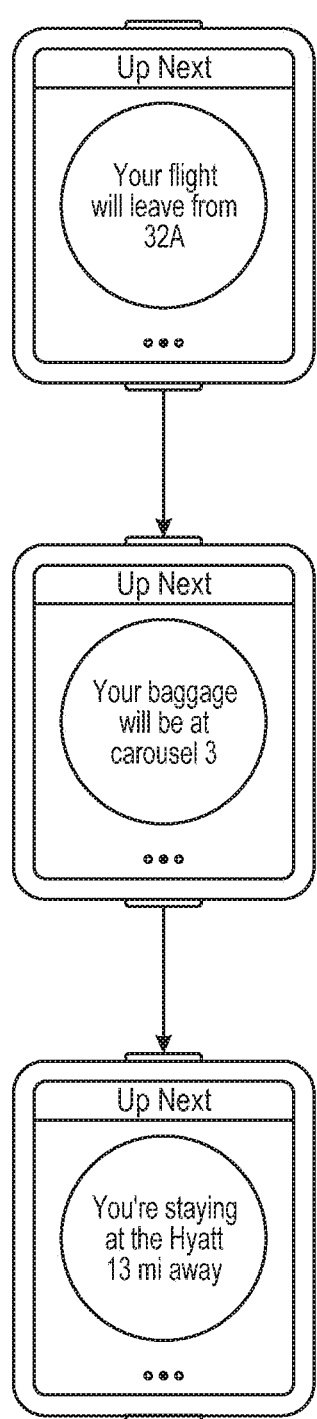

In some embodiments, as depicted in FIG. 16, an up-next notification is updated in accordance with information received from an application corresponding to the alert represented by the notification. In the example of FIG. 16, the corresponding application may be a travel reservation application. As another example, the corresponding application is a calendar application, and the information may be an appointment or a reminder to depart at a certain time to arrive at your next calendar appointment. In some examples, an up-next notification includes an affordance to launch an application, such as a map application, which may be pre-populated with an address to which device 500 has determined that a user is likely to be navigating (based on information obtained from a calendar application, for example).

Returning to FIG. 14, in some embodiments, in response to detecting a contact on touchscreen 504 while displaying notification interface screen 1414, device 500 can replace display of notification interface screen 1414 with display of notification interface screen 1422. In some embodiments, the contact is a horizontal swipe or flick on touchscreen 504, such as a swipe or flick from right to left on touchscreen 504. Notification interface screen 1422 includes an indication of user physical activity status 1428. In this example, the user physical activity status includes the number of steps the user has taken over a time period, the amount of time the user has been active over the time period, and the amount of time a user has been sitting over the time period. More generally, the indication of activity status may include specific actions, such as exercise duration, sleeping duration, sitting/sedentary duration, elevation or distance traversed. In some embodiments, the indication of activity status may include information based on sensor data, such as heart rate, blood pressure, or temperature. In some examples, the activity status is reset at the beginning of each hour, day, week, month, or user-specified time period, for example. Techniques for monitoring a user's physical activities are described in co-pending U.S. Provisional Patent Application Ser. No. 62/044,990 entitled "Physical Activity and Workout Monitor," filed Sep. 2, 2014 and U.S. Provisional Patent Application Ser. No. 62/129,828 entitled "Physical Activity and Workout Monitor," filed Mar. 7, 2015, both of which are herein incorporated by reference in their entirety.

Notification interface screens 1402, 1414, and 1422 include page indicators 1424, as previously described with respect to FIG. 13. In some embodiments, device 500 can horizontally scroll between notification interface screen 1402, notification interface screen 1414, and notification interface screen 1422 in response to horizontal swipes or flicks on touchscreen 504. A person of skill in the art will recognize that the screen order depicted in FIG. 14 is only one possible arrangement; other orders are also possible. For example, in response to detecting a user input to invoke a notification interface, device 500 can display notification interface screen 1414 first, and then scroll to screens 1402 and 1422 in response to horizontal swipes on touchscreen 504.

More generally, a person of skill in the art will recognize that the exemplary notification interface screens described with respect to FIGS. 6-16 can be combined in many different ways to create different notification interfaces. For example, a notification interface screen from one example notification interface may be replaced by a notification interface screen from another example without departing from the scope of this disclosure. While the examples described herein depict up to three notification interface screens in a notification interface, in some embodiments, a notification interface may include four or more screens, each with different information. For example, a notification interface may include an "up next" screen, a future notifications screen, a past notifications screen (with grouped or ungrouped notifications), and an activity screen.

2. Invoking Notification Interfaces

As previously discussed with respect to FIGS. 6-16, device 500 can display a notification interface screen in response to detecting a contact on touchscreen 104. FIGS. 6-16 depict the contact as a downward swipe on touchscreen 504. In some embodiments, device 500 can display a notification interface screen in response to detecting an upward swipe or a horizontal swipe.

Figure 17:
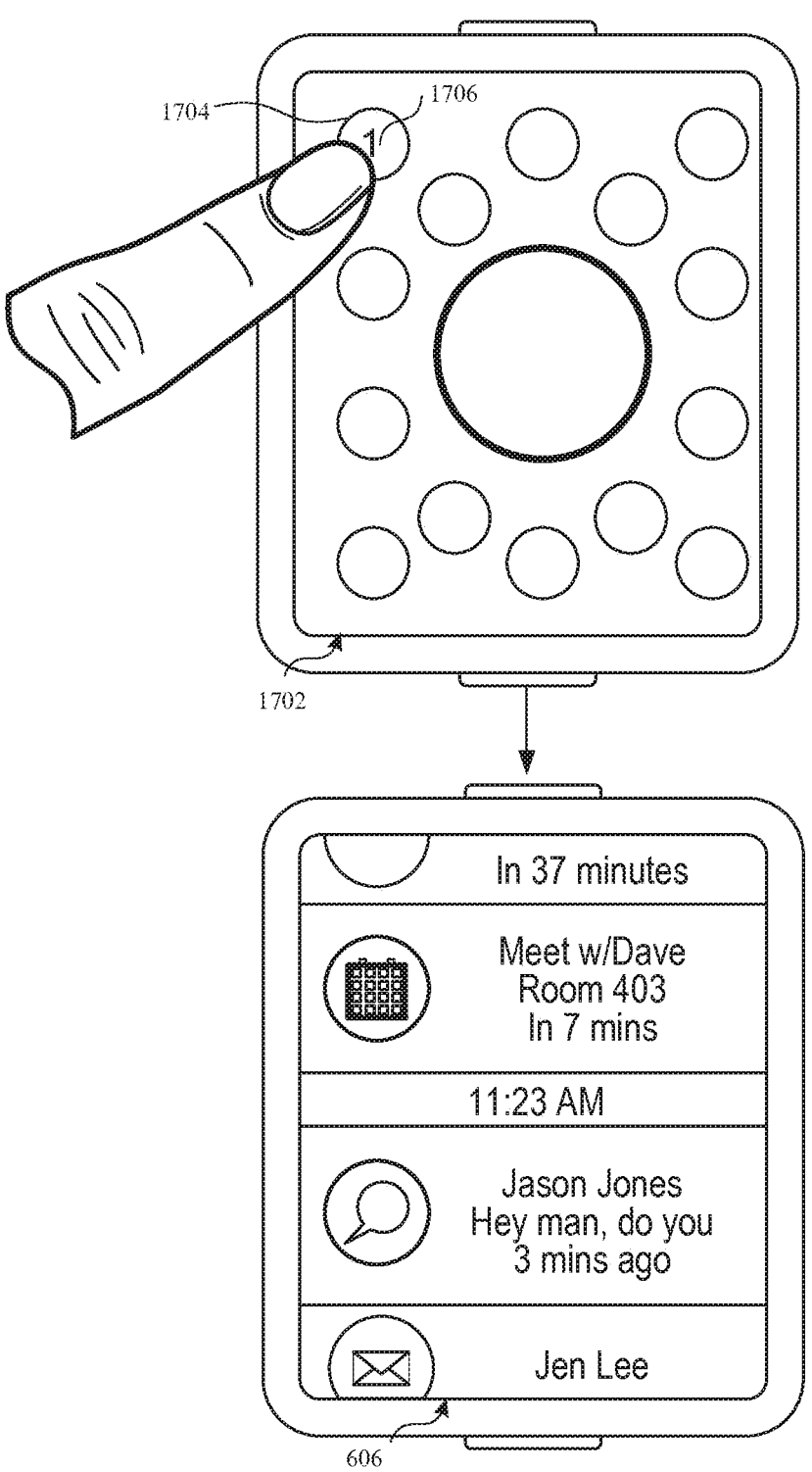

As depicted in FIG. 17, in some embodiments, device 500 can display a notification interface screen in response to a touch or tap on a notification affordance 1704 on home screen 1702. In some embodiments, notification affordance 1704 includes an indication 1706 of the number of unread alerts received since a notification interface was last displayed.

In some embodiments, device 500 can zoom in or out of a notification interface screen in response to detecting a touch on touchscreen 504 and detecting a rotation of the rotatable input mechanism. In some embodiments, device 500 can zoom the notification interface screen if the touch and at least a portion of the rotation are detected essentially simultaneously. For example, device 500 may detect a user contact on touchscreen 504, and detect a rotation of the rotatable input mechanism while the touch continues to be detected. In some embodiments, device 500 can zoom in a notification interface (e.g., display content at a larger size) in response to detecting the rotation in a first direction, and zoom out the notification interface (e.g., display content at a smaller size) in response to detecting a rotation in the opposite direction.

Figure 18:
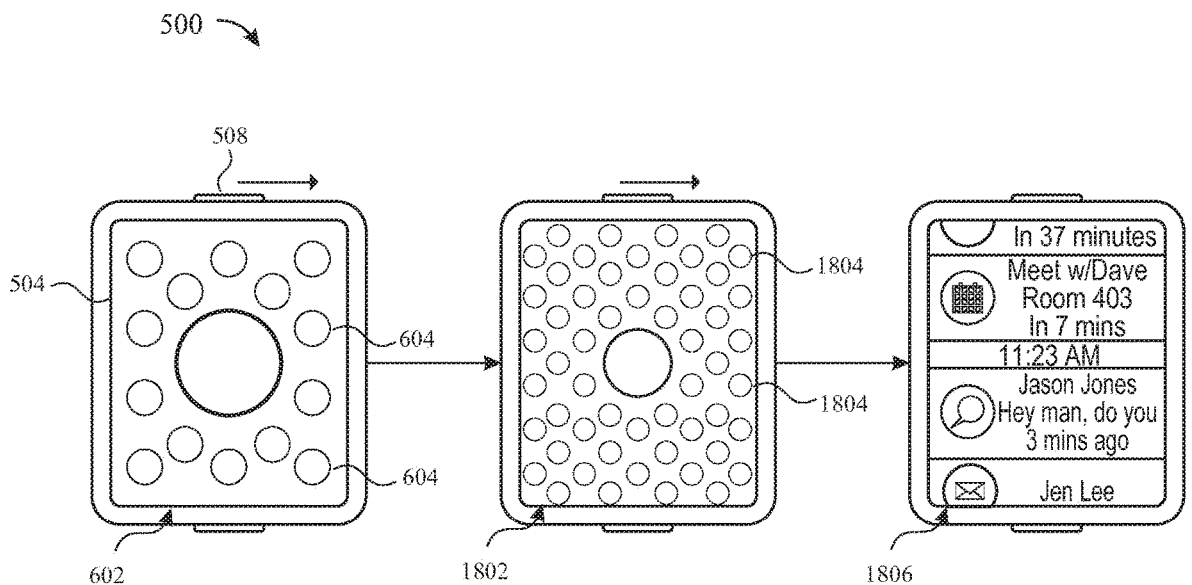

As depicted in FIG. 18, in some embodiments, device 500 can display a notification interface screen in response to detecting a rotation of a rotatable input mechanism 508. While displaying home screen 602 with a first set of user interface objects 604, in response to detecting an initial rotation of rotatable input mechanism 508, device 500 can zoom out home screen 602 to display home screen 1802 with a second set of application affordances 1804, where the second set has more user interface objects than the first set and includes the first set. If home screen 602 is already zoomed out to its maximum zoom-out level, in response to detecting a further rotation of the rotatable input device, device 500 can display notification interface screen 1806 (or another user interface screen, as described above). In some embodiments, device 500 can determine whether home screen 602 is already zoomed out to it maximum zoom-out level if the first set of user interface objects 604 meets a threshold criteria. The threshold criteria may be based on the number of user interface objects displayed, the display size of the user interface objects, and/or whether all of the installed applications are represented by the displayed user interface objects.

3. Notification Display Order

Figure 19A:
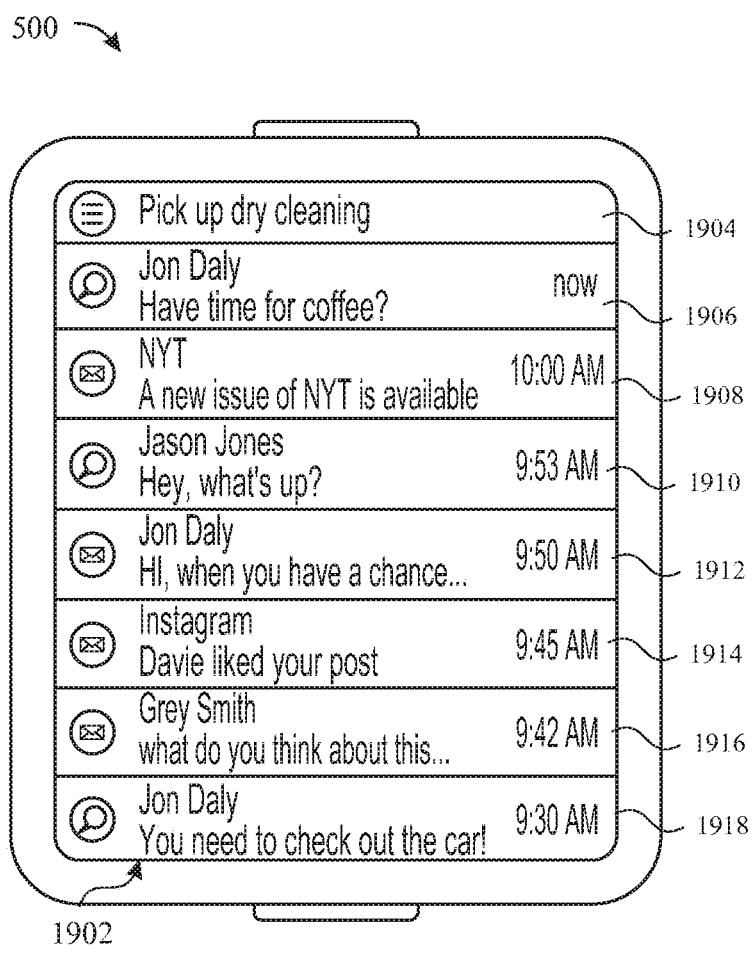

As previously discussed, notifications displayed in a notification interface may be displayed in a chronological order by the date-times of the associated alerts. FIG. 19A depicts notification interface screen 1902 with notifications 1906-1918 displayed in chronological order based on the associated date-times of the alerts represented by the notifications. In this example, the notifications 1906-1918 are past notifications; they represent text messages, emails, and alerts previously received. (Text messages, emails, and voicemails are past alerts since they are received before the current date-time.)

For simplicity, exemplary notification interface screen 1902 does not include a graphical separator; screen 1902 is intended to primarily depict notification display order, rather than depicting a particular notification interface.

As depicted in FIG. 19A, in some embodiments, device 500 can display one or more timeless notifications 1904 representing timeless alerts that are not associated with a particular date-time, such as task reminders or location-based alerts (e.g., alerts that are received based on a location of device 500, such as store coupons), at the top of the notifications.

FIG. 19B depicts an alternative exemplary notification interface screen 1920 with past notifications 1934, 1936, and 1938 displayed in chronological order based on the associated date-times of the alerts represented by the notifications. Notifications 1934, 1936, and 1938 correspond respectively to the same alerts as notifications 1914, 1916, and 1918 on notification interface screen 1902 depicted in FIG. 19A. In contrast to notification interface screen 1902, notification interface screen 1920 does not include a timeless notification corresponding to timeless notification 1904. Also, notifications associated with date-times further in the past are displayed above more recent notifications. That is, the notifications are in reverse chronological order compared to notification interface screen 1902. In some embodiments, the notifications are displayed in the style illustrated in notification interface screen 1920, but in the same chronological order as the notifications in notification interface screen 1902.

Notification interface screen 1920 also displays notifications in a different format, or style, than notification interface screen 1902. For example, in notification interface screen 1920, the notifications include a textual descriptor (e.g., 1940) of the application that corresponds to the alert represented by the notification, and notifications of emails (e.g., 1936) include at least a portion of the subject (e.g., 1941) and the body (e.g., 1942) of the email.

In some embodiments, a notification s 1934, 1936, and 1938 include application affordances 1943, 1944, and 1945, respectively, for launching an application that corresponds to the alert represented by the notification, as described above with reference to FIGS. 6-7.

In some embodiments, notifications of more recent alerts can be displayed in response to a user input. Device 500 can scroll notification interface screen 1920 in response to user inputs as described with respect to notification interface screen 606 and FIG. 8. For example, in response to detecting a rotation of rotatable input mechanism 508 or an upward swipe, drag, or flick on touchscreen 504, device 500 can scroll notification interface screen 1920 to display additional past notifications of more recent alerts. As depicted in FIG. 19C, in some embodiments, in response to detecting a vertical swipe, drag, or flick on touchscreen 504 (such as indicated in FIG. 19B), device 500 scrolls notification interface screen 1920 in the same direction as the swipe, drag, or flick. That is, device 500 scrolls notification interface screen 1920 upward to display additional past notifications 1926, 1928, 1930, and 1932, which correspond respectively to the same alerts as notifications 1906, 1908, 1910, and 1912 on notification interface screen 1902 depicted in FIG. 19A.

In some embodiments, in response to the same user input that causes scrolling, device 500 displays an indication based on the currently displayed notifications relative to the entire set of notifications associated with notification interface screen 1920. For example, device 500 can display an exemplary indicator 1950 as depicted in FIG. 19C. In some embodiments, indicator 1950 is displayed over at least a portion of one or more notifications. In the embodiment shown in FIG. 19C, indicator 1950 includes translucent user interface object 1952, which is displayed over a portion of notification 1930. Translucent user interface object 1952 is representative of the extent of notification interface screen 1950 (e.g., the size and/or number of notifications 1926- 1938).

Indicator 1950 also includes an opaque user interface object 1954 overlaid on translucent user interface object 1952. The size and location of user interface object 1954 relative to translucent user interface object 1952 is representative of the position of the currently displayed notifications (e.g., notifications 1926, 1928, 1930, and 1932 in FIG. 19C) relative to the entire set of notifications associated with notification interface screen 1920 (e.g., notifications 1926- 1938). In some embodiments, indicator 1950 is representative of a proportion of the entire set of notifications that are currently displayed. For example, the size of opaque user interface object 1954 relative to the size of translucent user interface object 1952 represents the proportion of the notifications that are currently displayed.

In some embodiments, indicator 1950 is displayed in a fixed location. In some embodiments, indicator 1950 is displayed adjacent to rotatable input mechanism 508. In some embodiments, device 500 ceases to display indicator 1950 in accordance with a predetermined amount of time of inactivity after the input that causes scrolling. In some embodiments, device 500 ceases to display indicator 1950 by fading out indicator 1952 over time.

In some embodiments, device 500 can display notifications in orders other than strictly chronological. In some embodiments, device 500 can display notifications in an order based on any combination of chronology (e.g., date-time), the application associated with the alert, and the alert source.

Figure 20A:
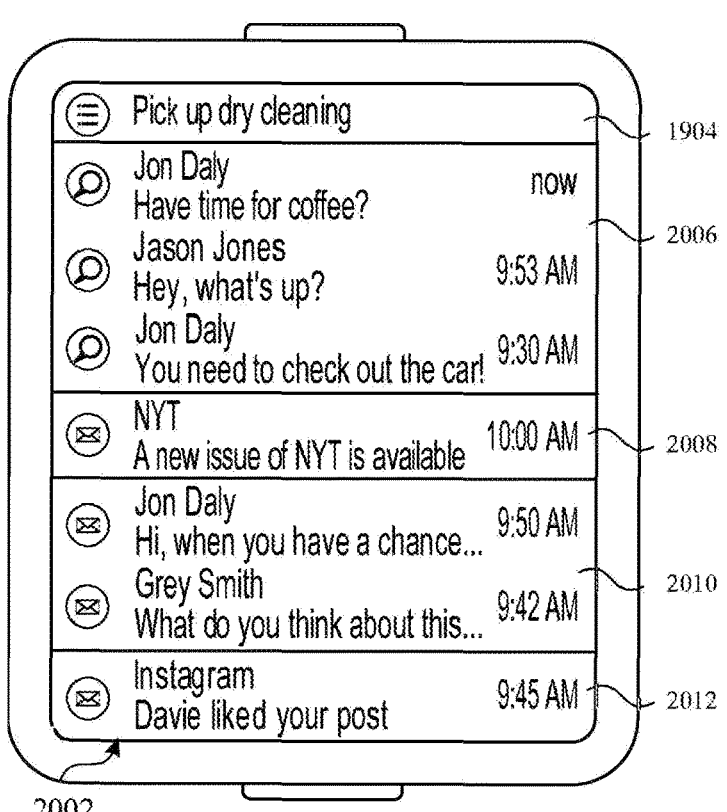

For example, FIG. 20A depicts a notification interface screen 2002 that includes the same set of notifications as depicted in FIG. 19. However, in notification interface screen 2002, the notifications are grouped by application, and are displayed chronologically within each application grouping. For example, all of the notifications representing text messages are displayed in notification group 2006, and are chronologically displayed within the group. As in FIG. 19A, the timeless notification 1904 is displayed at the top of the notification interface. In this example, the application grouping that includes the most recent notification is displayed closest to the top.

Figure 20B:
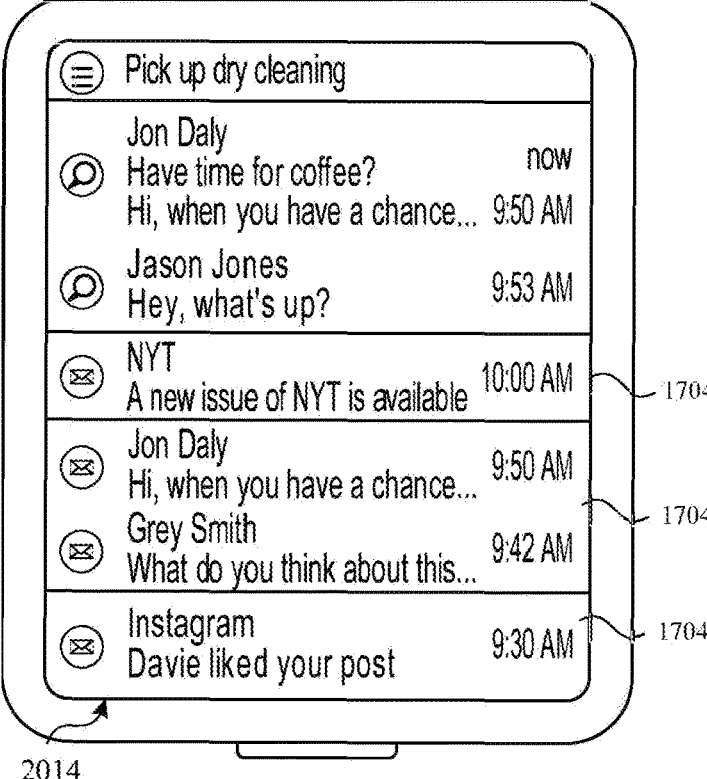

FIG. 20B depicts yet another notification interface screen 2004 that includes the same set of notifications depicted in FIG. 19. However, in notification interface screen 2004, the notifications are grouped first by the application associated with the alerts, then by the source of the alerts, then chronologically. In this example, the application grouping that includes the most recent notification is displayed closest to the top.

FIG. 21A depicts yet another notification interface screen 2102 that includes the same set of notifications depicted in FIG. 19. However, in notification interface screen 2102, the notifications are grouped by the alert source (e.g., Jon Daly, NYT), and then displayed chronologically for each source. In this example, the source group with the most recent notification is displayed at the top of the notifications.

FIG. 21B depicts yet another notification interface screen 2104 that includes the same set of notifications depicted in FIG. 19. As in FIG. 21A, the notifications are grouped by alert source, but in this example, they are also grouped by application within the source grouping. Within a given source grouping, the application group with the most recent notification is displayed at the top of the source grouping, and the source grouping with the most recent notification is displayed at the top of the notifications.

A person of skill in the art will recognize that many alternative groupings and orderings are possible, based on various information associated with the received alerts. Although FIGS. 19-21 depict notification interface screens that include past notifications, similar orderings may be used for display of future notifications. In some embodiments, device 500 can display future notifications in one order, and past notifications in a different order.

4. Alerts Received From External Device

As previously discussed, device 500 can obtain alerts from installed applications running on device 500, or can receive alerts from installed applications running on an external device that is in communication with device 500. In the latter case, the external device may be configured by a user to instruct device 500 to display notifications representing the alerts.

In some embodiments, the external device may display notification interfaces that are different from or similar to those described above. In some embodiments, the external device may be configured to suppress sending alerts to device 500 for one or more applications. In this case, a notification interface displayed on the external device may include alert notifications that are not included in a notification interface displayed on device 500. Techniques for configuring a device to forward notifications from one device to another are described in co-pending U.S. Provisional Patent Application entitled "Coordination of Message Alert Presentations Across Devices Based on Device Modes," filed Sep. 2, 2014 and naming James Cary as inventor, and co-pending U.S. Provisional Patent Application entitled "Message Processing By Subscriber App Prior To Message Forwarding," filed Sep. 2, 2014 and naming James Cary as inventor.

5. Methods For Managing Notification Interfaces

FIG. 22 is a flow diagram illustrating a method for displaying and managing notifications using an electronic device in accordance with some embodiments. Method 2200 may be performed at an electronic device with a touch-sensitive display screen, such as device 100, 300 and/or 500 (FIGS. 1, 3, 5, and 26). Some operations in method 2200 may be combined, the order of some operations may be changed, and some operations may be omitted.

As described below, method 2200 provides an intuitive way for displaying and managing alert notifications. The method reduces the cognitive burden on a user by reducing the number of inputs required to display information of interest to a user. For battery-operated computing devices, enabling a user to display and manage alert notifications faster and more efficiently conserves power and increase the time between battery charges.

At block 2202, the device obtains a plurality of alerts associated with date-times. At block 2204, the device detects a user input. In some embodiments, the user input may be a touch, tap, or swipe on the touchscreen (e.g., 112, 355, 504). In some embodiments, the user input may be a rotation of a rotatable input mechanism (e.g., 506). At block 2206, in response to detecting the user input, the device obtains a current date-time and displays a notification interface (as depicted in, for example, FIG. 6). The notification interface includes a first notification (e.g., 610) representing a first alert that is associated with a date-time before the current date-time, a second notification (e.g., 608) representing a second alert associated with a date-time after the current date-time, and a graphical separator (e.g., 616) between the first notification and the second notification. The first alert and second alert correspond to different installed applications.

Optionally, the device detects a second user input. In some embodiments, the user input may be a touch, tap, or swipe on the touchscreen (e.g., 112, 355, 504). In some embodiments, the user input may be a rotation of a rotatable input mechanism (e.g., 506). In response to detecting the second user input, the device scrolls the notification interface in accordance with the second user input (as depicted in, for example, FIG. 8).

Optionally, if the graphical separator (e.g., 616) is scrolled to a boundary of the touchscreen, the device can cease to scroll the graphical separator while continuing to scroll the additional notifications in accordance with the second input (as depicted in, for example, FIG. 6).

Note that details of the processes described above with respect to method 2200 (e.g., FIGS. 22, 6, and 8) are also applicable in an analogous manner to the other methods described herein. For example, methods 2300, 2400, 2500, 3200, 3400, and 3500 may include one or more of the characteristics of the various methods described above with reference to method 2200. For brevity, these details are not repeated in the descriptions of the other processes. The various methods and techniques described above with reference to method 2200 may be optionally implemented as one or more hardware units, such as those described with regard to FIGS. 5B and 26.

FIG. 23 is a flow diagram illustrating a method for displaying and managing notifications using an electronic device in accordance with some embodiments. Method 2300 may be performed at an electronic device with a touch-sensitive display screen, such as device 100, 300 and/or 500 (FIGS. 1, 3, 5, and 27). Some operations in method 2300 may be combined, the order of some operations may be changed, and some operations may be omitted.

As described below, method 2300 provides an intuitive way for displaying and managing alert notifications, by providing an intuitive representation of received alerts. The method reduces the cognitive burden on a user by reducing the number of inputs required to display information of interest to a user. For battery-operated computing devices, enabling a user to display and manage alert notifications faster and more efficiently conserves power and increase the time between battery charges.

At block 2302, the device obtains a plurality of alerts associated with date-times. At block 2304, the device detects a user input. In some embodiments, the user input may be a touch, tap, or swipe on the touchscreen (e.g., 112, 355, 504). In some embodiments, the user input may be a rotation of a rotatable input mechanism (e.g., 506). At block 2306, in response to detecting the user input, the device obtains a current date-time, and displays a plurality of past notifications (e.g., 1310) representing a plurality of past alerts associated with date-times before the current date-time (as depicted in FIG. 13, for example). The plurality of past alerts correspond to a first plurality of installed applications. At block 2308, the device detects a contact on the touchscreen (e.g., 112, 355, 504). At block 2310, the device determines whether the contact was a tap or a substantially horizontal swipe. At block 2312, in accordance with a determination that the contact was a substantially horizontal swipe, the device displays a plurality of future notifications (e.g., 1308) representing a plurality of future alerts associated with date-times after the current date-time (as depicted in FIG. 13, for example). The plurality of future alerts correspond to a second plurality of installed applications.

Note that details of the processes described above with respect to method 2300 (e.g., FIGS. 23 and 13) are also applicable in an analogous manner to the other methods described herein. For example, methods 2200, 2400, 2500, 3200, 3400, and 3500 may include one or more of the characteristics of the various methods described above with reference to method 2300. For brevity, these details are not repeated in the descriptions of the other methods. The various methods and techniques described above with reference to method 2300 may be optionally implemented as one or more hardware units, such as those described with regard to FIGS. 5B and 27.

FIG. 24 is a flow diagram illustrating a method for displaying and managing notifications using an electronic device in accordance with some embodiments. Method 2400 may be performed at an electronic device with a touch-sensitive display screen, such as device 100, 300 and/or 500 (FIGS. 1, 3, 5, and 29). Some operations in method 2400 may be combined, the order of some operations may be changed, and some operations may be omitted.

As described below, method 2400 provides an intuitive way for displaying and managing alert notifications, by providing an intuitive representation of received alerts. The method reduces the cognitive burden on a user by reducing the number of inputs required to display information of interest to a user. For battery-operated computing devices, enabling a user to display and manage alert notifications faster and more efficiently conserves power and increase the time between battery charges.

At block 2402, the device obtains a plurality of alerts associated with date-times. At block 2404, the device detects a user input. In some embodiments, the user input may be a touch, tap, or swipe on the touchscreen (e.g., 112, 355, 504). In some embodiments, the user input may be a rotation of a rotatable input mechanism (e.g., 506). At block 2406, in response to detecting the user input, the device obtains a first current date-time, and displays a plurality of past notifications (e.g., 1404, 1406) representing a plurality of past alerts associated with date-times before the first current date-time, as depicted in FIG. 14, for example. The plurality of past alerts correspond to a first plurality of installed applications. At block 2408, the device detects a contact on the touchscreen (e.g., 112, 355, 504). At block 2410, the device determines whether the contact was a tap or a substantially horizontal swipe. At block 2412, in accordance with a determination that the contact was a substantially horizontal swipe, the device displays a single future notification (e.g., 1416, FIG. 15A-15D, FIG. 16) representing the most immediate upcoming alert relative to the second current date-time.

Note that details of the processes described above with respect to method 2400 (e.g., FIGS. 24 and 14) are also applicable in an analogous manner to the other methods described herein. For example, methods 2200, 2300, 2500, 3200, 3400, and 3500 may include one or more of the characteristics of the various processes described above with reference to method 2400. For brevity, these details are not repeated in the descriptions of the other processes. The various methods and techniques described above with reference to method 2400 may be optionally implemented as one or more hardware units, such as those described with regard to FIGS. 5B and 29.

FIG. 25 is a flow diagram illustrating a method for displaying and managing notifications using an electronic device in accordance with some embodiments. Method 2500 may be performed at an electronic device with a touch-sensitive display screen, such as device 100, 300 and/or 500 (FIGS. 1, 3, 5, and 30). Some operations in method 2500 may be combined, the order of some operations may be changed, and some operations may be omitted.

As described below, method 2500 provides an intuitive way for invoking display of alert notifications. The method reduces the cognitive burden on a user by reducing the number of inputs required to display information of interest to a user. For battery-operated computing devices, enabling a user to display and manage alert notifications faster and more efficiently conserves power and increase the time between battery charges.

At block 2502, the device obtains a plurality of alerts corresponding to at least two installed applications. At block 2504, the device displays a first set of user interface objects (e.g., 604). At block 2506, the device detects a rotation of a rotatable input device (e.g., 506). At block 2508, in response to detecting the rotation, the device determines whether the first set of user interface objects meets a threshold criteria. At block 2510, in accordance with a determination that the first set of user interface objects meets the threshold criteria, the device replaces display of the first set of user interface objects with display of a plurality of notifications representing the plurality of alerts (as depicted in, for example, FIG. 18). At block 2512, in accordance with a determination that the first set of user interface objects does not meet the threshold criteria, the device display a second set of user interface objects (e.g., 1804), wherein the second set is larger than the first set and comprises the first set.

Note that details of the processes described above with respect to method 2500 (e.g., FIGS. 25 and 18) are also applicable in an analogous manner to the other methods described herein. For example, methods 2200, 2300, 2400, 3200, 3400, and 3500 may include one or more of the characteristics of the various processes described above with reference to method 2500. For brevity, these details are not repeated in the descriptions of the other processes. The various methods and techniques described above with reference to method 2500 may be optionally implemented as one or more hardware units, such as those described with regard to FIGS. 5B and 30.

FIG. 32 is a flow diagram illustrating a method for displaying and managing notifications using an electronic device in accordance with some embodiments. Method 3200 may be performed at an electronic device with a touch-sensitive display screen, such as device 100, 300 and/or 500 (FIGS. 1, 3, 5, and 33). Some operations in method 3200 may be combined, the order of some operations may be changed, and some operations may be omitted.

As described below, method 3200 provides an intuitive way for invoking display of alert notifications. The method reduces the cognitive burden on a user by reducing the number of inputs required to display information of interest to a user. For battery-operated computing devices, enabling a user to display and manage alert notifications faster and more efficiently conserves power and increase the time between battery charges.

At block 3202, the device receives a plurality of alerts. In some embodiments, the alerts are associated with date-times, include content, and/or correspond to a plurality of installed applications. At block 3204, the device detects a user input (e.g., as depicted in FIGS. 6, 11B, 12, 13, 14, 17, and 18). At block 3206, the device displays a notification interface on the display in response to detecting the user input (e.g., 1920). In some embodiments, the notification interface comprises a plurality of notifications (e.g., 1926-1938) representing at least a subset of the plurality of alerts. In some embodiments, the notifications are displayed in a chronological order based on the date-times associated with the alerts. In some embodiments, the notifications include user interface objects representative of the corresponding installed applications of the alerts (e.g., 1943-1945). In some embodiments, the notifications include at least a portion of the content of the plurality of alerts (e.g., 1941, 1942).

Note that details of the processes described above with respect to method 3200 (e.g., FIGS. 32 and 19A-19C) are also applicable in an analogous manner to the other methods described herein. For example, methods 2200, 2300, 2400, 2500, 3400, and 3500 may include one or more of the characteristics of the various processes described above with reference to method 3200. For brevity, these details are not repeated in the descriptions of the other processes. The various methods and techniques described above with reference to method 3200 may be optionally implemented as one or more hardware units, such as those described with regard to FIGS. 5B and 33.

Figure 26:
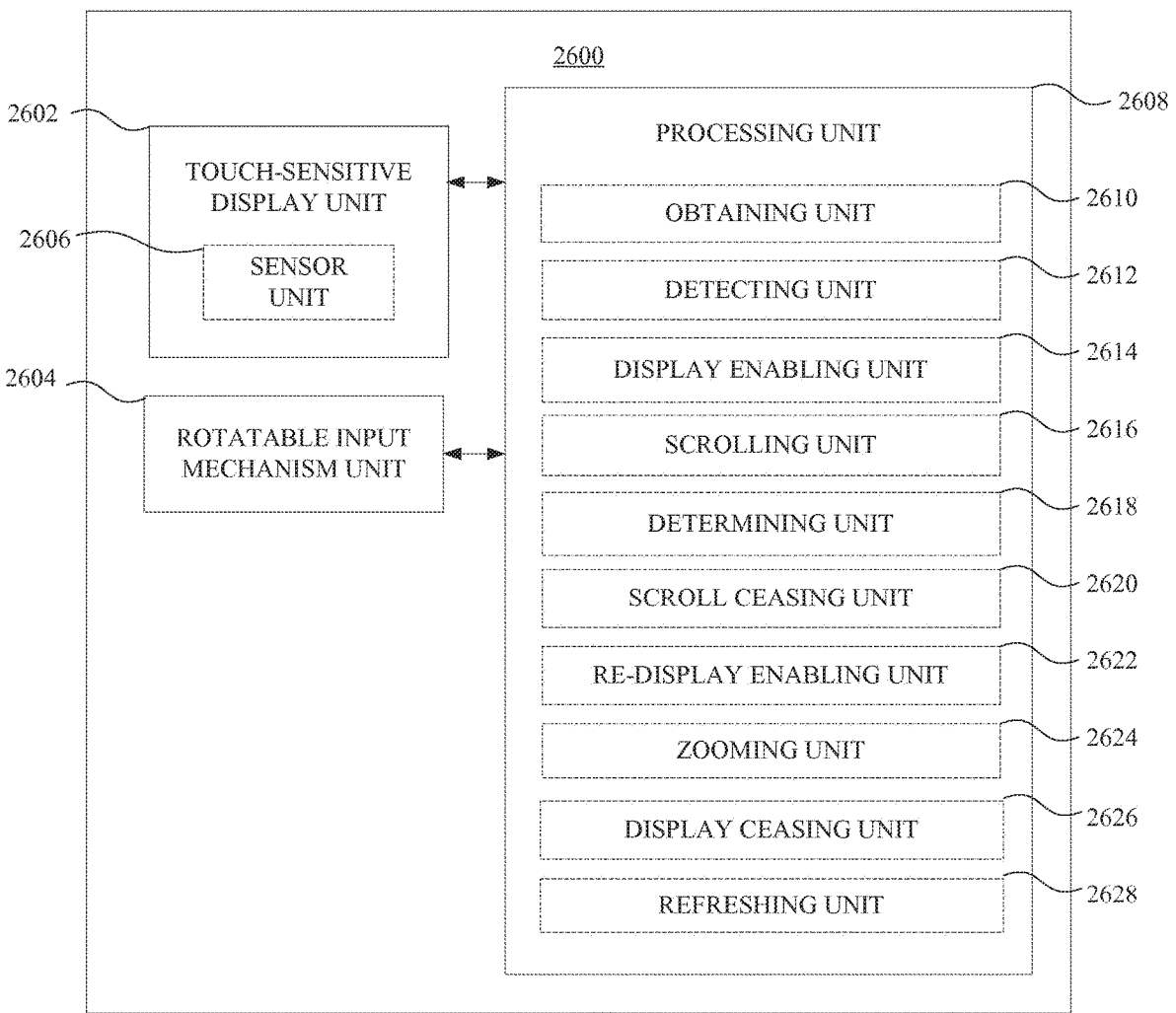
FIGS. 26-31 illustrate functional block diagrams in accordance with some embodiments.

In accordance with some embodiments, FIG. 26 shows an exemplary functional block diagram of an electronic device 2600 configured in accordance with the principles of the various described embodiments. In accordance with some embodiments, the functional blocks of electronic device 2600 are configured to perform the techniques described above. The functional blocks of the device 2600 are, optionally, implemented by hardware, software, or a combination of hardware and software to carry out the principles of the various described examples. It is understood by persons of skill in the art that the functional blocks described in FIG. 26 are, optionally, combined or separated into sub-blocks to implement the principles of the various described examples. Therefore, the description herein optionally supports any possible combination or separation or further definition of the functional blocks described herein.

As shown in FIG. 26, an electronic device 2600 includes a touch-sensitive display unit 2602 configured to display a graphic user interface and receive contacts, optionally, a rotatable input mechanism unit 2604, and a processing unit 2608 coupled to the touch-sensitive display unit 2602 and, optionally, the rotatable input mechanism unit 2604. In some embodiments, the touch-sensitive display unit 2602 includes one or more sensor units 2606 configured to detect the intensity of contacts with the touch-sensitive display unit 2602. In some embodiments, the processing unit 2608 includes an obtaining unit 2610, a detecting unit 2612, a display enabling unit 2614, a scrolling unit 2616, a determining unit 2618, a scroll ceasing unit 2620, a re-display enabling unit 2622, a zooming unit 2624, a display ceasing unit 2626, and a refreshing unit 2628.

The processing unit 2608 is configured to: obtain (e.g., with obtaining unit 2610) a plurality of alerts associated with date-times; detect (e.g., with detecting unit 2612) a user input; in response to detecting the user input: obtain (e.g., with obtaining unit 2610) a current date-time, and enable display (e.g., with display enabling unit 2614) of a notification interface on the touch-sensitive display unit 2602, the notification interface comprising: a first notification representing a first alert of the plurality of alerts associated with a date-time after the current date-time, a second notification representing a second alert of the plurality of alerts associated with a date-time before the current date-time, and a graphical separator between the first notification and the second notification, wherein the graphical separator comprises an indication of the current date-time, wherein the first alert and the second alert correspond to different installed applications.

In some embodiments, the first notification represents the next immediate upcoming alert in the plurality of alerts, based on the current date-time.

In some embodiments, processing unit 2608 is further configured to: detect (e.g., with detecting unit 2612) a second user input; in response to detecting the second user input, scroll (e.g., with scrolling unit 2616) the notification interface in a first direction in accordance with the second user input to display of additional notifications representing additional alerts in the plurality of alerts; determine (e.g., with determining unit 2618) whether the graphical separator has been scrolled to a boundary of the touch-sensitive display unit 2602; and in accordance with a determination that the graphical separator has been scrolled to the boundary of the touch-sensitive display unit 2602, cease to scroll (e.g., with scroll ceasing unit 2620) the graphical separator while continuing to scroll the additional notifications in the first direction in accordance with the second user input.

In some embodiments, the notification interface is displayed in an initial position before scrolling and processing unit 2608 is further configured to: after scrolling the notification interface, detect (e.g., with detecting unit 2612) a user selection of the graphical separator; and in response to detecting the selection, enable re-display (e.g., with re-display enabling unit 2622) of the notification interface in the initial position.

In some embodiments, electronic device 2600 further includes a rotatable input mechanism unit 2604, wherein processing unit 2608 is coupled to rotatable input mechanism unit 2604, and the second user input is a rotation of rotatable input mechanism unit 1604.

In some embodiments, the second user input is a substantially vertical swipe or flick on touch-sensitive display unit 2602.

In some embodiments, electronic device 2600 further includes a rotatable input mechanism unit 2604, wherein processing unit 2608 is coupled to rotatable input mechanism unit 2604, and processing unit 2608 is further configured to: while displaying the notification interface, detect (e.g., with detecting unit 2612) a touch on touch-sensitive display unit 2602 and detect (e.g., with detecting unit 2612) a rotation of rotatable input mechanism unit 2604; and in response to detecting the touch and the rotation, zoom (e.g., with zooming unit 2624) the notification interface.

In some embodiments, the touch and at least a portion of the rotation are detected essentially simultaneously.

In some embodiments, the first alert comprises content, and processing unit 2608 is further configured to: detect (e.g., with detecting unit 2612) a contact on the first notification; and in response to detecting the contact: cease to display (e.g., with display ceasing unit 2626) the notification interface, and enable display (e.g., with display enabling unit 2614) of the content.

In some embodiments, processing unit 2608 is further configured to: after displaying the information, detect (e.g., with detecting unit 2612) a third user input; and in response to detecting the third user input: refresh (e.g., with refreshing unit 2628) the current date-time, and enable re-display (e.g., with re-display enabling unit 2622) of the notification interface based on the refreshed current date-time, wherein the notification interface excludes the first notification.

In some embodiments, the first notification comprises a first affordance for launching a first installed application corresponding to the first alert, and wherein the second notification comprises a second affordance for launching a second installed application corresponding to the second alert.

In some embodiments, launching the first or second installed application comprises displaying the first or second installed application on touch-sensitive display unit 2602.

In some embodiments, touch-sensitive display unit 2602 comprises one or more sensor units 2606 to detect the intensity of contacts with touch-sensitive display unit 2602, the notification interface comprises a plurality of notifications representing at least a subset of the plurality of alerts, and processing unit 2608 is further configured to: while displaying the notification interface, detect (e.g., with detecting unit 2612) a contact on the touch-sensitive display unit 2602: determine (e.g., with determining unit 2618) whether the characteristic intensity of the contact is above a threshold intensity; in accordance with a determination that the characteristic intensity of the contact is above the threshold intensity, enable display (e.g., with display enabling unit 2614) of an affordance for removing the plurality of notifications from the notification interface; and in accordance with a determination that the characteristic intensity of the contact is below the threshold intensity, and in accordance with a determination that the contact is at a location on touch-sensitive display unit 2602 corresponding to a third notification of the plurality of notifications, wherein the third notification represents a third alert of the plurality of alerts, and wherein the third alert comprises content: cease to display (e.g., with display ceasing unit 2626) the notification interface, and enable display (e.g., with display enabling unit 2614) of the content.

In some embodiments, the notification interface comprises a plurality of notifications representing at least a subset of the plurality of alerts, and wherein displaying the notification interface comprises displaying the plurality of notifications in a chronological order based on the date-times associated with the at least a subset of the plurality of alerts.

In some embodiments, displaying the notification interface comprises displaying the plurality of notifications in an order based on the applications corresponding to the at least a subset of the plurality of alerts.

In some embodiments, displaying the notification interface comprises displaying the plurality of notifications in an order based on a plurality of sources associated with the at least a subset of the plurality of alerts.

In some embodiments, the plurality of alerts comprises a location-based alert, and wherein displaying the notification interface comprises displaying a notification representing the location-based alert at the top of the notification interface regardless of the value of any date-time associated with the location-based alert.

The operations described above with reference to FIG. 22 are, optionally, implemented by components depicted in FIGS. 1A-1B or FIG. 26. For example, obtaining operation 2202, detecting operation 2204, and displaying operation 2206 may be implemented by event sorter 170, event recognizer 180, and event handler 190. Event monitor 171 in event sorter 170 detects a user input event, such as a contact on touch-sensitive display 112, and event dispatcher module 174 delivers the event information to application 136-1. A respective event recognizer 180 of application 136-1 compares the event information to respective event definitions 186, and determines whether the user input corresponds to a predefined event or sub event, such as a request to launch an application or activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 27:
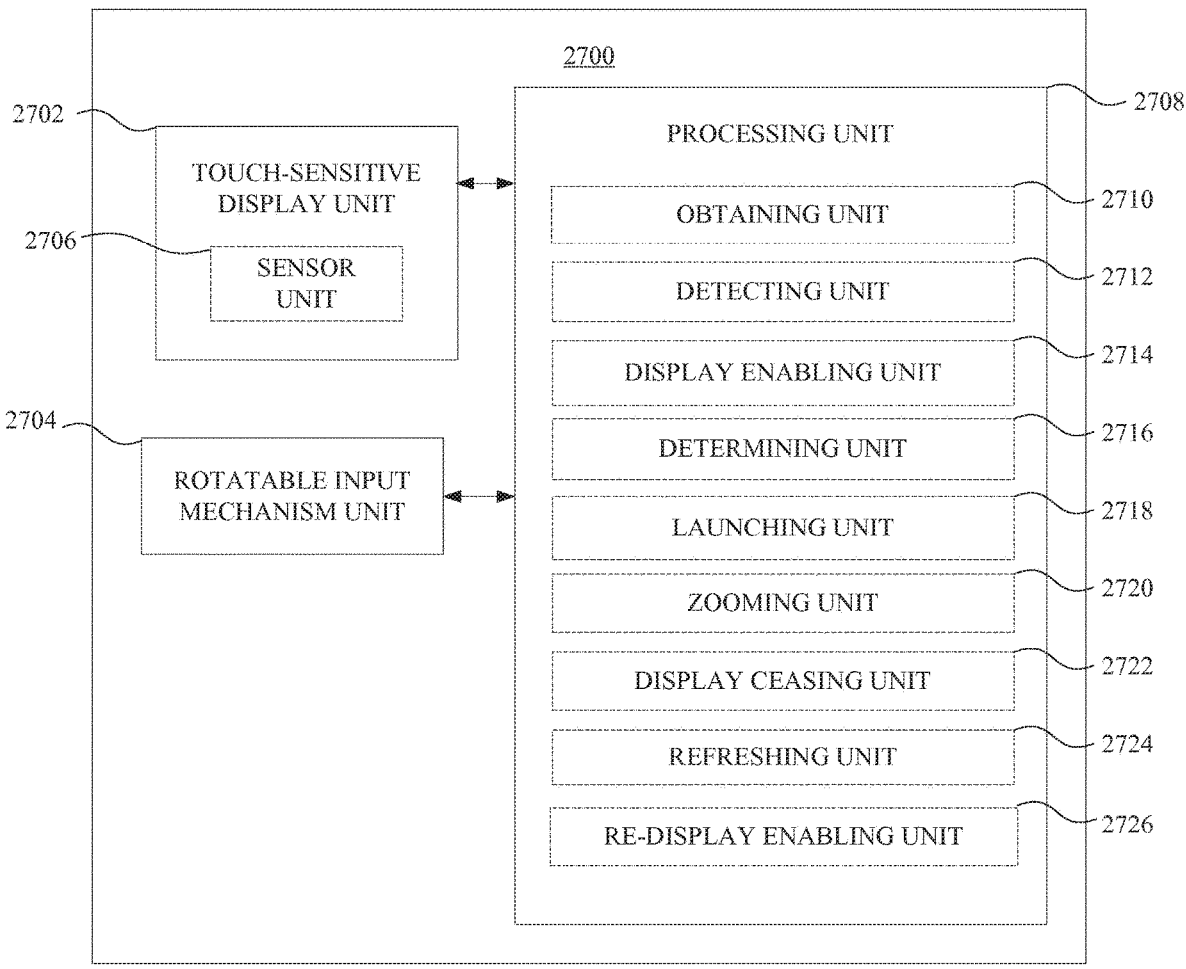

In accordance with some embodiments, FIG. 27 shows an exemplary functional block diagram of an electronic device 2700 configured in accordance with the principles of the various described embodiments. In accordance with some embodiments, the functional blocks of electronic device 2700 are configured to perform the techniques described above. The functional blocks of the device 2700 are, optionally, implemented by hardware, software, or a combination of hardware and software to carry out the principles of the various described examples. It is understood by persons of skill in the art that the functional blocks described in FIG. 27 are, optionally, combined or separated into sub-blocks to implement the principles of the various described examples. Therefore, the description herein optionally supports any possible combination or separation or further definition of the functional blocks described herein.

As shown in FIG. 27, an electronic device 2700 includes a touch-sensitive display unit 2702 configured to display a graphic user interface and receive contacts, optionally, a rotatable input mechanism unit 2704, and a processing unit 2708 coupled to the touch-sensitive display unit 2702 and, optionally, the rotatable input mechanism unit 2704. In some embodiments, the touch-sensitive display unit 2702 includes one or more sensor units 2706 configured to detect the intensity of contacts with the touch-sensitive display unit 2702. In some embodiments, the processing unit 2708 includes an obtaining unit 2710, a detecting unit 2712, a display enabling unit 2714, a determining unit 2716, a launching unit 2718, a zooming unit 2720, a display ceasing unit 2722, a refreshing unit 2724, and a re-display enabling unit 2726.

The processing unit 2708 is configured to: obtain (e.g., with obtaining unit 2710) a plurality of alerts associated with date-times; detect (e.g., with detecting unit 2712) a first user input; in response to detecting the first user input: obtain (e.g., with obtaining unit 2710 a first current date-time, and enable display (e.g., with display enabling unit 2714) of a plurality of past notifications representing a plurality of past alerts from the plurality of alerts, wherein the plurality of past alerts are associated with date-times before the current date-time, and wherein the plurality of past alerts correspond to a first plurality of installed applications; detect (e.g., with detecting unit 2712) a contact on the touch-sensitive display unit 2702; determine (e.g., with determining unit 2716) whether the contact is a tap or a substantially horizontal swipe; in response to a determination that the contact is a substantially horizontal swipe: obtain (e.g., with obtaining unit 2710) a second current date-time, and enable display (e.g., with display enabling unit 2714) of a plurality of future notifications representing a plurality of future alerts from the plurality of alerts, wherein the plurality of future alerts are associated with date-times after the second current date-time, and wherein the plurality of future alerts correspond to a second plurality of installed applications.

In some embodiments, processing unit 2708 is further configured to: in accordance with a determination that the contact is a tap, and wherein the tap is detected at a location on the touch-sensitive display unit 2702 corresponding to a past notification of the plurality of past notifications, launch (e.g., with launching unit 2718) the installed application corresponding to the past alert represented by the past notification.

In some embodiments, electronic device 2700 further includes a rotatable input mechanism unit 2704, wherein processing unit 2708 is coupled to the rotatable input mechanism unit 2704 and processing unit 2708 is further configured to: while displaying the plurality of past notifications or the plurality of future notifications, detect (e.g., with detecting unit 2712) a second contact on the touch-sensitive display unit 2702 and detect (e.g., with detecting unit 2712) a rotation of the rotatable input mechanism unit 2704; in response to detecting the second contact and the rotation, zoom (e.g., with zooming unit 2720) the displayed plurality of past notifications or plurality future notifications.

In some embodiments, the second contact and at least a portion of the rotation occur essentially simultaneously.

In some embodiments, processing unit 2708 is further configured to: while displaying the plurality of past notifications, detect (e.g., with detecting unit 2712) a third contact on the touch-sensitive display unit 2702 at a location corresponding to a first past notification, wherein the first past notification represents an alert in the plurality of alerts and wherein the alert comprises content; and in response to detecting the third contact: cease to display (e.g., with display ceasing unit 2722) the plurality of past notifications, and enable display (e.g., with display enabling unit 2714) of the content.

In some embodiments, processing unit 2708 is further configured to: after displaying the content, detect (e.g., with detecting unit 2712) a third user input; and in response to detecting the third user input: refresh (e.g., with refreshing unit 2724) the current date-time, and enable re-display (e.g., with re-display enabling unit 2726) of the plurality of past notifications based on the refreshed current date-time, wherein the plurality of past notifications excludes the first past notification.

In some embodiments, the touch-sensitive display comprises one or more sensor units 2706 to detect the intensity of contacts with the touch-sensitive display unit 2702 and processing unit 2708 is further configured to: while displaying a plurality of past or future notifications, detect (e.g., with detecting unit 2712) a fourth contact on the touch-sensitive display unit 2702; determine (e.g., with determining unit 2716) whether the characteristic intensity of the fourth contact is above a threshold intensity; in accordance with a determination that the characteristic intensity of the fourth contact is above the threshold intensity, enable display (e.g., with display enabling unit 2714) of an affordance for removing the displayed plurality of past or future notifications; and in accordance with a determination that the intensity of the fourth contact is below the threshold intensity, and in response to detecting the fourth contact at a location on touch-sensitive display unit 2702 corresponding to a first notification of the plurality of past or future notifications, the first notification representing a first alert of the plurality of alerts, wherein the first alert comprises content: cease to display (e.g., with display ceasing unit 2722) the plurality of past or future notifications, and enable display (e.g., with display enabling unit 2714) of the content.

In some embodiments, the plurality of past notifications are displayed in a first chronological order based on the date-times associated with the plurality of past alerts, and wherein the plurality of future notifications are displayed in a second chronological order based on the date-times associated with the plurality of future alerts.

In some embodiments, the plurality of past notifications are displayed in a third order based on the applications corresponding to the plurality of past alerts, and wherein the plurality of future notifications are displayed in a fourth order based on the applications corresponding to the plurality of past alerts.

In some embodiments, the third order and the fourth order are the same order.

In some embodiments, the plurality of past notifications are displayed in a fifth order based on a plurality of sources associated with the plurality of past alerts, and wherein the plurality of past notifications are displayed in a sixth order based on a plurality of sources associated with the plurality of future alerts.

In some embodiments, the fifth order and the sixth order are the same order.

The operations described above with reference to FIG. 23 are, optionally, implemented by components depicted in FIGS. 1A-1B or FIG. 27. For example, obtaining operation 2302, detecting operations 2304 and 2308, displaying operations 2306 and 231, and determining operation 2310 may be implemented by event sorter 170, event recognizer 180, and event handler 190. Event monitor 171 in event sorter 170 detects a user input event, such as a contact on touch-sensitive display 112, and event dispatcher module 174 delivers the event information to application 136-1. A respective event recognizer 180 of application 136-1 compares the event information to respective event definitions 186, and determines whether the user input corresponds to a predefined event or sub event, such as a request to launch an application or activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 28:
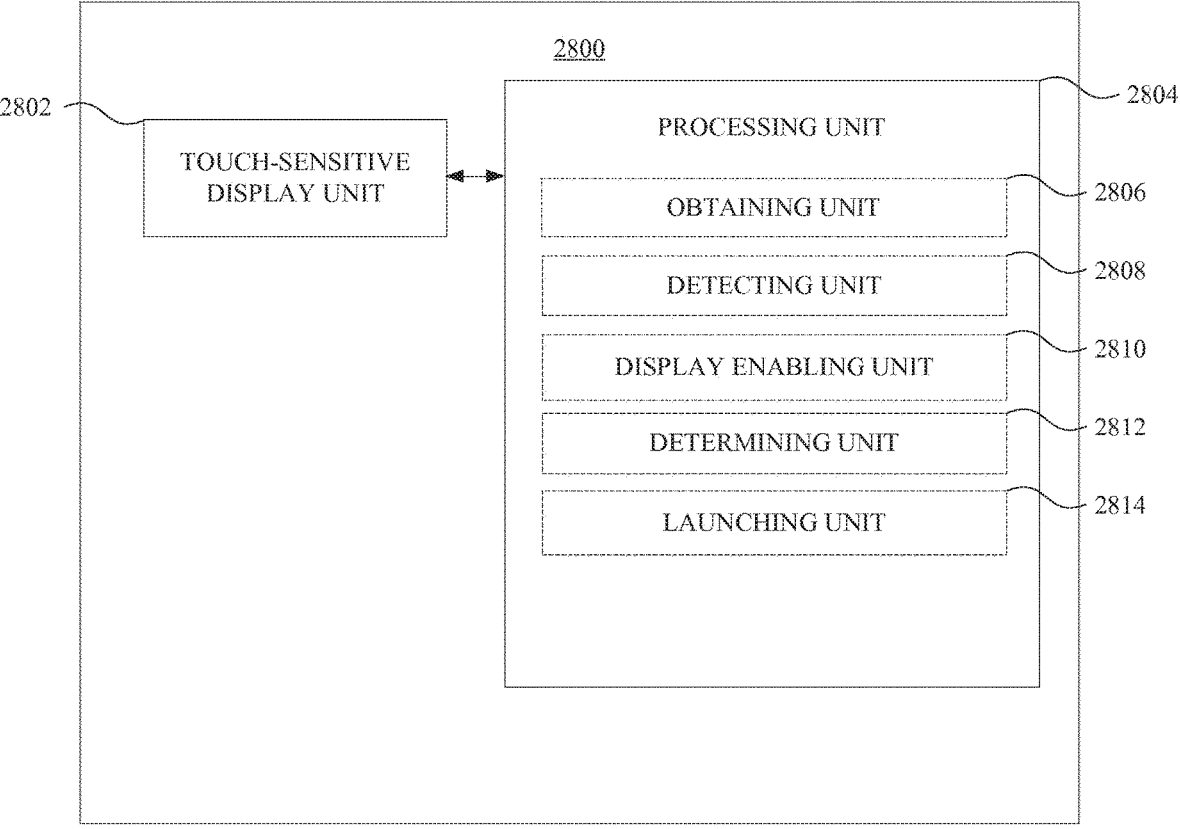

In accordance with some embodiments, FIG. 28 shows an exemplary functional block diagram of an electronic device 2800 configured in accordance with the principles of the various described embodiments. In accordance with some embodiments, the functional blocks of electronic device 2800 are configured to perform the techniques described above. The functional blocks of the device 2800 are, optionally, implemented by hardware, software, or a combination of hardware and software to carry out the principles of the various described examples. It is understood by persons of skill in the art that the functional blocks described in FIG. 28 are, optionally, combined or separated into sub-blocks to implement the principles of the various described examples. Therefore, the description herein optionally supports any possible combination or separation or further definition of the functional blocks described herein.

As shown in FIG. 28, an electronic device 2800 includes a touch-sensitive display unit 2802 configured to display a graphic user interface and receive contacts and a processing unit 2804 coupled to the touch-sensitive display unit 2802. In some embodiments, processing unit 2804 includes an obtaining unit 2806, a detecting unit 2808, a display enabling unit 2810, a determining unit 2812, and a launching unit 2814.

The processing unit 2804 is configured to: obtain (e.g., with obtaining unit 2806) a plurality of alerts associated with date-times; detect (e.g., with detecting unit 2808) a first user input; in response to detecting the first user input: obtain (e.g., with obtaining unit 2806) a first current date-time; enable display (e.g., with display enabling unit 2810) of a plurality of future notifications representing a plurality of future alerts from the plurality of alerts, wherein the plurality of future alerts are associated with date-times after the first current date-time, and wherein the plurality of future alerts correspond to a first plurality of installed applications; detect (e.g., with detecting unit 2808) a contact on the touch-sensitive display unit 2802; determine (e.g., with determining unit 2812) whether the contact is a tap or a substantially horizontal swipe; in accordance with a determination that the contact is a substantially horizontal swipe: obtain (e.g., with obtaining unit 2806) a second current date-time; and enable display (e.g., with display enabling unit 2810) of a plurality of past notifications representing a plurality of past alerts from the plurality of alerts, wherein the plurality of past alerts are associated with date-times before the second current date-time, and wherein the plurality of past alerts correspond to a second plurality of installed applications.

In some embodiments, processing unit 2804 is further configured to: in accordance with a determination that the contact is a tap, wherein the tap is detected at a location on touch-sensitive display unit 2802 corresponding to a first future notification of the plurality of future notifications, launch (e.g., with launching unit 2814) the installed application corresponding to the future alert represented by the first future notification.

The operations described below with reference to FIG. 34 are, optionally, implemented by components depicted in FIGS. 1A-1B or FIG. 28. For example, obtaining operations 3402 and 3406, detecting operations 3404 and 3408, determining operation 3410, and displaying operations 3406 and 3412 may be implemented by event sorter 170, event recognizer 180, and event handler 190. Event monitor 171 in event sorter 170 detects a user input event, such as a contact on touch-sensitive display 112, and event dispatcher module 174 delivers the event information to application 136-1. A respective event recognizer 180 of application 136-1 compares the event information to respective event definitions 186, and determines whether the user input corresponds to a predefined event or sub event, such as a request to launch an application or activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 29:
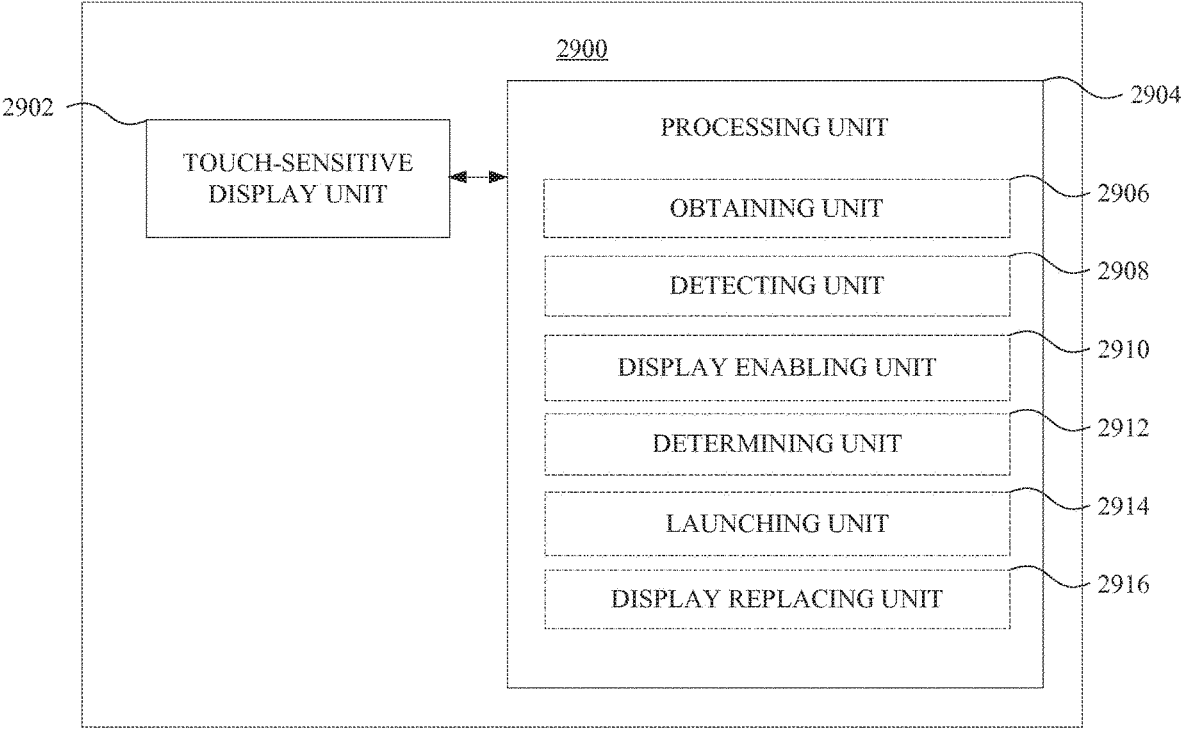

In accordance with some embodiments, FIG. 29 shows an exemplary functional block diagram of an electronic device 2900 configured in accordance with the principles of the various described embodiments. In accordance with some embodiments, the functional blocks of electronic device 2900 are configured to perform the techniques described above. The functional blocks of the device 2900 are, optionally, implemented by hardware, software, or a combination of hardware and software to carry out the principles of the various described examples. It is understood by persons of skill in the art that the functional blocks described in FIG. 29 are, optionally, combined or separated into sub-blocks to implement the principles of the various described examples. Therefore, the description herein optionally supports any possible combination or separation or further definition of the functional blocks described herein.

As shown in FIG. 29, an electronic device 2900 includes a touch-sensitive display unit 2902 configured to display a graphic user interface and receive contacts and a processing unit 2904 coupled to the touch-sensitive display unit 2902. In some embodiments, processing unit 2904 includes an obtaining unit 2906, a detecting unit 2908, a display enabling unit 2910, a determining unit 2912, a launching unit 2914, and a display replacing unit 2916.

The processing unit 2904 is configured to: obtain (e.g., with obtaining unit 2906) a plurality of alerts associated with date-times; detect (e.g., with detecting unit 2908) a first user input: in response to detecting the first user input: obtain (e.g., with obtaining unit 2906) a first current date-time, and enable display (e.g., with display enabling unit 2910) of a plurality of past notifications representing a plurality of past alerts from the plurality of alerts, wherein the plurality of past alerts are associated with date-times before the first current date-time, and wherein the plurality of past alerts correspond to a first plurality of installed applications; detect (e.g., with detecting unit 2908) a contact on the touch-sensitive display unit 2902; determine (e.g., with determining unit 2912) whether the contact is a tap or a substantially horizontal swipe; in accordance with a determination that the contact is a substantially horizontal swipe: obtain (e.g., with obtaining unit 2906) a second current date-time, and enable display (e.g., with display enabling unit 2910) of a single future notification representing the most immediate upcoming alert in the plurality of alerts relative to the second current date-time.

In some embodiments, processing unit 2904 is further configured to: in accordance with a determination that the contact is a tap, wherein the tap is detected at a location on touch-sensitive display unit 2902 corresponding to a first past notification of the plurality of past notifications, launch (e.g., with launching unit 2914) the installed application corresponding to the past alert represented by the first past notification.

In some embodiments, processing unit 2904 is further configured to: while the single future notification is displayed, detect (e.g., with detecting unit 2908) a second contact on the touch-sensitive display unit 2902; in response to detecting the second contact, determine (e.g., with determining unit 2912) whether the second contact is a tap or a substantially horizontal swipe; in accordance with a determination that the second contact is a substantially horizontal swipe, replace display (e.g., with display replacing unit 2916) of the single future notification with display of one or more indications of the user's activities; and in accordance with a determination that the second contact is a tap, and wherein the tap is detected at a location corresponding to the single future notification, launch (e.g., with launching unit 2914) the installed application corresponding to the most immediate upcoming alert represented by the single future notification.

The operations described above with reference to FIG. 24 are, optionally, implemented by components depicted in FIGS. 1A-1B or FIG. 29. For example, obtaining operation 2402, detecting operations 2404 and 2408, displaying operation 2406 and determining operation 2410 may be implemented by event sorter 170, event recognizer 180, and event handler 190. Event monitor 171 in event sorter 170 detects a user input event, such as a contact on touch-sensitive display 112, and event dispatcher module 174 delivers the event information to application 136-1. A respective event recognizer 180 of application 136-1 compares the event information to respective event definitions 186, and determines whether the user input corresponds to a predefined event or sub event, such as a request to launch an application or activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 30:
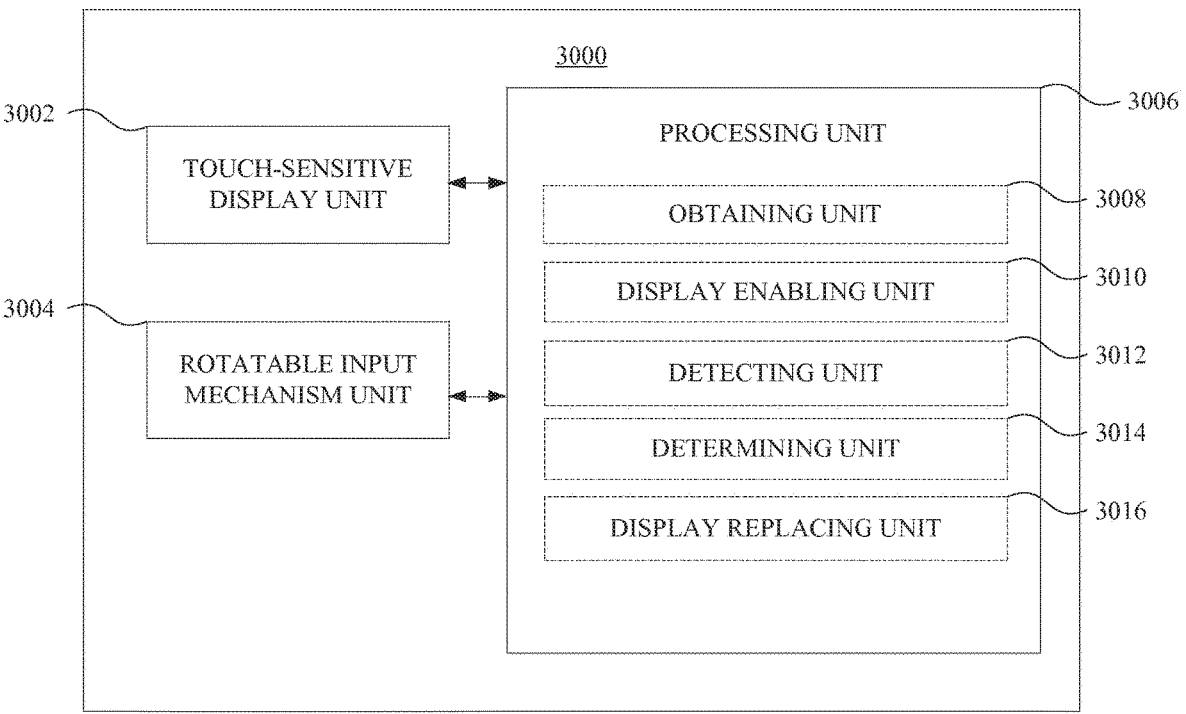

In accordance with some embodiments, FIG. 30 shows an exemplary functional block diagram of an electronic device 3000 configured in accordance with the principles of the various described embodiments. In accordance with some embodiments, the functional blocks of electronic device 3000 are configured to perform the techniques described above. The functional blocks of the device 3000 are, optionally, implemented by hardware, software, or a combination of hardware and software to carry out the principles of the various described examples. It is understood by persons of skill in the art that the functional blocks described in FIG. 30 are, optionally, combined or separated into sub-blocks to implement the principles of the various described examples. Therefore, the description herein optionally supports any possible combination or separation or further definition of the functional blocks described herein.

As shown in FIG. 30, an electronic device 3000 includes a touch-sensitive display unit 3002 configured to display a graphic user interface and receive contacts, a rotatable input mechanism unit 3004, and a processing unit 3006 coupled to the touch-sensitive display unit 3002 and the rotatable input mechanism unit 3004. In some embodiments, the processing unit 3006 includes an obtaining unit 3008, a display enabling unit 3010, a detecting unit 3012, a determining unit 3014, and a display replacing unit 3016.

The processing unit 3006 is configured to: obtain (e.g., with obtaining unit 3008) a plurality of alerts; enable display (e.g., with display enabling unit 3010) of a first set of user interface objects; detect (e.g., with detecting unit 3012) a rotation of the rotatable input mechanism unit 3004; in response to detecting the rotation: determine (e.g., with determining unit 3014) whether the first set of user interface objects meets a threshold criteria; in accordance with a determination that the first set of user interface objects meets the threshold criteria, replace display (e.g., with display replacing unit 3016) of the first set of user interface objects with display of a plurality of notifications representing at least a subset of the plurality of alerts; and in accordance with a determination that the first set of user interface objects does not meet the threshold criteria, enable display (e.g., with display enabling unit 3010) of a second set of user interface objects, wherein the second set is larger than the first set and comprises the first set.

In some embodiments, replacing display of the first set of user interface objects with display of a plurality of notifications comprises: obtaining a current date-time; and displaying a notification interface on touch-sensitive display unit 3002, the notification interface comprising: a first notification representing a first alert of the plurality of alerts, wherein the first alert is associated with a date-time before the current date-time, a second notification representing a second alert of the plurality of alerts, wherein the second alert is associated with a date-time after the current date-time, and a graphical separator between the first notification and the second notification, wherein the graphical separator comprises an indication of the current date-time, and wherein the first alert and the second alert correspond to different installed applications.

In some embodiments, the plurality of alerts are associated with a plurality of date-times, and replacing display of the first set of user interface objects with display of a plurality of notifications comprises: obtaining a current date-time; displaying a plurality of past notifications representing a plurality of past alerts in the plurality of alerts, wherein the plurality of past alerts are associated with date-times before the current date-time, wherein the plurality of past alerts correspond to a first plurality of installed applications; detecting a contact on the touch-sensitive display unit 3002; determining whether the contact is a swipe or a tap; in accordance with a determination that the contact is a horizontal swipe, displaying a plurality of future notifications representing a plurality of future alerts in the plurality of alerts, wherein the plurality of future alerts are associated with date-times after the current date-time, and wherein the plurality of future alerts correspond to a second plurality of installed applications.

In some embodiments, the plurality of alerts are associated with a plurality of date-times, and wherein replacing display of the first set of user interface objects with display of a plurality of notifications comprises: displaying a plurality of past notifications representing a plurality of past alerts from the plurality of alerts, wherein the plurality of past alerts are associated with date-times before the first current date-time, and wherein the plurality of past alerts correspond to a first plurality of installed applications; detecting a contact on the touch-sensitive display unit 3002; determining whether the contact is a tap or a substantially horizontal swipe; in accordance with a determination that the contact is a substantially horizontal swipe: obtaining a second current date-time, and displaying a single future notification representing the most immediate upcoming alert in the plurality of alerts relative to the second current date-time.

In some embodiments, in accordance with a determination that the contact is a tap, wherein the tap is detected at a location on touch-sensitive display unit 3002 corresponding to a first past notification of the plurality of past notifications, launching the installed application corresponding to the past alert represented by the first past notification.

The operations described above with reference to FIG. 25 are, optionally, implemented by components depicted in FIGS. 1A-1B or FIG. 30. For example, obtaining operation 2502, displaying operation 2504, and detecting operation 2506 may be implemented by event sorter 170, event recognizer 180, and event handler 190. Event monitor 171 in event sorter 170 detects a user input event, such as a contact on touch-sensitive display 112, and event dispatcher module 174 delivers the event information to application 136-1. A respective event recognizer 180 of application 136-1 compares the event information to respective event definitions 186, and determines whether the user input corresponds to a predefined event or sub event, such as a request to launch an application or activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 31:
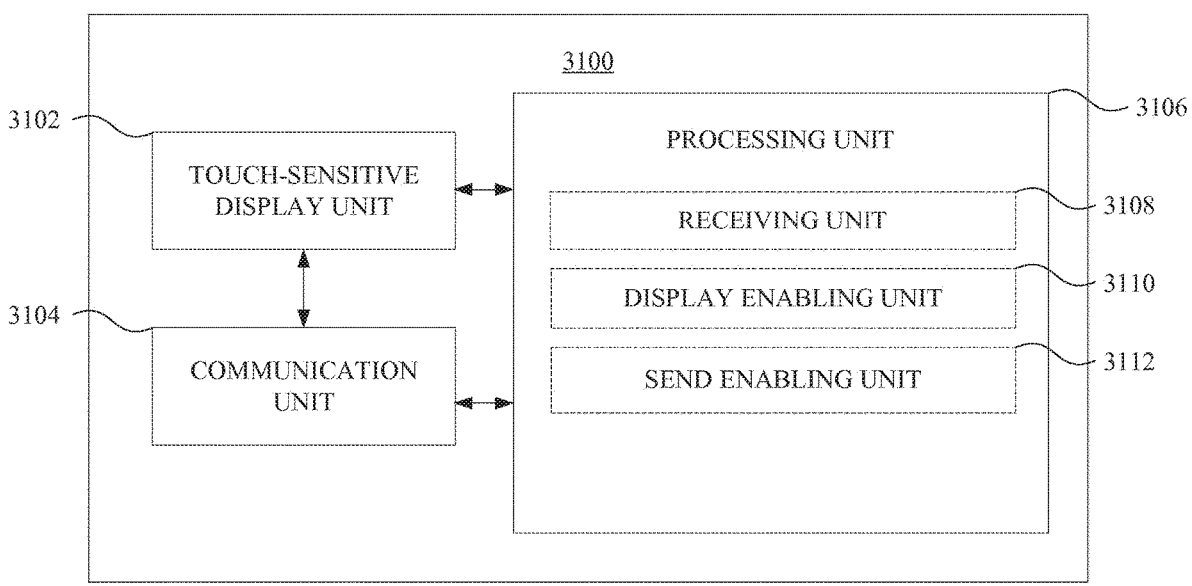

In accordance with some embodiments, FIG. 31 shows an exemplary functional block diagram of an electronic device 3100 configured in accordance with the principles of the various described embodiments. In accordance with some embodiments, the functional blocks of electronic device 3100 are configured to perform the techniques described above. The functional blocks of the device 3100 are, optionally, implemented by hardware, software, or a combination of hardware and software to carry out the principles of the various described examples. It is understood by persons of skill in the art that the functional blocks described in FIG. 31 are, optionally, combined or separated into sub-blocks to implement the principles of the various described examples. Therefore, the description herein optionally supports any possible combination or separation or further definition of the functional blocks described herein.

As shown in FIG. 31, an electronic device 3100 includes a touch-sensitive display unit 3102 configured to display a graphic user interface and receive contacts, a communication unit 3104 configured to communicate wirelessly with an external device and coupled to the touch-sensitive display unit 3102, and a processing unit 3106 coupled to the touch-sensitive display unit 3102 and the communication unit 3104. In some embodiments, the processing unit 3106 includes a receiving unit 3108, a display enabling unit 3110, and a send enabling unit 3112.

The processing unit 3106 is configured to: receive (e.g., with receiving unit 3108) application data associated with an installed application; enable display (e.g., with display enabling unit 3110), on the touch-sensitive display unit 3102, a first indication indicating receipt of the application data; receive (e.g., with receiving unit 3108) a user's indication indicating whether the electronic device 3100 is to instruct an external device to display an indication indicating receipt, by the electronic device 3100, of application data associated with the installed application; and in response to the user's indication to instruct the external device: enable sending (e.g., with send enabling unit 3112) data to the external device (e.g., with communication unit 3104), wherein the data causes the external device to display a second indication indicating receipt of the application data.

The operations described below with reference to FIG. 35 are, optionally, implemented by components depicted in FIGS. 1A-1B or FIG. 31. For example, receiving operations 3502 and 3506, displaying operation 3504, and sending operation 3508 may be implemented by event sorter 170, event recognizer 180, event handler 190, and peripherals interface 118. Peripherals interface 118 receives data. Event monitor 171 in event sorter 170 detects a user input event, such as a contact on touch-sensitive display 112, and event dispatcher module 174 delivers the event information to application 136-1. A respective event recognizer 180 of application 136-1 compares the event information to respective event definitions 186, and determines whether the user input corresponds to a predefined event or sub event, such as a user's indication of whether an external device is to be instructed to display an indication of receipt of application data. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. In some embodiments, event handler 190 causes data to be sent to an external device using peripherals interface 118. Similarly, it would be clear to a person having ordinary skill in the art how other processes can be implemented based on the components depicted in FIGS. 1A-1B.

Figure 33:
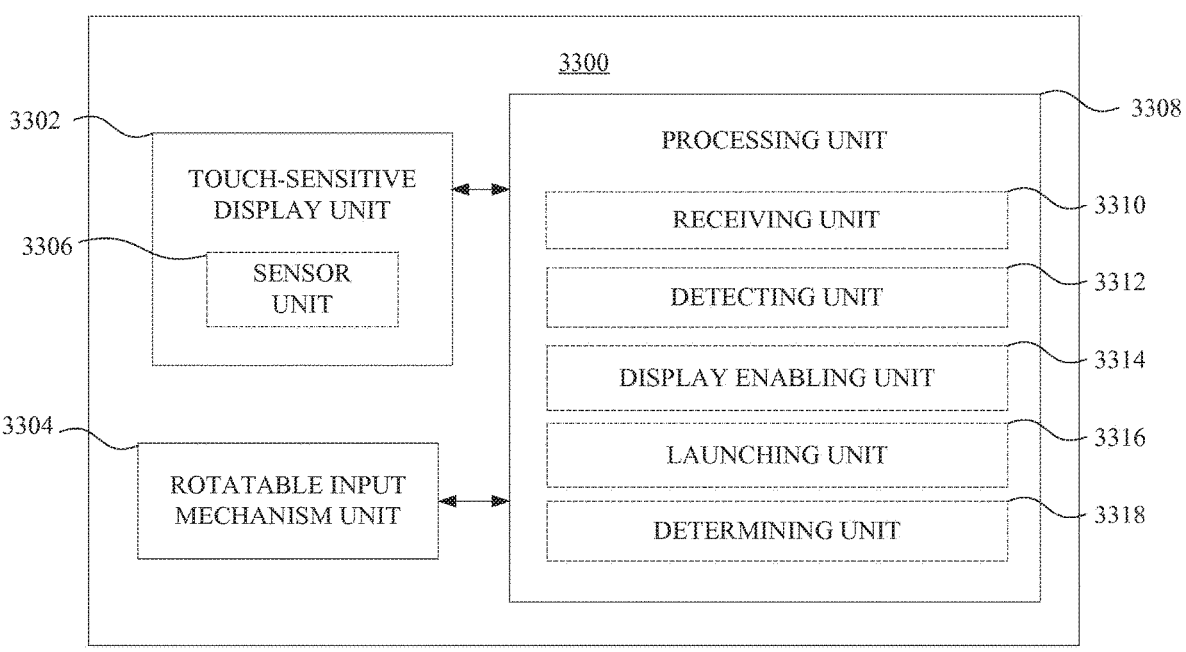
FIG. 33 illustrates a functional block diagram in accordance with some embodiments.

In accordance with some embodiments, FIG. 33 shows an exemplary functional block diagram of an electronic device 3300 configured in accordance with the principles of the various described embodiments. In accordance with some embodiments, the functional blocks of electronic device 3300 are configured to perform the techniques described above. The functional blocks of the device 3300 are, optionally, implemented by hardware, software, or a combination of hardware and software to carry out the principles of the various described examples. It is understood by persons of skill in the art that the functional blocks described in FIG. 33 are, optionally, combined or separated into sub-blocks to implement the principles of the various described examples. Therefore, the description herein optionally supports any possible combination or separation or further definition of the functional blocks described herein.

As shown in FIG. 33, an electronic device 3300 includes a touch-sensitive display unit 3302 configured to display a graphic user interface and receive contacts. Optionally, the touch-sensitive display unit 3302 includes a sensor unit 3306. Electronic device 3300 further includes a rotatable input mechanism unit 3304 and a processing unit 3308 coupled to the touch-sensitive display unit 3302 and the rotatable input mechanism unit 3304. In some embodiments, processing unit 3308 includes a receiving unit 3310, a detecting unit 3312, a display enabling unit 3314, a launching unit 3316, and a determining unit 3318.

Processing unit 3308 is configured to receive (e.g., with receiving unit 3310) a plurality of alerts, where the alerts are associated with date-times, include content, and correspond to a plurality of installed applications. Processing unit 3308 is further configured to detect (e.g., with detecting unit 3312) a user input and, in response to detecting the user input, enable (e.g., with display enabling unit 3314) display of a notification interface on the display unit. The notification interface comprises a plurality of notifications representing at least a subset of the plurality of alerts, where the notifications are displayed in a chronological order based on the date-times associated with the alerts. The notifications include user interface objects representative of the corresponding installed applications of the alerts and include at least a portion of the content of the plurality of alerts.

In some embodiments, processing unit 3308 is further configured to detect (e.g., with detecting unit 3312) a second user input while displaying the notification interface, and, in response to detecting the second user input, enable (e.g., with display enabling unit 3314) scrolling of the notification interface in a first direction in accordance with the second user input to display additional notifications representing additional alerts in the plurality of alerts. In some embodiments, the second user input is a rotation of the rotatable input mechanism unit 3304. In some embodiments, the second user input is a substantially vertical swipe, drag, or flick on the touch-sensitive display unit.

In some embodiments, processing unit 3308 is further configured to, further in response to detecting the second user input, enable (e.g., with display enabling unit 3314) display of an indication based on the currently displayed notifications relative to an entire set of notifications associated with the plurality of received alerts. In some embodiments, the indication is representative of a position of the currently displayed notifications relative to the entire set of notifications. In some embodiments, the indication is representative of a proportion of the entire set of notifications that are currently displayed. In some embodiments, the indication is displayed in a fixed location. In some embodiments, rotatable input mechanism unit 3304 is adjacent to the touch-sensitive display unit 3302, and the fixed location is adjacent to the rotatable input mechanism unit 3304. In some embodiments, the indication is displayed over at least a portion of one or more notifications. In some embodiments, processing unit 3308 is further configured to enable (e.g., with display enabling unit 3314) ceasing display of the indication in accordance with a predetermined amount of time of inactivity after the second input. In some embodiments, the indication is ceased to be displayed by fading out the indication over time.

In some embodiments, processing unit 3308 is further configured to, while displaying the notification interface, detect (e.g., with detecting unit 3312) a touch on the touch-sensitive display unit, detect (e.g., with detecting unit 3312) a rotation of the rotatable input mechanism unit 3304, and enable (e.g., with display enabling unit 3314) zooming of the notification interface in response to detecting the touch and the rotation. In some embodiments, the touch and at least a portion of the rotation are detected essentially simultaneously.

In some embodiments, the plurality of notifications includes a first notification corresponding to a first alert and the first alert comprises first content. Processing unit 3308 is further configured to detect (e.g., with detecting unit 3312) a contact on the first notification and, in response to detecting the contact, enable (e.g., with display enabling unit 3314) ceasing display of the notification interface, and enable (e.g., with display enabling unit 3314) display of the first content. In some embodiments, the contact is detected on the user interface object representative of the corresponding installed application of the first alert. In some embodiments, processing unit 3308 is further configured to detect (e.g., with detecting unit 3312) a third user input after displaying the first content, and in response to detecting the third user input, enable (e.g., with display enabling unit

3314) re-display of the notification interface, where the notification interface excludes the first notification.

In some embodiments, the plurality of notifications includes a first notification and a second notification, where the first notification includes a first user interface object representative of a first installed application corresponding to a first alert and the second notification includes a second user interface object representative of a second installed application corresponding to a second alert. In some embodiments, the first user interface object includes a first affordance that, when activated, enables launching (e.g., with launching unit 3316) of the first installed application corresponding to the first alert, and the second user interface object includes a second affordance that, when activated, enables launching (e.g., with launching unit 3316) of the second installed application corresponding to the second alert. In some embodiments, launching the first installed application or the second installed application comprises displaying the first installed application or the second installed application on the touch-sensitive display unit.

In some embodiments, sensor unit 3306 is configured to detect the intensity of contacts with the touch-sensitive display unit, and processing unit 3308 is further configured to detect (e.g., with detecting unit 3312) a contact on the display while displaying the notification interface. Processing unit 3308 is further configured to determine (e.g., with determining unit 3318) whether the characteristic intensity of the contact is above a threshold intensity and, in accordance with a determination that the characteristic intensity of the contact is above the threshold intensity, enable (e.g., with display enabling unit 3314) display of an affordance for removing the plurality of notifications from the notification interface.

In some embodiments, processing unit 3308 is further configured to: in accordance with a determination that the characteristic intensity of the contact is below the threshold intensity, and in accordance with a determination that the contact is at a location on the display corresponding to a third notification of the plurality of notifications, where the third notification represents a third alert of the plurality of alerts, and where the third alert comprises third content: enable (e.g., with display enabling unit 3314) ceasing display of the notification interface, and enable (e.g., with display enabling unit 3314) display of the third content.

In some embodiments, the plurality of alerts comprises a location-based alert, and displaying the notification interface comprises displaying a notification representing the location-based alert at the top of the notification interface regardless of the value of any date-time associated with the location-based alert. In some embodiments, displaying the notification interface includes replacing display of a first set of user interface objects with display of the notification interface.

The operations described above with reference to FIG. 32 are, optionally, implemented by components depicted in FIGS. 1A-1B or FIG. 33. For example, receiving operation 3202, detecting operation 3204, and displaying operation 3206 may be implemented by event sorter 170, event recognizer 180, and event handler 190. Event monitor 171 in event sorter 170 detects a user input event, such as a contact on touch-sensitive display 112, and event dispatcher module 174 delivers the event information to application 136-1. A respective event recognizer 180 of application 136-1 compares the event information to respective event definitions 186, and determines whether the user input corresponds to a predefined event or sub event, such as a request to launch an application or activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIG. 34 is a flow diagram illustrating a method for displaying and managing notifications using an electronic device in accordance with some embodiments. Method 3400 may be performed at an electronic device with a touch-sensitive display screen, such as device 100, 300 and/or 500 (FIGS. 1, 3, 5, and 28). Some operations in method 3400 may be combined, the order of some operations may be changed, and some operations may be omitted.

As described below, method 3400 provides an intuitive way for invoking display of alert notifications. The method reduces the cognitive burden on a user by reducing the number of inputs required to display information of interest to a user. For battery-operated computing devices, enabling a user to display and manage alert notifications faster and more efficiently conserves power and increase the time between battery charges.

At block 3402, the device obtains a plurality of alerts associated with date-times. At block 3404, the device detects a user input. In some embodiments, the user input may be a touch, tap, or swipe on the touchscreen (e.g., 112, 355, 504). In some embodiments, the user input may be a rotation of a rotatable input mechanism (e.g., 506). At block 3406, in response to detecting the user input, the device obtains a current date-time, and displays a plurality of future notifications (e.g., 1308) representing a plurality of past alerts associated with date-times after the current date-time (as depicted in FIG. 13, for example). The plurality of future alerts correspond to a first plurality of installed applications. At block 3408, the device detects a contact on the touch-screen (e.g., 112, 355, 504). At block 3410, the device determines whether the contact was a tap or a substantially horizontal swipe. At block 3412, in accordance with a determination that the contact was a substantially horizontal swipe, the device displays a plurality of past notifications (e.g., 1310) representing a plurality of past alerts associated with date-times before the current date-time (as depicted in FIG. 13, for example). The plurality of past alerts corresponds to a second plurality of installed applications.

Note that details of the processes described above with respect to method 3400 (e.g., FIGS. 34 and 12) are also applicable in an analogous manner to the other methods described herein. For example, methods 2200, 2300, 2400, 2500, 3200, and 3500 may include one or more of the characteristics of the various processes described above with reference to method 3400. For brevity, these details are not repeated in the descriptions of the other processes. The various methods and techniques described above with reference to method 3400 may be optionally implemented as one or more hardware units, such as those described with regard to FIGS. 5B and 28.

FIG. 35 is a flow diagram illustrating a method for displaying and managing notifications using an electronic device in accordance with some embodiments. Method 3500 may be performed at an electronic device with a touch-sensitive display screen, such as device 100, 300 and/or 500 (FIGS. 1, 3, 5, and 31). Some operations in method 3500 may be combined, the order of some operations may be changed, and some operations may be omitted.

As described below, method 3500 provides an intuitive way for invoking display of alert notifications. The method reduces the cognitive burden on a user by reducing the number of inputs required to display information of interest to a user. For battery-operated computing devices, enabling a user to display and manage alert notifications faster and more efficiently conserves power and increase the time between battery charges.

At block 3502, the device receives application data associated with the installed application. At block, 3504, the device displays a first indication indicating receipt of the application data. At block 3506, the device receives a user's indication indicating whether the device is to instruct the external device to display an indication indicating receipt, by the device, of application data associated with the installed application. At block 3508, the device, in response to the user's indication to instruct the external device, sends data to the external device, where the data causes the external device to display a second indication indicating receipt of the application data.

Note that details of the processes described above with respect to method 3500 (e.g., FIG. 35) are also applicable in an analogous manner to the other methods described herein. For example, methods 2200, 2300, 2400, 2500, 3200, and 3400 may include one or more of the characteristics of the various processes described above with reference to method 3500. For brevity, these details are not repeated in the descriptions of the other processes. The various methods and techniques described above with reference to method 3500 may be optionally implemented as one or more hardware units, such as those described with regard to FIGS. 5B and 31.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:

a display;

one or more processors; and a memory storing one or more programs configured to be executed by the one or more processors, the one or more programs including instructions for:

receiving a plurality of alerts, wherein the alerts correspond to a plurality of installed applications;

detecting, via the display, a first user input;

in response to detecting the first user input, displaying, on the display, a notification interface, wherein:

a set of notifications are accessible from the notification interface; and displaying the notification interface includes concurrently displaying two or more notifications from the set of notifications, the two or more notifications corresponding to two or more of the plurality of installed applications and representing at least a subset of the plurality of alerts;

while displaying the notification interface, detecting, via the display, a second user input at a location on the display corresponding to a respective notification of the set of notifications; and in response to detecting the second user input:

in accordance with a determination that the second user input is a first type of input performed with a first number of contacts, displaying a first affordance which when activated removes the two or more notifications from the notification interface, wherein the first affordance is not displayed prior to detecting the second user input, wherein the first affordance has a first appearance; and in accordance with a determination that the second user input is a second type of input, different from the first type of input, wherein the second type of input is performed with a same first number of contacts, displaying a second affordance which when activated removes the respective notification from the set of notifications accessible from the notification interface without removing one or more other notifications from the set of notifications accessible from the notification interface, wherein the second affordance is not displayed prior to detecting the second user input, wherein the second affordance has a second appearance different from the first appearance.

2. The electronic device of claim 1, wherein the one or more programs further include instructions for:

in response to detecting the second user input:

in accordance with a determination that the second user input meets a dismissal criteria:

displaying the second affordance which when activated removes the respective notification from the notification interface.

3. The electronic device of claim 2, wherein the dismissal criteria includes a criterion that is met when the second user input is determined to be a horizontal swipe at a location corresponding to a notification.

4. The electronic device of claim 2, wherein the one or more programs further include instructions for:

while displaying the second affordance, detecting a third user input at a location on the display corresponding to the second affordance; and in response to detecting the third user input, removing the respective notification from the notification interface.

5. The electronic device of claim 2, wherein the one or more programs further include instructions for:

in response detecting the second user input:

in accordance with a determination that the second user input does not meet the dismissal criteria, and a determination that the second user input is at a location on the display corresponding to the respective notification of the set of notifications, and a determination that the second user input is a tap input:

displaying content corresponding to the respective notification without displaying the notification interface.

6. The electronic device of claim 5, wherein the respective notification corresponds to a respective installed application, and displaying content corresponding to the respective notification comprises displaying the content corresponding to the respective notification within the respective installed application.

7. The electronic device of claim 1, wherein the determination that the second user input is a first type of input comprises a determination whether the second user input meets a threshold criteria, wherein the threshold criteria comprises a criterion that is met when a characteristic intensity of the second user input is above a threshold intensity.

8. The electronic device of claim 1, wherein the one or more programs further include instructions for:

while displaying the first affordance for removing the set of notifications from the notification interface, detecting a third user input at a location on the display corresponding to the first affordance for removing the set of notifications from the notification interface; and in response to detecting the third user input, removing the set of notifications from the notification interface.

9. A method, comprising:

at an electronic device with a display:

receiving a plurality of alerts, wherein the alerts correspond to a plurality of installed applications;

detecting, via the display, a first user input;

in response to detecting the first user input, displaying, on the display, a notification interface, wherein:

a set of notifications are accessible from the notification interface; and displaying the notification interface includes concurrently displaying two or more notifications from the set of notifications, the two or more notifications corresponding to two or more of the plurality of installed applications and representing at least a subset of the plurality of alerts;

while displaying the notification interface, detecting, via the display, a second user input at a location on the display corresponding to a respective notification of the set of notifications; and in response to detecting the second user input:

in accordance with a determination that the second user input is a first type of input performed with a first number of contacts, displaying a first affordance which when activated removes the two or more notifications from the notification interface, wherein the first affordance is not displayed prior to detecting the second user input, wherein the first affordance has a first appearance; and in accordance with a determination that the second user input is a second type of input, different from the first type of input, wherein the second type of input is performed with a same first number of contacts, displaying a second affordance which when activated removes the respective notification from the set of notifications accessible from the notification interface without removing one or more other notifications from the set of notifications accessible from the notification interface, wherein the second affordance is not displayed prior to detecting the second user input, wherein the second affordance has a second appearance different from the first appearance.

10. The method of claim 9, further comprising:

in response to detecting the second user input:

in accordance with a determination that the second user input meets a dismissal criteria:

displaying the second affordance which when activated removes the respective notification from the notification interface.

11. The method of claim 10, wherein the dismissal criteria includes a criterion that is met when the second user input is determined to be a horizontal swipe at a location corresponding to a notification.

12. The method of claim 10, further comprising:

while displaying the second affordance, detecting a third user input at a location on the display corresponding to the second affordance; and in response to detecting the third user input, removing the respective notification from the notification interface.

13. The method of claim 10, further comprising:

in response detecting the second user input:

in accordance with a determination that the second user input does not meet the dismissal criteria, and a determination that the second user input is at a location on the display corresponding to the respective notification of the set of notifications, and a determination that the second user input is a tap input:

displaying content corresponding to the respective notification without displaying the notification interface.

14. The method of claim 13, wherein the respective notification corresponds to a respective installed application, and displaying content corresponding to the respective notification comprises displaying the content corresponding to the respective notification within the respective installed application.

15. The method of claim 9, wherein the determination that the second user input is a first type of input comprises a determination whether the second user input meets a threshold criteria, wherein the threshold criteria comprises a criterion that is met when a characteristic intensity of the second user input is above a threshold intensity.

16. The method of claim 9, further comprising:

while displaying the first affordance for removing the set of notifications from the notification interface, detecting a third user input at a location on the display corresponding to the first affordance for removing the set of notifications from the notification interface; and in response to detecting the third user input, removing the set of notifications from the notification interface.

17. A non-transitory computer-readable storage medium storing one or more programs configured to be executed by one or more processors of an electronic device with a display, the one or more programs including instructions for:

receiving a plurality of alerts, wherein the alerts correspond to a plurality of installed applications;

detecting, via the display, a first user input;

in response to detecting the first user input, displaying, on the display, a notification interface, wherein:

a set of notifications are accessible from the notification interface; and displaying the notification interface includes concurrently displaying two or more notifications from the set of notifications, the two or more notifications corresponding to two or more of the plurality of installed applications and representing at least a subset of the plurality of alerts;

while displaying the notification interface, detecting, via the display, a second user input at a location on the display corresponding to a respective notification of the set of notifications; and in response to detecting the second user input:

in accordance with a determination that the second user input is a first type of input performed with a first number of contacts, displaying a first affordance which when activated removes the two or more notifications from the notification interface, wherein the first affordance is not displayed prior to detecting the second user input, wherein the first affordance has a first appearance; and in accordance with a determination that the second user input is a second type of input, different from the first type of input, wherein the second type of input is performed with a same first number of contacts, displaying a second affordance which when activated removes the respective notification from the set of notifications accessible from the notification interface without removing one or more other notifications from the set of notifications accessible from the notification interface, wherein the second affordance is not displayed prior to detecting the second user input, wherein the second affordance has a second appearance different from the first appearance.

18. The non-transitory computer-readable storage medium of claim 17, wherein the one or more programs further include instructions for:

in response to detecting the second user input:

in accordance with a determination that the second user input meets a dismissal criteria:

displaying the second affordance which when activated removes the respective notification from the notification interface.

19. The non-transitory computer-readable storage medium of claim 18, wherein the dismissal criteria includes a criterion that is met when the second user input is determined to be a horizontal swipe at a location corresponding to a notification.

20. The non-transitory computer-readable storage medium of claim 18, wherein the one or more programs further include instructions for:

while displaying the second affordance, detecting a third user input at a location on the display corresponding to the second affordance; and in response to detecting the third user input, removing the respective notification from the notification interface.

21. The non-transitory computer-readable storage medium of claim 18, wherein the one or more programs further include instructions for:

in response detecting the second user input:

in accordance with a determination that the second user input does not meet the dismissal criteria, and a determination that the second user input is at a location on the display corresponding to the respective notification of the set of notifications, and a determination that the second user input is a tap input:

displaying content corresponding to the respective notification without displaying the notification interface.

22. The non-transitory computer-readable storage medium of claim 21, wherein the respective notification corresponds to a respective installed application, and displaying content corresponding to the respective notification comprises displaying the content corresponding to the respective notification within the respective installed application.

23. The non-transitory computer-readable storage medium of claim 17, wherein the determination that the second user input is a first type of input comprises a determination whether the second user input meets a threshold criteria, wherein the threshold criteria comprises a criterion that is met when a characteristic intensity of the second user input is above a threshold intensity.

24. The non-transitory computer-readable storage medium of claim 17, wherein the one or more programs further include instructions for:

while displaying the first affordance for removing the set of notifications from the notification interface, detecting a third user input at a location on the display corresponding to the first affordance for removing the set of notifications from the notification interface; and in response to detecting the third user input, removing the set of notifications from the notification interface.

\* \* \* \* \*